United States Patent
Newman

(10) Patent No.: US 10,786,057 B2
(45) Date of Patent: *Sep. 29, 2020

(54) PACKAGING FOR DISPOSABLE SOFT CONTACT LENSES

(71) Applicant: MENICON SINGAPORE PTE LTD., Singapore (SG)

(72) Inventor: Stephen D. Newman, Bayshore Park (SG)

(73) Assignee: MENICON SINGAPORE PTE LTD., Singapore (SG)

(*) Notice: Subject to any disclaimer, the term of this patent is extended or adjusted under 35 U.S.C. 154(b) by 0 days.

This patent is subject to a terminal disclaimer.

(21) Appl. No.: 16/236,925

(22) Filed: Dec. 31, 2018

(65) Prior Publication Data
US 2019/0133275 A1 May 9, 2019

Related U.S. Application Data

(60) Division of application No. 15/444,102, filed on Feb. 27, 2017, now Pat. No. 10,194,724, which is a
(Continued)

(51) Int. Cl.
*A45C 11/04* (2006.01)
*A45C 11/00* (2006.01)
(Continued)

(52) U.S. Cl.
CPC .......... *A45C 11/005* (2013.01); *A45C 11/046* (2013.01); *B32B 1/06* (2013.01);
(Continued)

(58) Field of Classification Search
CPC .............. A45C 11/005; A45C 11/046; A45C 2011/006; B65D 81/22; B65D 2585/545;
(Continued)

(56) References Cited

U.S. PATENT DOCUMENTS 2,932,383 A 4/1960 Fagan
2,967,607 A 1/1961 Hollinger
(Continued)

FOREIGN PATENT DOCUMENTS

AU 6295173 A 5/1975
AU 2002322175 8/2002
(Continued)

OTHER PUBLICATIONS

Extended European Search Report for EP Application No. 18173286, dated Sep. 11, 2018.

*Primary Examiner* — Luan K Bui
(74) *Attorney, Agent, or Firm* — Dorsey & Whitney LLP

(57) ABSTRACT

The present disclosure provides a contact lens package containing a contact lens in a compressed state. In one exemplary embodiment, the overall internal depth of the package is less than the natural sagittal depth of the contact lens. Different single-use contact lens package shapes and configurations may be used. In some embodiments, a spring disc is included in the packages to help present the contact lens to the user when the package is opened. The contact lens packages may be adhered or clipped to a card or other carrier sheet, and may be housed in a number of different secondary packages.

16 Claims, 38 Drawing Sheets

Related U.S. Application Data continuation of application No. 14/596,791, filed on Jan. 14, 2015, now Pat. No. 9,615,639, which is a division of application No. 12/892,890, filed on Sep. 28, 2010, now Pat. No. 8,955,672, which is a continuation of application No. 11/404,200, filed on Apr. 13, 2006, now Pat. No. 7,828,137, which is a division of application No. 10/789,961, filed on Feb. 27, 2004, now Pat. No. 7,086,526, which is a continuation-in-part of application No. 10/781,321, filed on Feb. 17, 2004, now abandoned, which is a continuation-in-part of application No. PCT/AU02/01105, filed on Aug. 7, 2002.

(51) Int. Cl.
| | |
|---|---|
| B32B 1/06 | (2006.01) |
| B32B 3/08 | (2006.01) |
| B65D 75/30 | (2006.01) |
| B65D 75/32 | (2006.01) |
| B65D 75/42 | (2006.01) |
| B65D 75/58 | (2006.01) |
| B65D 77/02 | (2006.01) |
| B65D 81/05 | (2006.01) |
| B65D 81/22 | (2006.01) |
| B65D 81/32 | (2006.01) |
| B65D 83/00 | (2006.01) |
| B65D 83/04 | (2006.01) |
| B65D 53/00 | (2006.01) |
| B65D 65/40 | (2006.01) |
| B65D 75/52 | (2006.01) |
| B65D 85/00 | (2006.01) |

(52) U.S. Cl.
CPC ............. *B32B 3/08* (2013.01); *B65D 53/00* (2013.01); *B65D 65/40* (2013.01); *B65D 75/30* (2013.01); *B65D 75/32* (2013.01); *B65D 75/42* (2013.01); *B65D 75/527* (2013.01); *B65D 75/5855* (2013.01); *B65D 77/02* (2013.01); *B65D 81/05* (2013.01); *B65D 81/22* (2013.01); *B65D 81/32* (2013.01); *B65D 83/005* (2013.01); *B65D 83/04* (2013.01); *B65D 85/70* (2013.01); *A45C 2011/006* (2013.01); *B65D 2585/545* (2013.01)

(58) Field of Classification Search
CPC ...... B65D 81/2084; B65D 75/30; B32B 1/06; B32B 3/08
USPC ............ 206/5.1, 205, 213.1; 134/901
See application file for complete search history.

(56) References Cited

U.S. PATENT DOCUMENTS

| | | | |
|---|---|---|---|
| 3,130,823 A | 4/1964 | Antonious | |
| 3,186,540 A * | 6/1965 | Breger | A45C 11/005 |
| | | | 134/155 |
| 3,344,461 A | 10/1967 | Floor | |
| 3,369,656 A | 2/1968 | Skinner | |
| 3,378,020 A | 4/1968 | Grabiel | |
| 3,379,200 A | 4/1968 | Pennell | |
| 3,536,082 A | 10/1970 | Kolbeck | |
| 3,610,516 A | 10/1971 | Esty | |
| 3,977,517 A | 8/1976 | Kadlecik et al. | |
| 4,113,088 A * | 9/1978 | Binkhorst | A61F 2/1691 |
| | | | 206/210 |
| 4,150,744 A | 4/1979 | Fennimore | |
| 4,173,281 A | 11/1979 | Trought | |
| 4,257,521 A | 3/1981 | Poler | |
| 4,266,692 A | 5/1981 | Clark | |
| 4,392,569 A | 7/1983 | Shoup | |
| 4,423,809 A | 1/1984 | Mazzocco | |
| 4,597,244 A | 7/1986 | Pharo | |
| 4,657,137 A | 4/1987 | Johnson | |
| 4,691,820 A | 9/1987 | Martinez | |
| 4,710,023 A | 12/1987 | Loveridge | |
| 4,765,482 A | 8/1988 | Delia | |
| 4,769,261 A | 9/1988 | Hazelton et al. | |
| 4,775,076 A | 10/1988 | Horvath | |
| 4,782,942 A * | 11/1988 | Ashley | A61L 2/26 |
| | | | 206/1.5 |
| 4,796,751 A | 1/1989 | Madkour | |
| 4,863,036 A | 9/1989 | Heijenga | |
| 4,865,186 A | 9/1989 | Gates | |
| 4,872,942 A | 10/1989 | Sharps et al. | |
| 4,909,382 A | 3/1990 | Cuppari | |
| 4,942,959 A | 7/1990 | Sauber et al. | |
| 5,036,971 A | 8/1991 | Seden et al. | |
| 5,053,208 A | 10/1991 | Seamons et al. | |
| 5,054,610 A | 10/1991 | Ajello | |
| 5,132,160 A | 7/1992 | Bird | |
| 5,143,660 A | 9/1992 | Hamilton et al. | |
| 5,150,787 A | 9/1992 | Bird et al. | |
| 5,176,686 A | 1/1993 | Poley | |
| 5,337,888 A | 8/1994 | Morrison | |
| 5,375,698 A | 12/1994 | Ewart et al. | |
| D357,580 S | 4/1995 | Ashley et al. | |
| 5,409,104 A | 4/1995 | Lovell | |
| 5,433,314 A | 7/1995 | Lin | |
| 5,439,572 A | 8/1995 | Pankow | |
| 5,467,868 A | 11/1995 | Abrams et al. | |
| 5,474,169 A | 12/1995 | Bauman | |
| 5,515,964 A | 5/1996 | Bauman | |
| 5,524,419 A | 6/1996 | Shannon | |
| 5,573,108 A | 11/1996 | Hamilton et al. | |
| 5,578,331 A | 11/1996 | Martin et al. | |
| 5,598,601 A | 2/1997 | Eaton et al. | |
| 5,598,919 A | 2/1997 | Taylor | |
| 5,609,246 A | 3/1997 | Borghorst et al. | |
| 5,618,492 A | 4/1997 | Auten et al. | |
| 5,620,087 A | 4/1997 | Martin et al. | |
| 5,620,088 A * | 4/1997 | Martin | B65B 25/008 |
| | | | 206/5.1 |
| 5,630,308 A | 5/1997 | Guckenberger | |
| D380,898 S | 7/1997 | Lovell | |
| 5,649,410 A | 7/1997 | Martin et al. | |
| 5,657,506 A | 8/1997 | Pankow | |
| 5,685,420 A * | 11/1997 | Martin | B65D 5/48024 |
| | | | 206/497 |
| 5,695,049 A | 12/1997 | Bauman | |
| 5,697,495 A * | 12/1997 | Abrams | B65B 25/008 |
| | | | 206/5.1 |
| 5,704,468 A | 1/1998 | Lust et al. | |
| 5,711,416 A | 1/1998 | Bauman | |
| 5,722,536 A | 3/1998 | Pierce et al. | |
| 5,772,014 A | 6/1998 | Jacober | |
| 5,823,327 A | 10/1998 | Wu et al. | |
| 5,839,587 A | 11/1998 | Gress et al. | |
| D401,762 S | 12/1998 | Abrams et al. | |
| 5,853,085 A * | 12/1998 | Luttrell | A45C 11/005 |
| | | | 206/5.1 |
| 5,881,867 A | 3/1999 | Tohill et al. | |
| 5,915,545 A | 6/1999 | Shackel et al. | |
| 5,983,608 A | 11/1999 | Wu et al. | |
| 6,029,808 A | 2/2000 | Peck et al. | |
| 6,044,966 A | 4/2000 | Haase | |
| 6,047,938 A | 4/2000 | Mitchell | |
| 6,050,398 A | 4/2000 | Wilde et al. | |
| 6,082,533 A | 7/2000 | Smith et al. | |
| 6,092,646 A | 7/2000 | Glazier | |
| 6,134,736 A | 10/2000 | Pankow | |
| 6,138,312 A | 10/2000 | Cummings | |
| 6,161,696 A | 12/2000 | Lashley | |
| 6,164,452 A | 12/2000 | Ellis | |
| 6,244,430 B1 | 6/2001 | Travis | |
| 6,253,912 B1 | 7/2001 | Oneill et al. | |
| 6,260,695 B1 | 7/2001 | Tasber et al. | |
| RE37,558 E | 2/2002 | Abrams et al. | |
| 6,364,098 B2 | 4/2002 | Yavitz | |

(56) References Cited

U.S. PATENT DOCUMENTS

| | | |
|---|---|---|
| 6,382,408 B1 | 5/2002 | Bruun-jensen |
| 6,401,915 B1 | 6/2002 | Faxe |
| 6,413,599 B1 | 7/2002 | Petricca et al. |
| 6,471,052 B2 | 10/2002 | Faxe et al. |
| 6,474,465 B1 | 11/2002 | Jux |
| 6,558,420 B2 | 5/2003 | Green |
| 6,558,584 B1 | 5/2003 | Oneill et al. |
| 6,613,283 B2 | 9/2003 | Reo |
| 6,640,995 B2 | 11/2003 | Jepson |
| D520,867 S | 5/2006 | Chang |
| 7,086,526 B2 | 8/2006 | Newman |
| 7,426,993 B2 | 9/2008 | Coldrey et al. |
| 7,461,740 B2 | 12/2008 | Newman |
| 7,784,608 B2 | 8/2010 | Tokarski et al. |
| 7,828,137 B2 | 11/2010 | Newman |
| 7,967,133 B2 | 6/2011 | Newman |
| 8,955,672 B2 | 2/2015 | Newman |
| 9,615,639 B2 | 4/2017 | Newman |
| 2002/0020634 A1 | 2/2002 | Fortune |
| 2002/0029984 A1 | 3/2002 | Hughes |
| 2002/0063068 A1 | 5/2002 | Faxe et al. |
| 2002/0117405 A1* | 8/2002 | Wang .......... B65B 25/008 206/5.1 |
| 2002/0158477 A1 | 10/2002 | Faxe et al. |
| 2002/0175177 A1 | 11/2002 | Jepson |
| 2002/0177405 A1 | 11/2002 | Chedester et al. |
| 2003/0024829 A1 | 2/2003 | Matsuzawa et al. |
| 2004/0004008 A1 | 1/2004 | Peck et al. |
| 2004/0035747 A1 | 2/2004 | Butler |
| 2004/0238380 A1 | 12/2004 | Newman |
| 2006/0054514 A1 | 3/2006 | Tokarski et al. |
| 2006/0213783 A1 | 9/2006 | Tokarski et al. |
| 2007/0056861 A1 | 3/2007 | Duis et al. |
| 2008/0047848 A1 | 2/2008 | Tokarski et al. |
| 2017/0164704 A1 | 6/2017 | Newman |

FOREIGN PATENT DOCUMENTS

| | | |
|---|---|---|
| AU | 2009203013 A1 | 8/2009 |
| AU | 2013200634 A1 | 2/2013 |
| AU | 2013200636 A1 | 2/2013 |
| CN | 1117461 A | 2/1996 |
| CN | 1122277 A | 5/1996 |
| CN | 2384905 Y | 6/2000 |
| CN | 1264053 A | 8/2000 |
| DE | 836170 | 4/1952 |
| DE | 19525615 A1 | 1/1997 |
| DE | 19634683 A1 | 3/1998 |
| EP | 0129388 A2 | 12/1984 |
| EP | 0223581 A3 | 9/1988 |
| EP | 0389418 A1 | 9/1990 |
| EP | 0401163 A1 | 12/1990 |
| EP | 0734957 A1 | 10/1996 |
| EP | 0765741 A2 | 4/1997 |
| EP | 0995688 A1 | 4/2000 |
| EP | 1033326 A1 | 9/2000 |
| EP | 1277416 A2 | 1/2003 |
| EP | 1092645 B1 | 3/2004 |
| EP | 1028680 B1 | 8/2004 |
| EP | 3385180 A1 | 10/2018 |
| FR | 377888 A | 9/1907 |
| FR | 2638248 A1 | 4/1990 |
| GB | 2085401 A | 4/1982 |
| GB | 2222816 A | 3/1990 |
| JP | 54123232 | 8/1979 |
| JP | 56103487 | 8/1981 |
| JP | 06092388 | 4/1994 |
| JP | 06258603 | 9/1994 |
| JP | 10313928 | 5/1997 |
| JP | 9175575 | 7/1997 |
| JP | 10010477 | 1/1998 |
| JP | 2000007020 A | 1/2000 |
| JP | 2000502310 A | 2/2000 |
| JP | 2001046134 A | 2/2001 |
| JP | 2001255499 A | 9/2001 |
| JP | 2001270580 A | 10/2001 |
| JP | 2002306227 A | 10/2002 |
| JP | 2005250496 A | 9/2005 |
| NZ | 250453 A | 12/1996 |
| WO | 9200151 A1 | 1/1992 |
| WO | 9424019 A2 | 10/1994 |
| WO | 9718997 A1 | 5/1997 |
| WO | 9724022 A1 | 7/1997 |
| WO | 9911529 A1 | 3/1999 |
| WO | 9921519 A1 | 5/1999 |
| WO | 0076881 A1 | 12/2000 |
| WO | 0197726 A1 | 12/2001 |
| WO | 03016175 A1 | 2/2003 |
| WO | 03082701 A1 | 10/2003 |
| WO | 2004024573 A2 | 3/2004 |
| WO | 2005025991 A2 | 3/2005 |
| WO | 2005082721 A2 | 9/2005 |
| WO | 2006102384 A2 | 9/2006 |
| WO | 2007047594 A2 | 4/2007 |
| WO | 2008044145 A2 | 4/2008 |

* cited by examiner

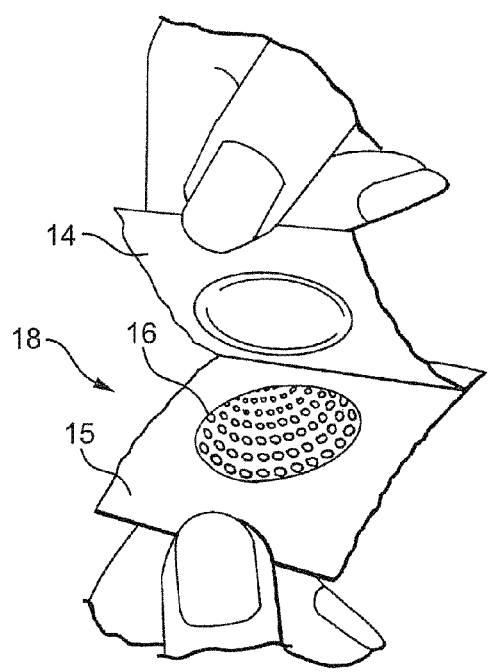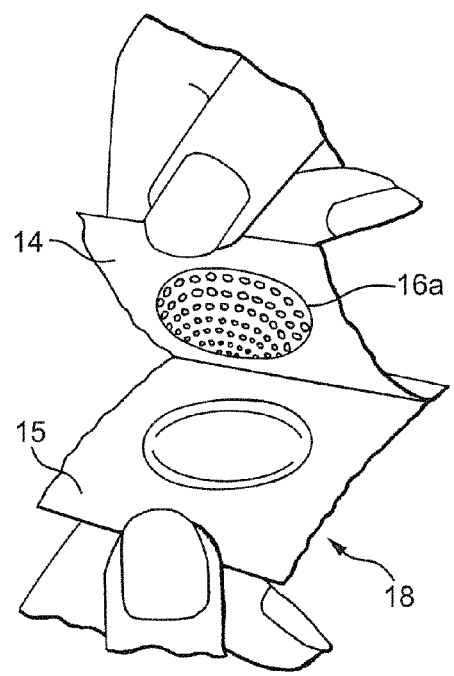
FIG. 6  FIG. 7
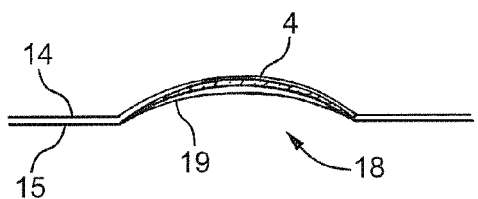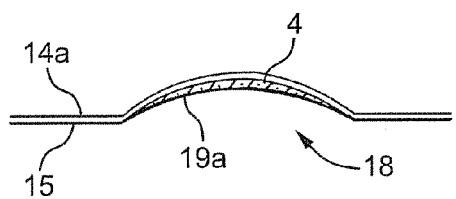
FIG. 8  FIG. 9
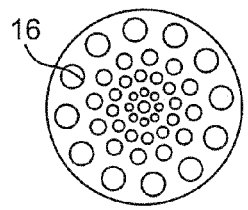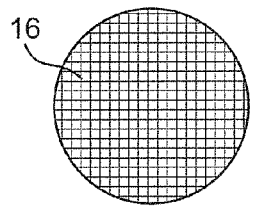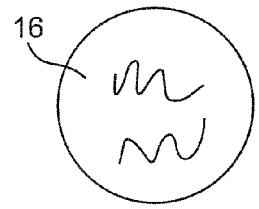
FIG. 10  FIG. 11  FIG. 12

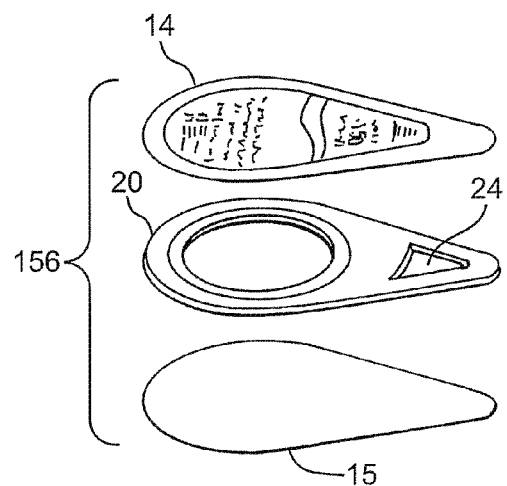 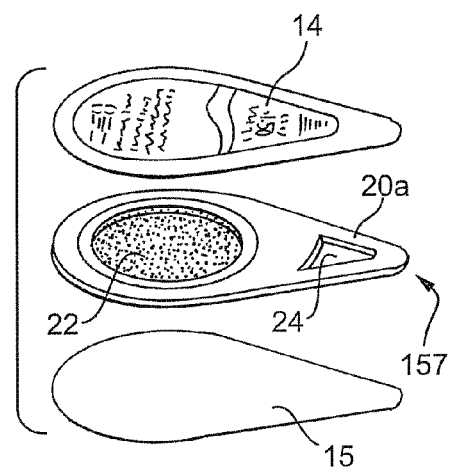
FIG. 17  FIG. 18
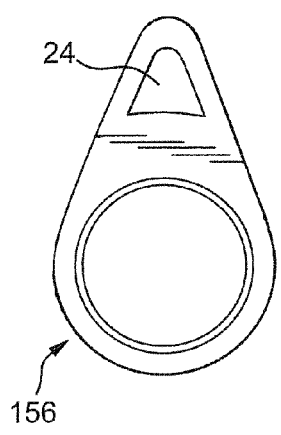 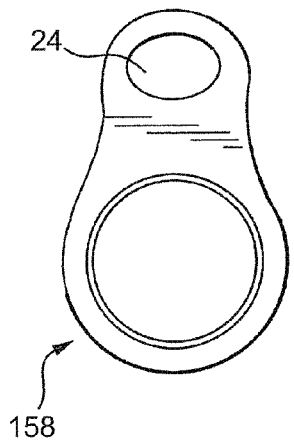 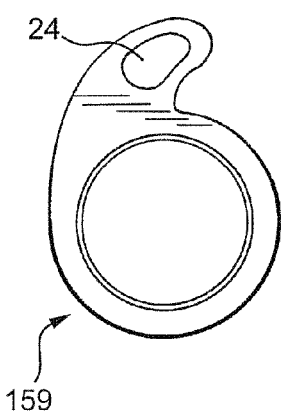
FIG. 19  FIG. 20  FIG. 21

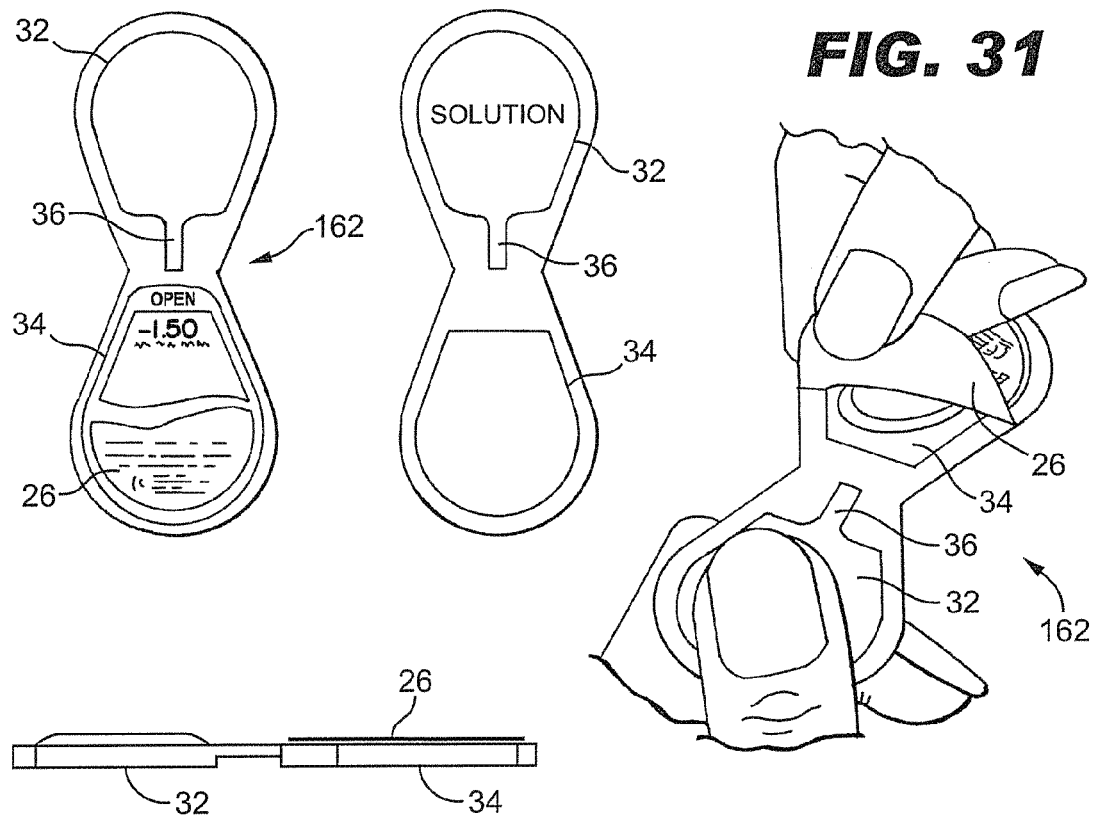
FIG. 29  FIG. 30  FIG. 31
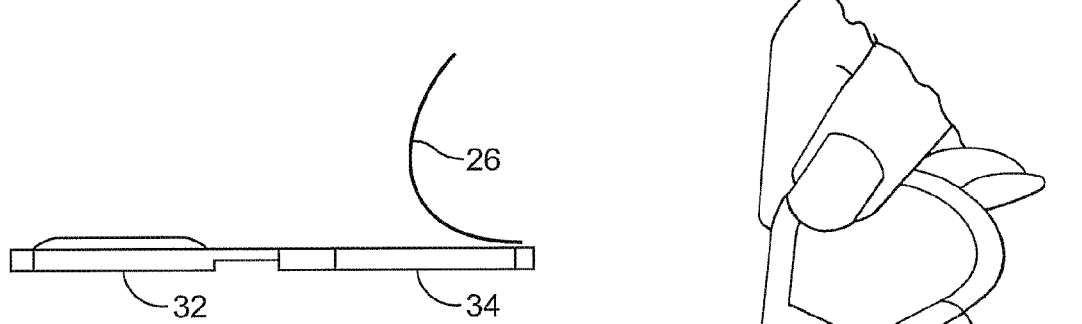
FIG. 32
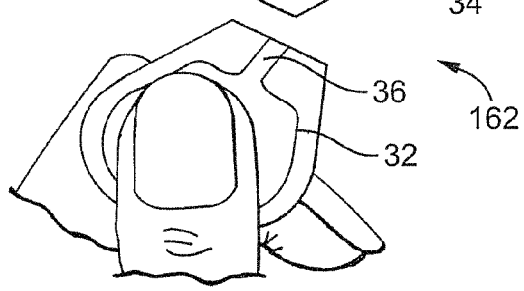
FIG. 33
FIG. 34

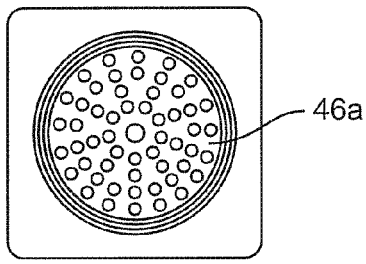
FIG. 61
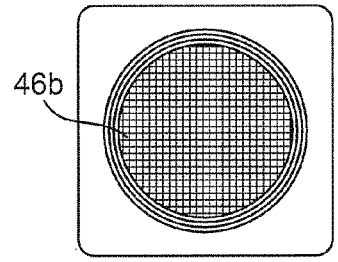
FIG. 62
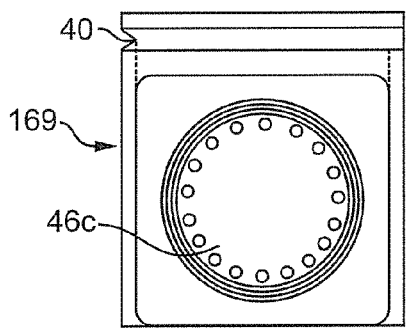
FIG. 63
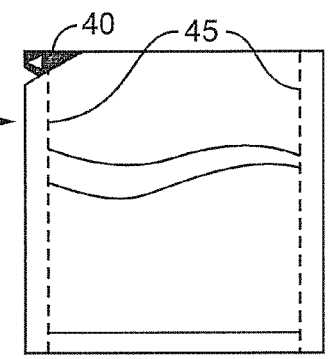
FIG. 64
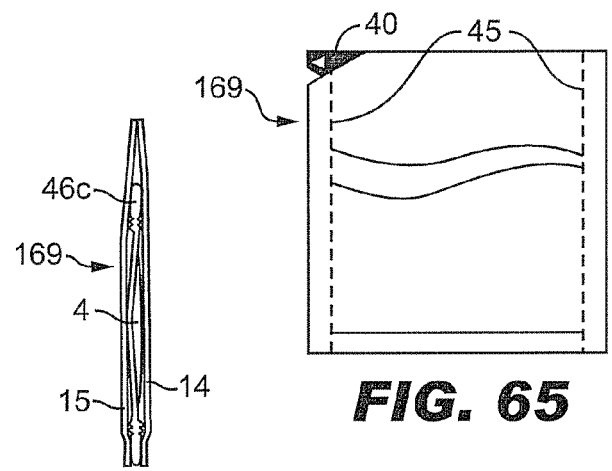
FIG. 65
FIG. 67
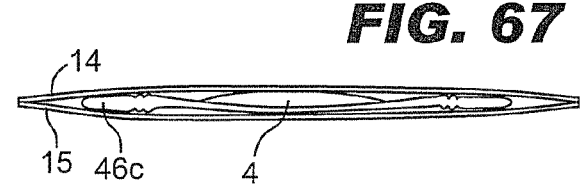
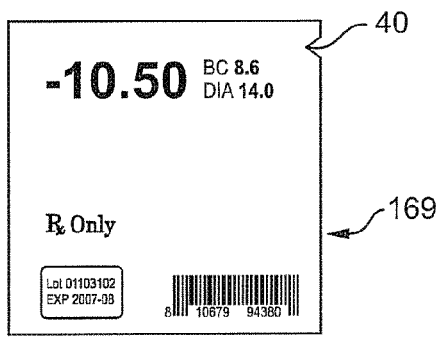
FIG. 66
FIG. 68
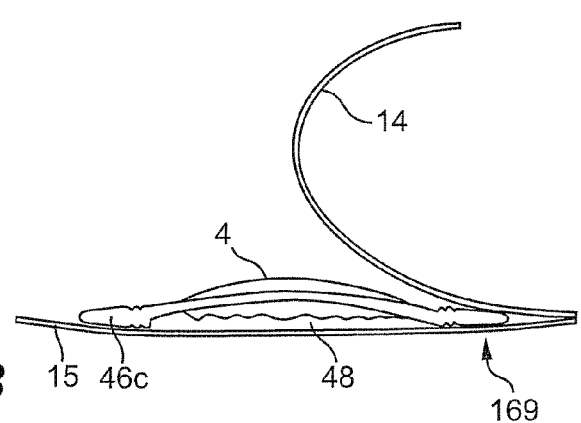

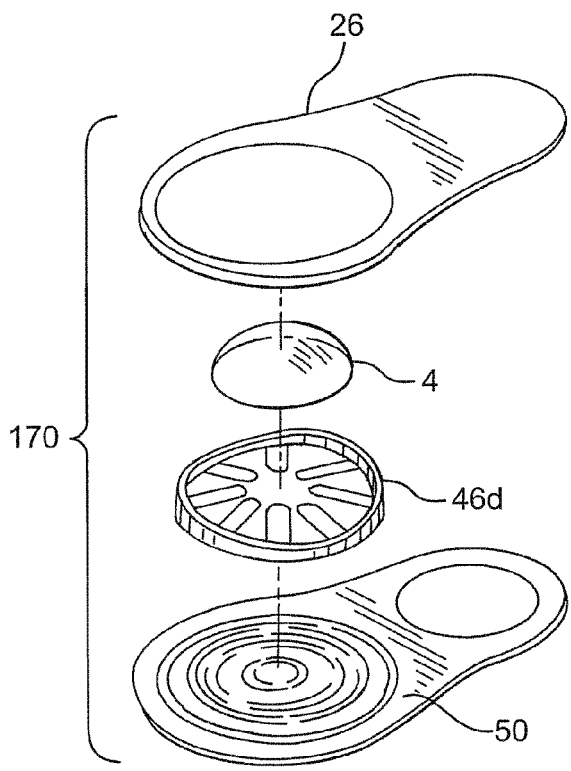
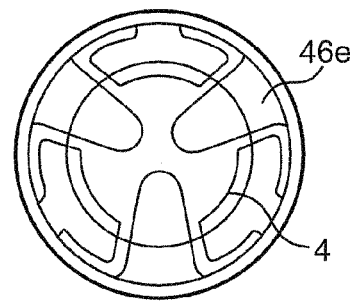
FIG. 70A
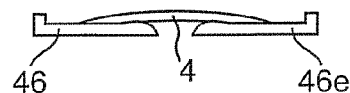
FIG. 70B
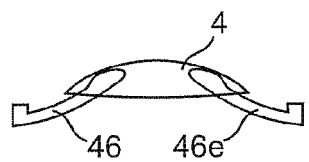
FIG. 70C
FIG. 69
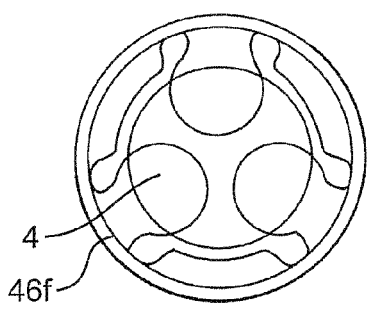
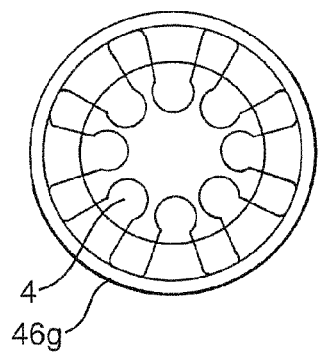
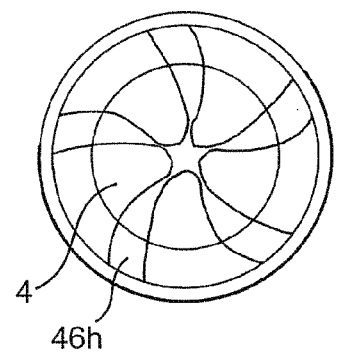
FIG. 71  FIG. 72  FIG. 73

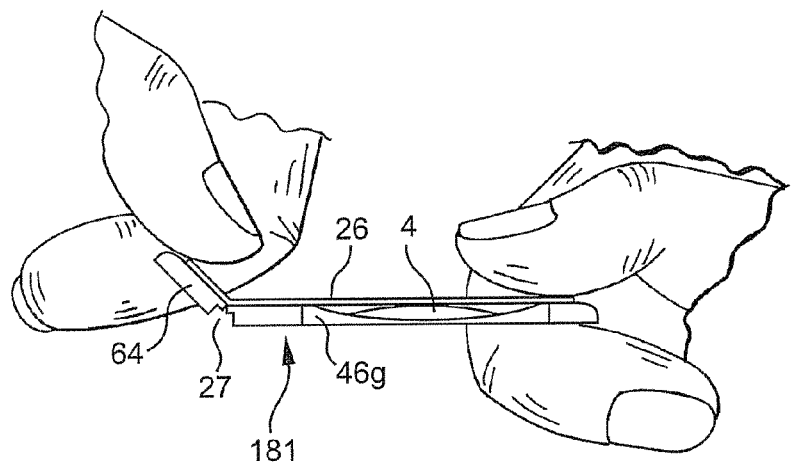
FIG. 111
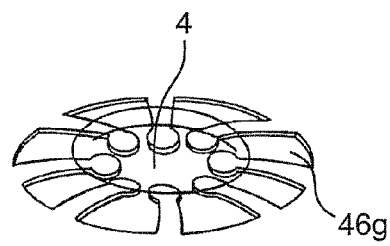
FIG. 112
FIG. 113
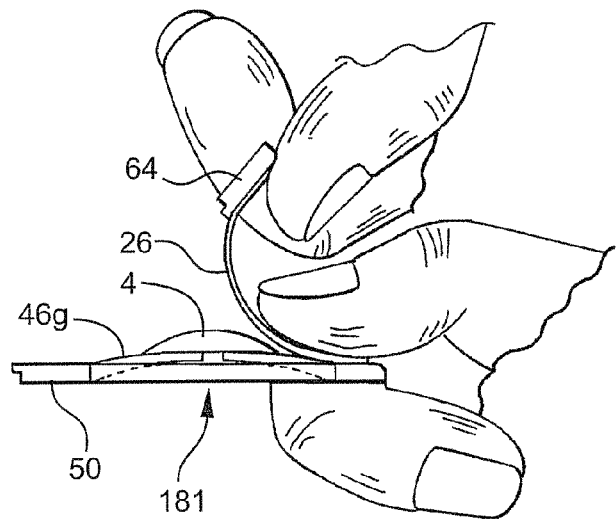

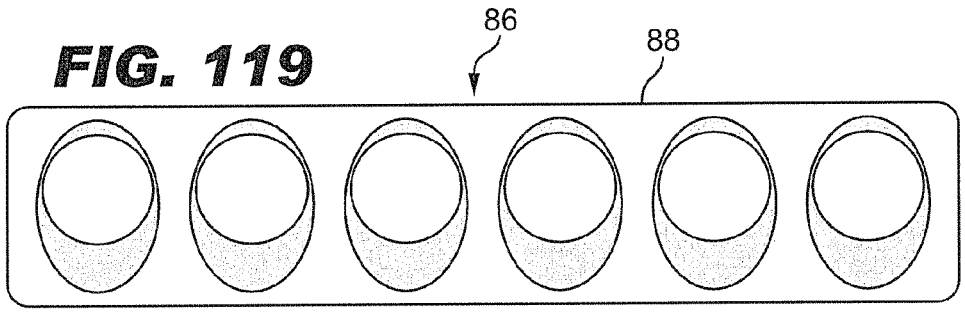
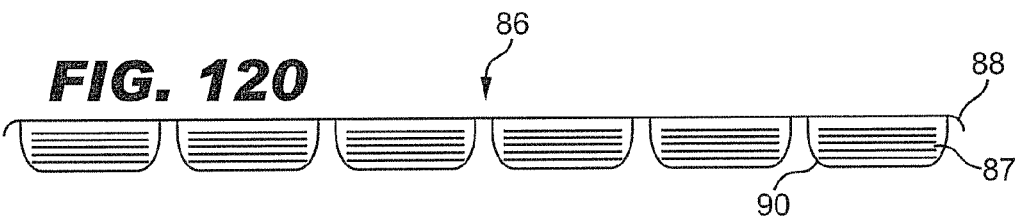
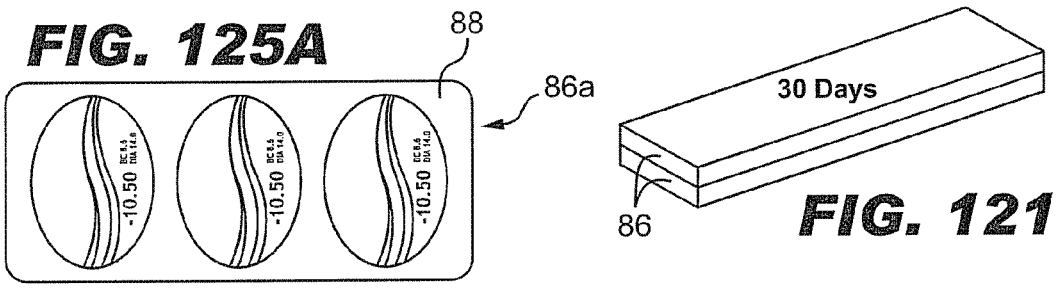
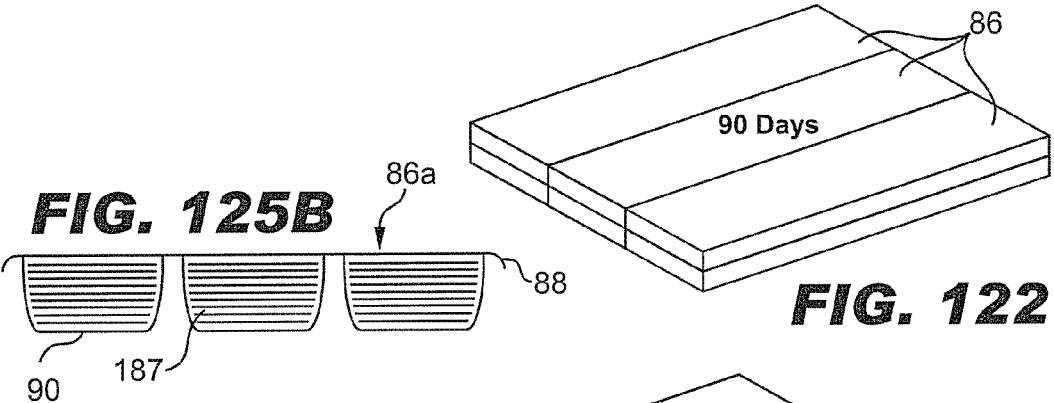
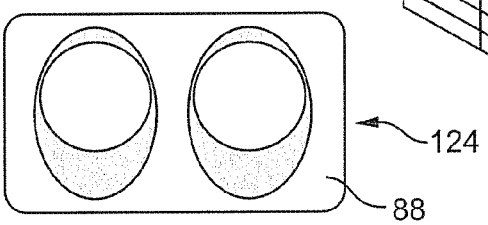
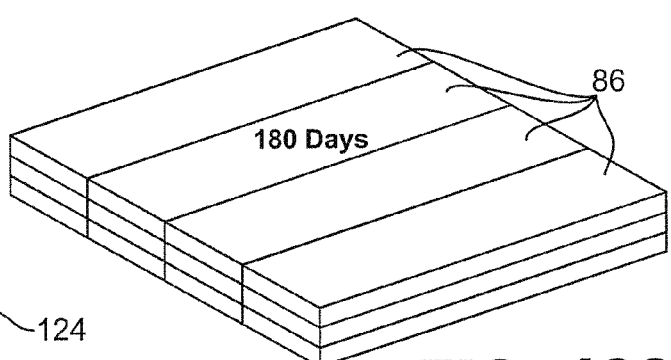

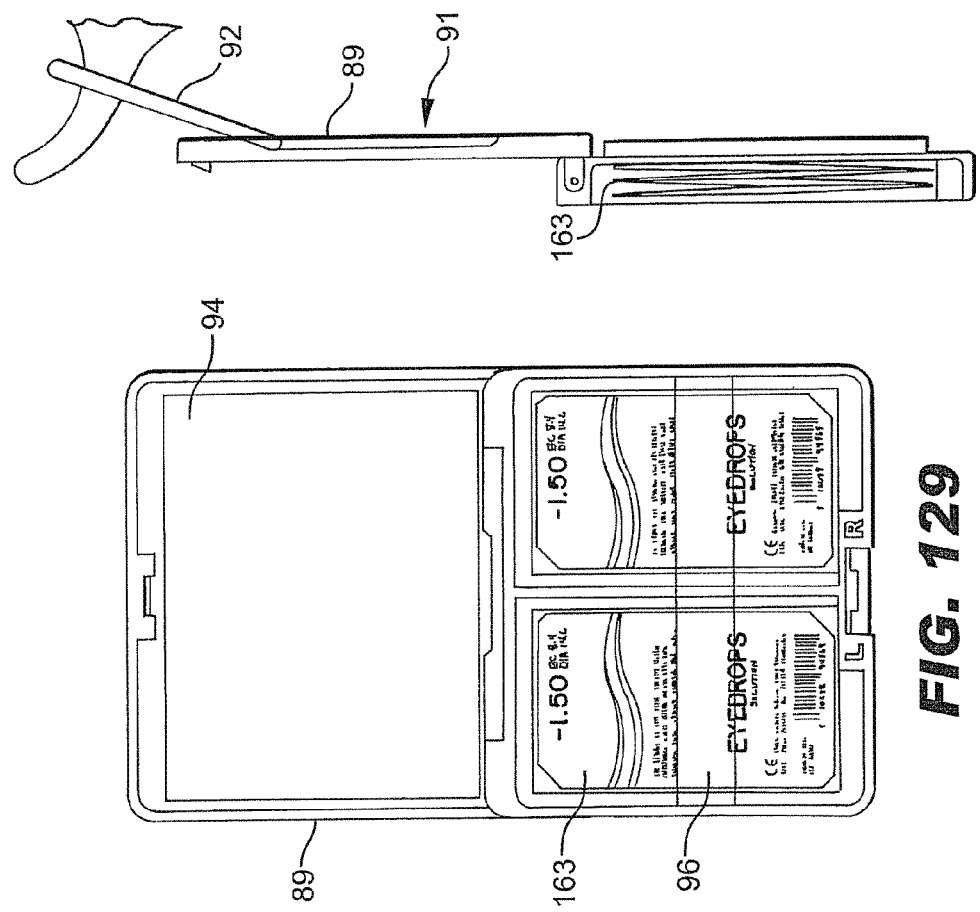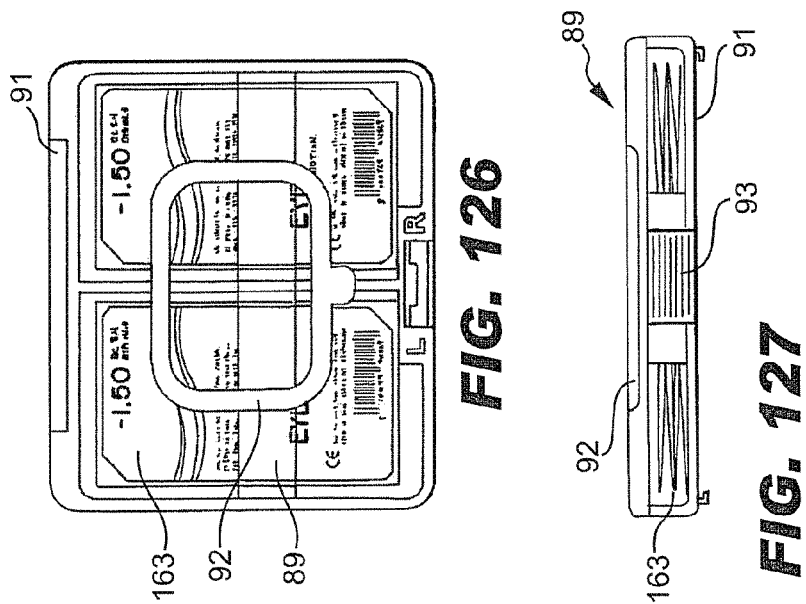

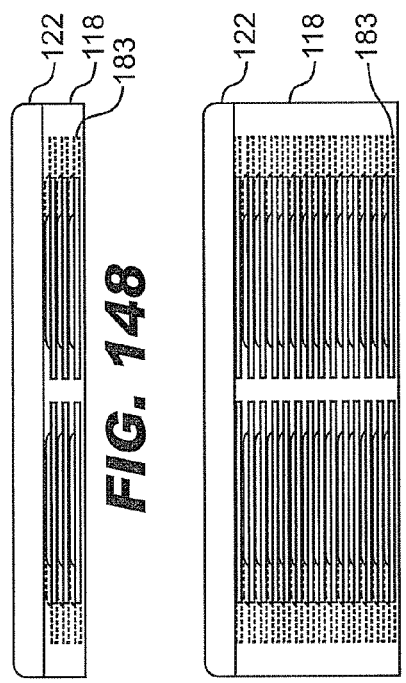
FIG. 147
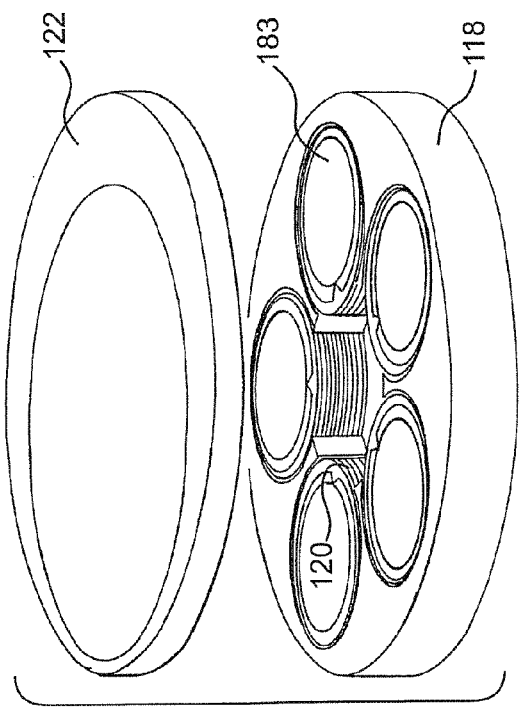
FIG. 148
FIG. 149
FIG. 145
FIG. 146
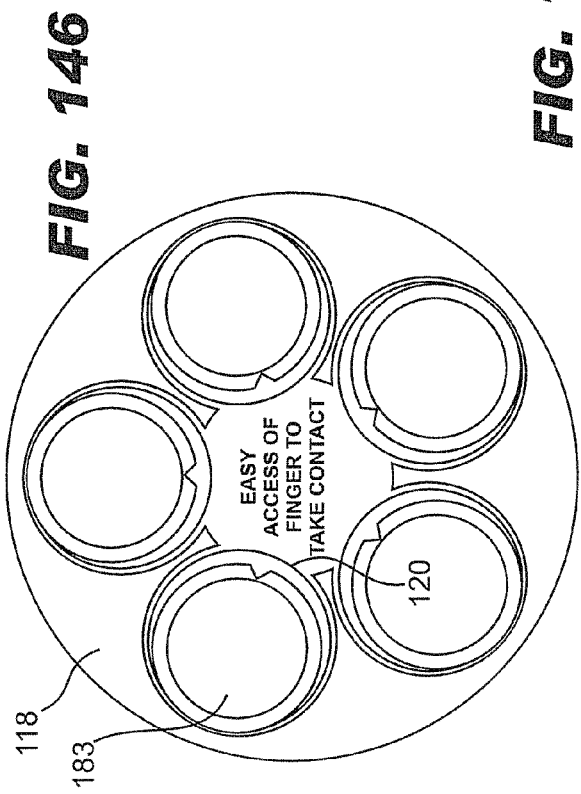
FIG. 144

PACKAGING FOR DISPOSABLE SOFT CONTACT LENSES

RELATED APPLICATIONS

The present application is a Divisional of U.S. application Ser. No. 15/444,102, filed Feb. 27, 2017, now U.S. Pat. No. 10,194,724, which is a Continuation of U.S. application Ser. No. 14/596,791, filed Jan. 14, 2015, now U.S. Pat. No. 9,615,639, which is a Divisional of U.S. application Ser. No. 12/892,890, filed Sep. 28, 2010, now U.S. Pat. No. 8,955,672, which is a Continuation of U.S. application Ser. No. 11/404,200, filed Apr. 13, 2006, now U.S. Pat. No. 7,828,137, which is a Division of U.S. application Ser. No. 10/789,961, filed Feb. 17, 2004, now U.S. Pat. No. 7,086,526, which is a Continuation-In-Part of U.S. application Ser. No. 10/781,321, now abandoned, which is a Continuation-In-Part of International Patent Application No. PCT/AUO2/01105, filed Aug. 7, 2002, designating the United States, all of which are hereby incorporated by reference in their entireties.

BACKGROUND

The present systems and methods relates-to contact lens packaging and more particularly, to an improved economic form of package for a contact lens which satisfies lens packaging criteria, including sterility and environmentally sensitive disposability.

PRIOR ART

Soft disposable contact lenses are commonly contained in disposable packages. As packaging adds to the overall cost of the lens, it should be made as economically as possible but without compromise to the requisite packaging criteria. The traditional blister pack packaging (shown in FIGS. 1-3) for disposable lenses (both bi-weekly and daily) consists of a polypropylene receptacle for the lens (herein after referred to as a "boat"), topped by a multi-layer film consisting of polyethylene, aluminum, a bonding agent and polypropylene. The boat is usually an injection molded plastic which has high stiffness but is capable of limited elastic deflection and includes a preformed recess. The boat is filled with a suitable storage solution, preferably saline, and receives a single lens in situ. The blister pack is then autoclaved using steam and pressure to terminal sterility. These blister packs are presented to the patient in boxes of individual packs (FIGS. 4-5) or as multiple blister strips.

The marketing objective is to present the contact lens to a patient in an aesthetically pleasing package that both satisfies the statutory requirements for sterility and stability, and allows the patient to remove the lens safely and easily. The packaging is used only once and is discarded after the lens is removed. This impacts the costs of the lens/package combination. In order to reduce the overall price of the lens to the patient, the cost of the packaging should be kept to an absolute minimum. In addition, disposability of lens packages necessitates conformity with ecological standards.

The lens must be kept hydrated while in the package. The package must be well sealed and should minimize water vapor transmission through the boat and laminated layer to maximize the shelf life and prevent drying out of the lens contained therein. In use, the user removes the laminated material from a flange formed on the boat by peeling back the cover to expose the lens immersed in a hydrating solution.

A variety of contact lens packages, particularly disposable contact lens packages including preformed blister packs, are taught in the prior art. As exemplified in the prior art, conventional wisdom in the contact lens industry has been to provide preformed stiff packaging which protects the lens from damage from applied load. Examples of typical prior art blister packs are shown in: U.S. Pat. Nos. 5,704,468; 4,392,569; 5,620,087; 5,620,088; 4,691,820; 5,823,327; 5,853,085; EP Publication No. 1092645 A1; and EP Publication No. 0 129 388.

Flexible retort packages are also known, however, not for use with contact lenses. U.S. Pat. No. 4,769,261 discloses a seal layer for use in large institutional sized retort pouches comprising an ABA film structure, wherein the A layers are each composed of a blend of a minor amount of an elastomer and a major amount of a polyolefin and the B layer is composed of a blend of a major amount of an elastomer and a minor amount of polyolefin. Retort pouches made with the ABA film structure as the seal layer exhibit improved impact strength. There is no teaching in the '261 patent to use a retort package for housing a contact lens.

There is a long felt need in the disposable contact lens industry to provide an economic, space-efficient, and convenient, disposable contact lens package without compromise to durability, sterility and utility of the lens.

SUMMARY

The present specification provides an economical package without compromise to statutory and medical requirements of contact lens packages.

The single-use package, in the embodiments described below, offers a number of advantages over the prior art blister pack concept. First, the single-use package is smaller and slimmer which lends itself to disposability and is ideal for traveling. Additionally, the number of packages in a secondary container may be increased, yet storage space for that secondary package, may be reduced.

The single-use package may be composed of foil sheets which stabilize light exposure and prevent oxygen transmission. Further, there is no air in the package, thus non-ballasted autoclaving is not required. The absence of air in the package contributes to lens stability in the package. Thus, the shelf-life of a contact lens in a single-use package may be extended. Overall, the single-use package is a more convenient and cost effective form of packaging.

Conventional contact lens packages are typically stiff and preformed with a profiled recess to house the lens therein. The preformed recess in the known packages is intended to ensure that the lens shape is maintained and is not deformed by the package. According to one exemplary embodiment, a contact lens package disclosed herein does not maintain the lens in an equilibrated position, but instead holds the lens in a flattened or compressed state.

According to another exemplary embodiment, the internal depth of a contact lens package may be less than the overall natural sagittal depth of the contact lens contained therein. Further, the single-use package may be flexible and not preformed, and may contribute to adjustments to the shape of the lens in the package.

Additionally, exemplary contact lens packaging disclosed herein may vary in stiffness. More particularly, stiffness of the contact lens package was previously thought essential to protect the lens. However, if wall stiffness is abandoned as an essential packaging criterion, alternative contact lens packages with significant space economy may be contemplated.

In one embodiment, a contact lens package includes a package with a contact lens therein, wherein the package has an internal depth which is less than an overall sagittal depth of the contact lens when the contact lens is in its equilibrated form.

In another exemplary embodiment, a contact lens package includes a blister package with a molded base, a cover and a contact lens therein, and the overall depth of the blister package is less than the natural sagittal depth of the contact lens therein.

In an additional exemplary embodiment, a method of removing a contact lens from a contact lens package includes the steps of: placing a package with a spring disc and a contact lens on an index finger; pushing the index finger through a center of the spring disc such that the contact lens rests on the tip of the index finger; and placing the contact lens that rests on the index finger into an eye.

In yet another exemplary embodiment, a contact lens package is removably adhered to a card.

An alternate embodiment provides a single use package for retaining a contact lens, with at least one barrier material defining an internal space for holding a contact lens; a medium in the space for maintaining lens hydration; and means to enable release of the lens from said space; where at least one barrier layer is formed from a homogenous, pliable material.

In an additional embodiment, a single-use package capable of holding a contact lens is provided. The package has two sheets of material; and a support member between the two sheets of material. The two sheets of material are sealed and the lens is confined in the package such that it is always maintained in the same orientation inside the package.

Also contemplated is a carton containing at least 90 single-use packages each with a contact lens therein, where each of the packages has an internal depth which is less than the overall sagittal depth of each of the contact lenses within the package.

In another exemplary embodiment, the a contact lens package with a contact lens therein, is configured such that when the package is opened, the lens is always oriented in the same position as when it was placed into the package.

In yet another exemplary embodiment, the a contact lens package container having a plurality of contact lenses therein is disclosed. The contact lens packages are dispensed such that as one contact lens package is removed, a next contact lens package to be dispensed is automatically moved into a position to be removed.

In another exemplary embodiment, a single-use package with a contact lens therein is provided. The package has an internal depth that is less than an overall sagittal depth of the contact lens in its equilibrated form, and the package comprises two sheets of material sealed together, and at least one of the sheets has printing thereon; and at least one corner that is not sealed so as to serve as an easy-open corner; wherein the contact lens therein is held in a flattened state while the package is sealed and returns to its natural state when the package is opened; and wherein the printing is selected from the group consisting of instructions for use and prescription information; and wherein at least one of the sheets of material is embossed to prevent the lens from sticking to the sheet, thus ensuring that the lens is presented in a predictable orientation when the package is opened.

Another embodiment is a single-use package with a contact lens therein. The package comprises two sheets of material sealed together; a spring disc between the sheets; and an amount of hydration medium; wherein the lens in maintained in a flattened state while the package is sealed.

Also contemplated is a method of dispensing a single-use contact lens package from a group of packages, the method comprising: providing a dispensing container having a plurality of contact lens packages therein; and removing at least one contact lens package from the dispenser.

Also provided is a method for opening a single-use contact lens package having an internal depth that is less than the overall sagittal depth of an equilibrated contact lens therein, the method comprising separating a first barrier layer from a second barrier layer.

In another embodiment, a package capable of holding a contact lens therein is disclosed. The package has at least one barrier layer of pliable packaging material forming at least first and second opposing surfaces which define an internal package space in which the contact lens is retained; a hydration medium in the space; and means for enabling release of the contact lens from the package; wherein the at least one barrier layer of material is flat and is flexible.

In an alternate embodiment, a set of retort-type single-use packages for holding contact lenses therein is provided. The packages each comprise: at least one layer of pliable package material forming at least first and second opposing surfaces which define an internal package space in which the contact lens is retained; a medium in the space for maintaining lens hydration; and means for enabling release of the contact lens from the package; wherein the package material is capable of assuming a generally planar configuration; and wherein the set is formed by joining at least two the packages end to end so that a single package may be torn away from an adjacent package via a frangible connection between the packages.

In another embodiment, a retort-type single-use package comprising an internal space for holding a contact lens and a medium for maintaining lens hydration therein is provided.

Also contemplated is a secondary package for a plurality of contact lens packages comprising a container, where the contact lens packages contained therein have an internal depth that is less than the natural sagittal depth of the contact lens therein; and wherein the container is a shape selected from the group consisting of a circle, rectangle, square, triangle, oval and symmetrical, asymmetrical and rounded variations thereof.

In another embodiment, a contact lens travel pack includes a container with a lid and a base, a plurality of contact lenses packages and a handle.

An additional embodiment provides a storage case for a plurality of contact lenses comprising a cover, a container for a plurality of contact lenses wherein the container comprises a lift-out insert.

Also contemplated is a dispensing case for a plurality of contact lenses comprising a cylindrical container wherein each of the two ends of the container open to dispense the contact lenses.

An alternate embodiment is a storage stand for a plurality of contact lens packages comprising a base and a wall extending from the base, wherein the wall comprises a means for the lenses to be attached thereto.

In another embodiment, a storage means for a plurality of contact lenses has a plurality of contact lens holder sheets with a narrow open slot; a plurality of contact lenses attached to the holder sheets; at least one container comprising a base with a narrow open guide and lid with a narrow open slot; and a stand comprising a base and a central extension. The holder sheets are stored within the container and the container slides onto the base.

In another embodiment, a contact lens delivery package comprising an aluminum coated envelope, a plurality of contact lens packages, and nitrogen gas, wherein the envelope is filled with the nitrogen gas prior to sealing.

An additional embodiment provides a package for retaining a contact lens therein, the package comprising at least one package wall defining an internal space for holding the contact lens; a medium in the space for maintaining lens hydration; means to enable release of the lens from said space; wherein the at least one wall is formed from a homogenous or multi-layer, pliable material.

In another embodiment, a kit of jointed single use pliable retort-type single use packages for each holding a contact lens is provided. Each single-use package is connected to at least one adjacent package.

A method of producing a disposable contact lens package is also disclosed herein. The method comprises the steps of taking a single sheet of pliable material; placing the contact lens on a surface of the sheet; dosing the surface of the material with a hydration maintenance medium; folding the material back on itself to define a space in which the contact lens is held; and sealing the envelope so that the contact lens is held in a sealed environment.

Another embodiment provides a method of making a single-use package with a contact lens therein, the method comprising the following: placing a spring disc over the contact lens; dosing the spring disc and contact lens with a minimum amount of hydration medium; placing one sheet of material on top of the spring disc and lens and placing one sheet of material on the bottom of the spring disc and contact lens; and sealing the top and bottom sheet of material.

In another embodiment, a method of making a single-use package with a contact lens therein is disclosed, wherein the package has a depth which is less than the overall sagittal depth of the contact lens, the method comprising the steps of placing the lens and a minimum amount of hydration medium between two sheets; and sealing the sheets together sterilizing the envelope and contents; allowing access to said lens by splitting, peeling or dividing said package along at least one edge.

BRIEF DESCRIPTION OF THE DRAWINGS

The accompanying drawing illustrates various embodiments of the present exemplary system and method and is a part of the specification. The illustrated embodiments are merely examples of the present system and method and do not limit the scope thereof.

FIG. 6 is a perspective view of a contact lens package opened to show embossing on the bottom sheet which has a convex indentation, according to one exemplary embodiment.

FIG. 7 is a perspective view of a second embodiment of a contact lens package like the embodiment of FIG. 6, but showing embossing on the top sheet which has a concave indentation, according to one exemplary embodiment.

FIG. 8 is a cross-sectional view of the single-use package of FIG. 6.

FIG. 9 is a cross-sectional view of the single-use package of FIG. 7.

FIG. 10 is an example of embossing that can be used in the packages of FIGS. 6-9, in an abstract pattern.

FIG. 11 is an example of embossing that can be used in the packages of FIGS. 6-9, in a grid pattern.

FIG. 12 is an example of embossing that can be used in the packages of FIGS. 6-9, with a logo.

FIG. 17 is an exploded perspective view of the single-use package of FIG. 15.

FIG. 18 is an exploded perspective view of an alternative embodiment of the single-use package of FIG. 15 with a netting.

FIG. 19 is a plan view of the single-use package of FIG. 15 showing its tear drop shape.

FIG. 20 is a plan view of a single-use package like that of FIG. 15 in a figure-eight shape.

FIG. 21 is a plan view of a single-use package like that of FIG. 15 in an asymmetrical tear drop shape.

FIG. 29 is a plan view of another embodiment of a single-use package with a first space for a contact lens having a cover and a second space for hydration medium that has a channel 36 to release hydration medium once separated from the single-use package.

FIG. 30 is a plan view of the single-use package of FIG. 29 with the cover removed.

FIG. 31 is a perspective view of the single-use package of FIG. 29 showing the cover being partially removed.

FIG. 32 is a side elevation view of the single-use package of FIG. 29.

FIG. 33 is a side elevation view of the single-use package of FIG. 29 with the cover partially peeled off.

FIG. 34 is a perspective view of the single-use package of FIG. 30 showing the first and second space of the single-use package being separated to release the hydration medium.

FIG. 61 is a plan view of one embodiment of a polypropylene spring disc for use in a single-use package.

FIG. 62 is a plan view of a second embodiment of a polypropylene spring disc for use in a single-use package.

FIG. 63 is a plan view showing the inside of a single-use package containing a third embodiment of a polypropylene spring disc and contact lens.

FIG. 64 is a cross-sectional view of the single-use package of FIG. 63 showing a polypropylene spring disc and a contact lens in a flattened state.

FIG. 65 is a plan view of the front of a single-use package with reliefs within the foil on either side of the single-use package for easy opening.

FIG. 66 is a plan view of the back view of a single-use package of FIG. 65.

FIG. 67 is a cross-sectional view of a single-use package of FIG. 63 showing a contact lens and polypropylene spring disc inside a single-use package, in a flattened configuration.

FIG. 68 is a cross-sectional view of the single-use package of FIG. 63 with the cover beginning to be peeled back and the spring disc and contact lens in an equilibrated state.

FIG. 69 is an exploded perspective view illustrating the construction of a single-use package containing a fourth embodiment of a spring disc.

FIG. 70A is a plan view of a fifth embodiment of a spring disc.

FIG. 70B is a side view of the embodiment of FIG. 70A showing the spring disc and contact lens in a flattened state.

FIG. 70C is a side view of the embodiment of FIG. 70A showing the spring disc and contact lens in an equilibrated state.

FIG. 71 is a plan view of a sixth embodiment of a spring disc.

FIG. 72 is a plan view of a seventh embodiment of a spring disc.

FIG. 73 is a plan view of an eighth embodiment of a spring disc.

FIG. 86 is a perspective view of a single-use package with the spring disc of

FIG. 70A with a contact lens thereon.

FIG. 111 is a perspective view of the cross-section of the single-use package of FIG. 110 showing the break-open edge being broken.

FIG. 112 is a perspective view of the polypropylene spring disc used in the embodiment of FIG. 111 and contact lens thereon.

FIG. 113 is a cross-sectional view of the single-use package of FIG. 110 with a break-open edge that has been broken and has the foil cover peeled away, allowing the polypropylene disc and contact lens to re-equilibrate.

FIG. 114 is a perspective view of a retort-type single-use package according to one exemplary embodiment.

FIG. 115 is a perspective view of the retort-type single-use package of FIG. 114 with the contact lens exposed by peeling a layer.

FIG. 116 is a plan view of a strip of retort-type single-use packages.

FIG. 117 is a plan view of the strip of retort-type single-use packages of FIG. 116 including a hydration medium pack.

FIG. 118 is an exploded perspective view of an envelope, containing a plurality of retort-type single-use packages, packaged in a secondary package containing a large number of envelopes holding retort-type single-use packages strips according to one exemplary embodiment.

FIG. 119 is a plan view of a secondary packaging for a plurality of single-use packages in which there are six stacks of five single-use packages in separate compartments.

FIG. 120 is a cross-sectional view of the secondary packaging of FIG. 119.

FIG. 121 is a perspective view of two of the secondary packages of FIG. 119 stacked on top of each other, providing a 30 day supply of daily contact lenses for each eye.

FIG. 122 is a perspective view of six of the secondary packages of FIG. 119, providing a 90 day supply of daily contact lenses for each eye.

FIG. 123 is a perspective view of twelve of the secondary packages of FIG. 119, providing a 180 day supply of daily contact lenses for each eye.

FIG. 124 is a plan view of a travel pack with two single-use packages.

FIG. 125A is a plan view of another embodiment of secondary packaging in which there are three compartments each containing ten single-use packages.

FIG. 125B is a cross-sectional view of the secondary packaging of FIG. 125A.

FIG. 126 is a plan view of a transparent travel package for a plurality of single-use packages.

FIG. 127 is a front elevation view of the travel package of FIG. 126.

FIG. 128 is a side elevation view of the travel package of FIG. 126.

FIG. 129 is a plan view of the travel package of FIG. 126 showing the inside of an open travel package holding a plurality of single-use packages, a sliding guide for the single-use package compartment and a mirror.

FIG. 130 is a side elevation view of the open travel package of FIG. 129 illustrating a means of hanging the travel package on a hook.

Figure 131:
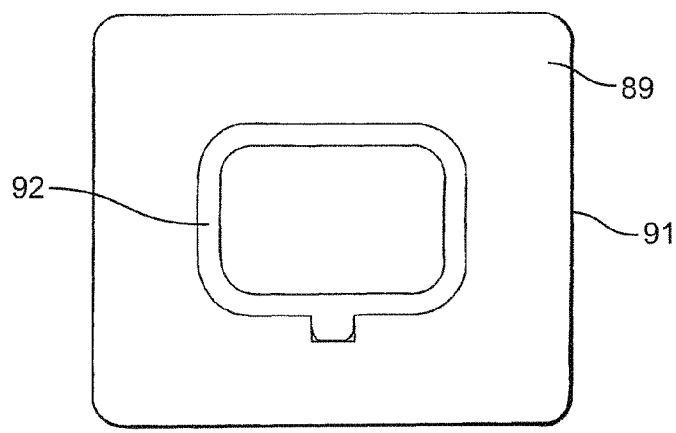

FIG. 131 is a plan view of a travel package similar to that of FIG. 126 but made of opaque material.

Figure 132:
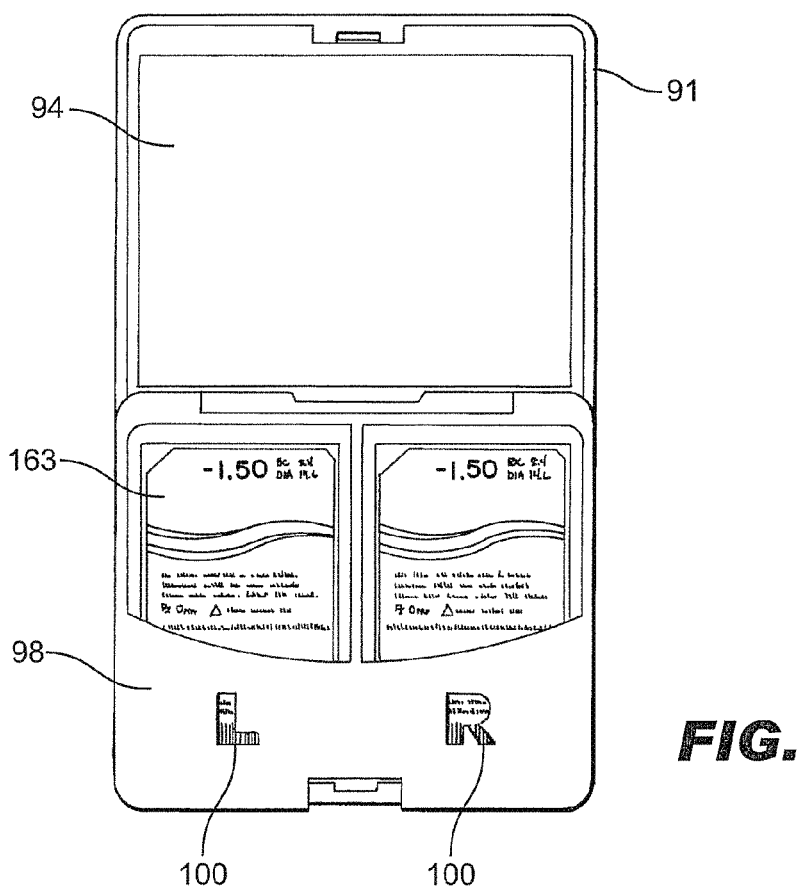

FIG. 132 is a plan view of an alternative embodiment of the travel package of FIG. 129 with a stationary guide for maintaining the single-use packages in compartments marked as "L" for left and "R" for right.

Figure 133:
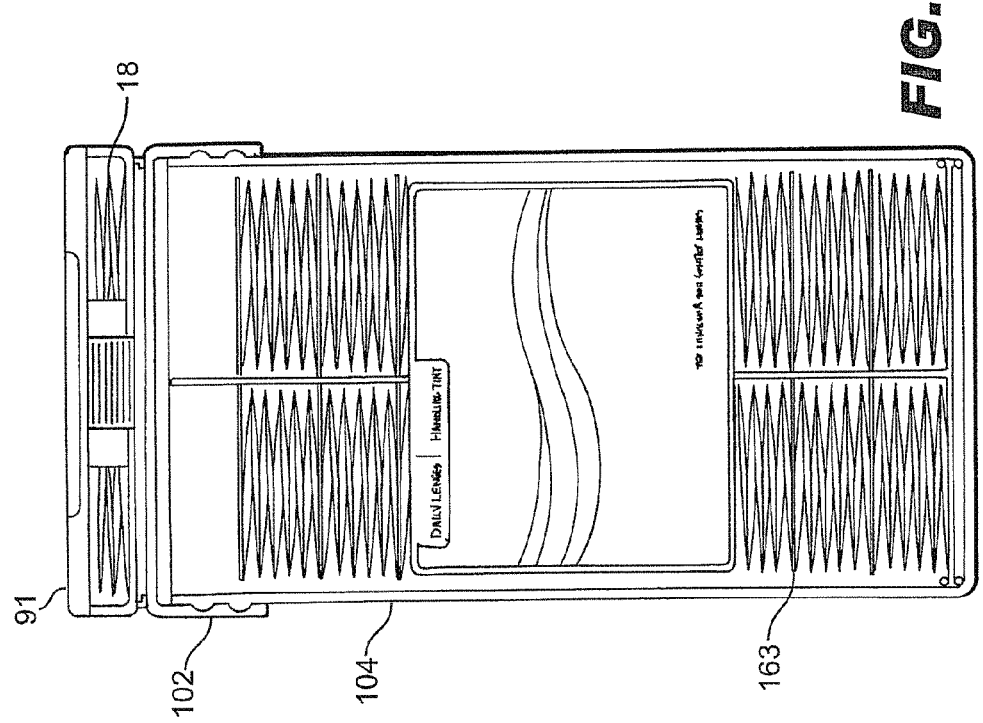

FIG. 133 is a side elevation view of a package capable of holding enough single-use packages for 90 days of contact lens use for both right and left eyes, and a travel package attached to the 90 day package.

Figure 134:
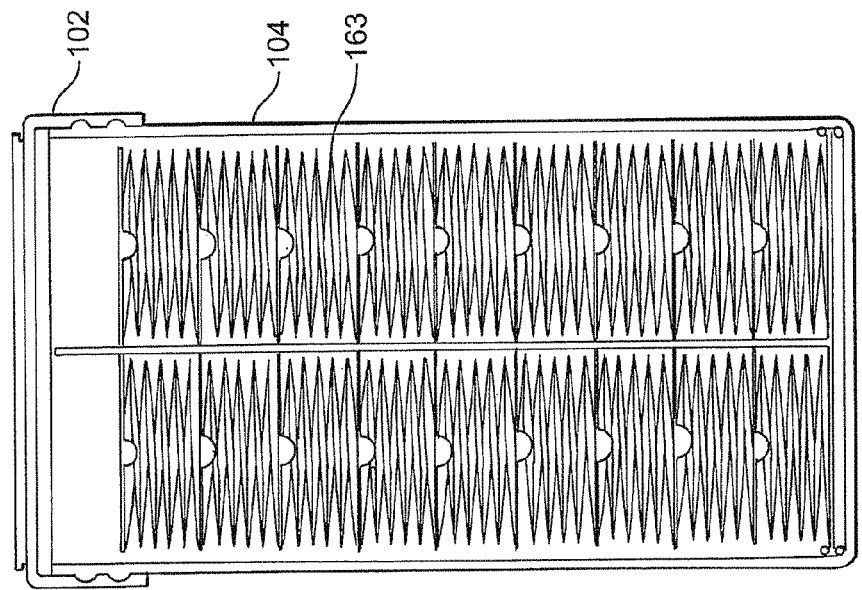

FIG. 134 is a side elevation view of the 90 day package of FIG. 133 without the travel package attached.

Figure 135:
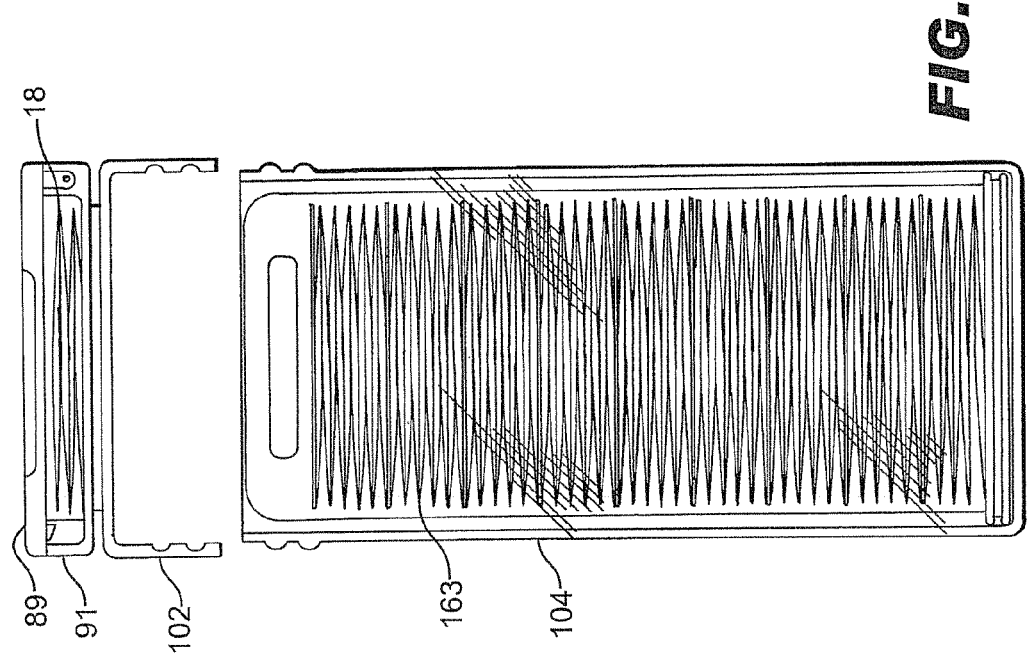

FIG. 135 is a side elevation view of the side of the 90 day package of FIG. 133 showing that the travel pack may be slid onto the cover of the 90 day package and then snapped into place.

Figure 136:
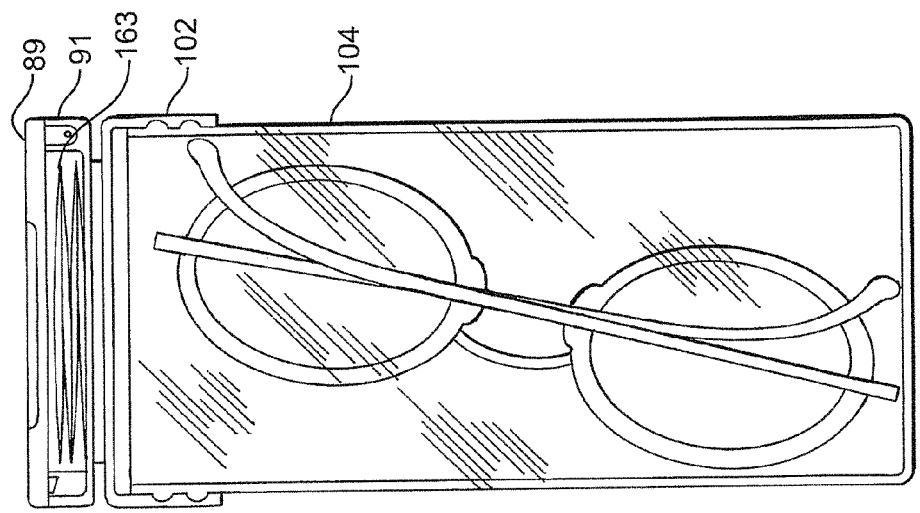

FIG. 136 is a side elevation view of the 90 day package with the travel pack of FIG. 133 showing that the 90 day package may be used as a sunglass case when all of the single-use packages have been removed.

Figures 137, 137A:
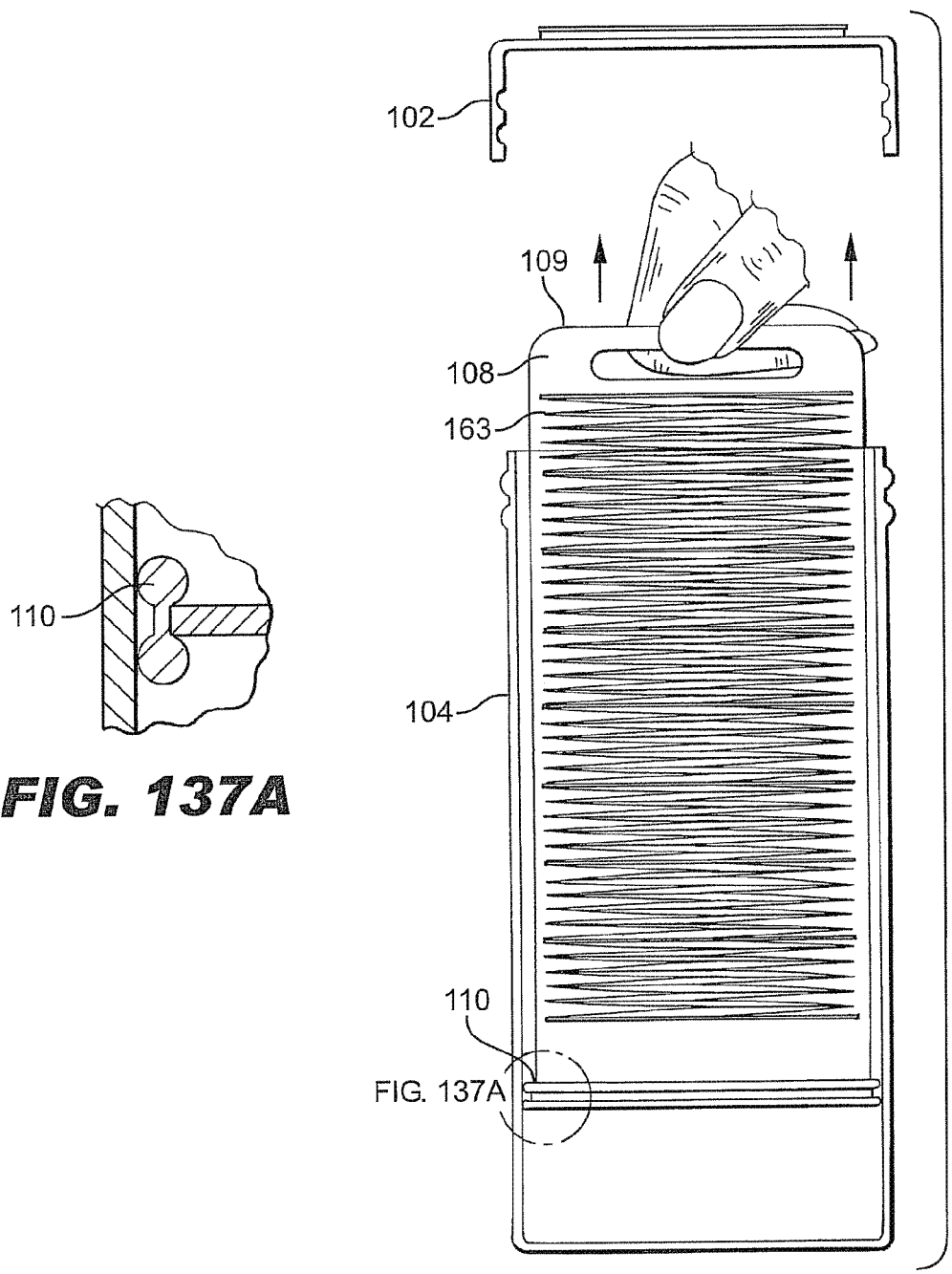

FIG. 137 is a side elevation view of the 90 day package of FIG. 134 showing that the insert containing the single-use packages may be lifted up and out of the package using the handle, once the cover to the 90 day package has been removed.

FIG. 137A is an exploded perspective view of a rubber stopper that prevents the insert containing the single-use packages from slipping down into the 90 day package.

Figure 138A:
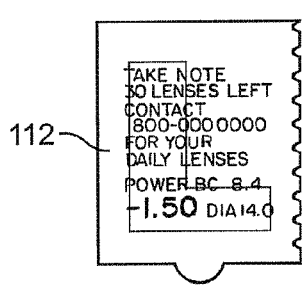
Figure 138B:
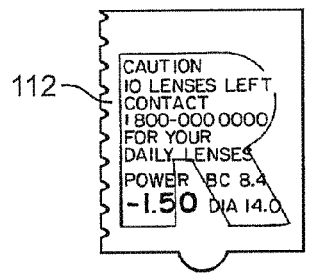
Figure 138:
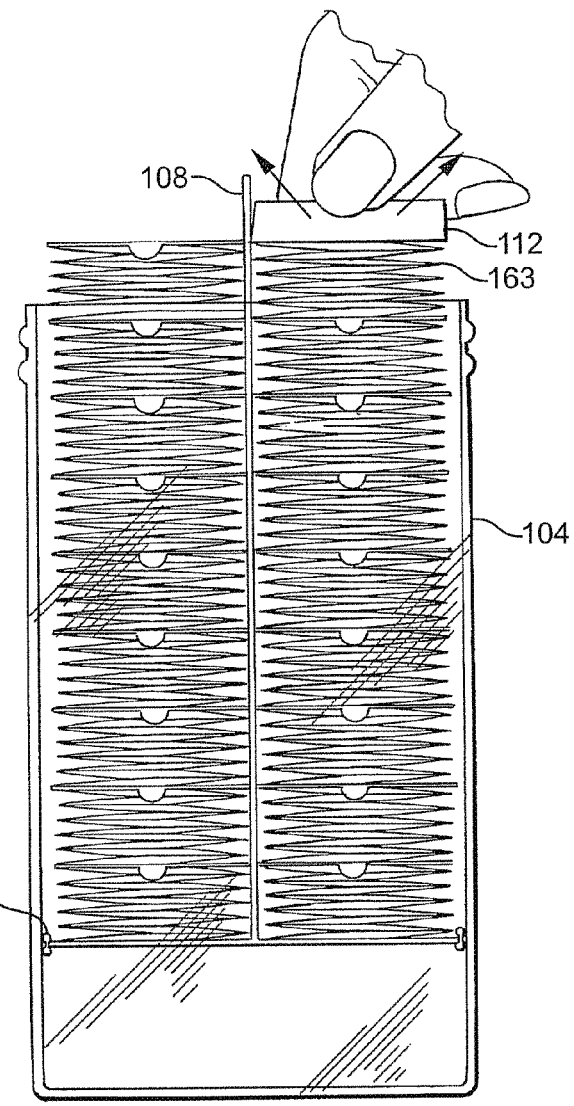

FIG. 138 is a side elevation view of the back of a 90 day package showing that a tab and strip of single-use packages being lifted out of the 90 day package.

FIG. 138A is a plan view of a tab that indicates there are only 30 contact lenses remaining in the 90 day package, as well as prescription and re-order information.

FIG. 138B is a plan view of a tab that indicates there are only 10 lenses remaining in the 90 day package as well as prescription and re-order information.

Figure 139:
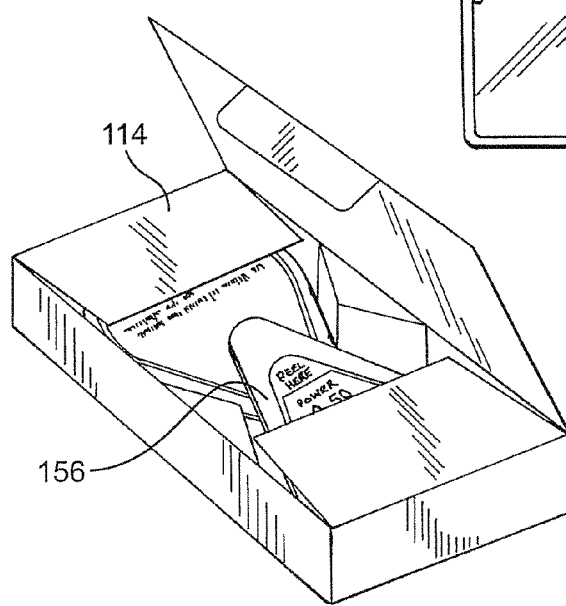

FIG. 139 is a perspective view of the single-use package secondary packaging container with a plurality of single-use packages therein.

Figure 140:
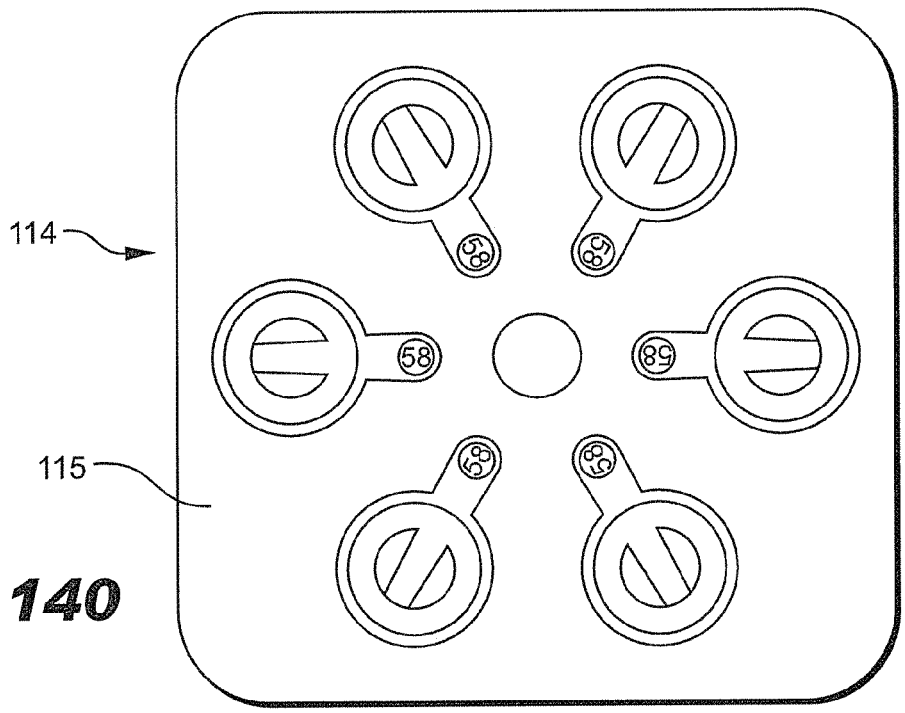

FIG. 140 is a plan view of the front of a single-use package holder sheet for a plurality of single-use packages wherein the single-use packages are arranged in a circular configuration.

Figure 141:
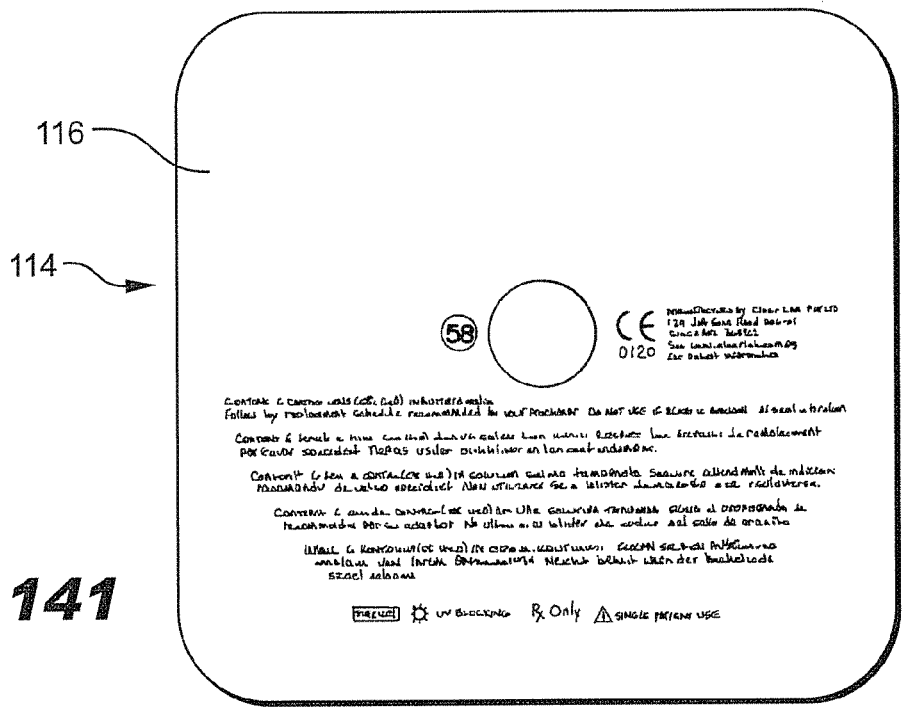

FIG. 141 is a plan view of the back of the holder sheet of FIG. 140.

Figure 142:
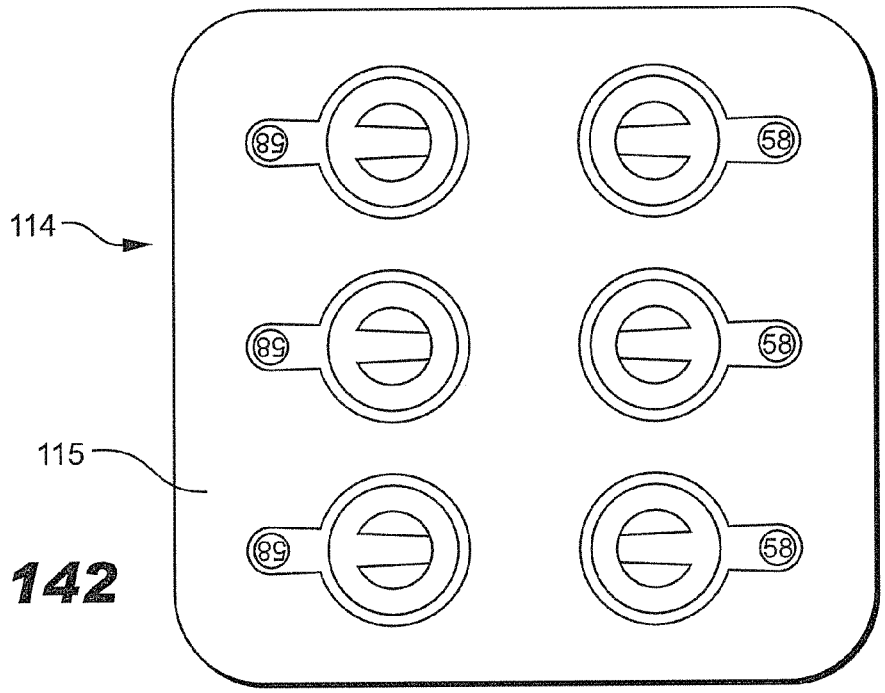

FIG. 142 is a plan view of the front of a single-use package holder sheet for a plurality of single-use packages wherein the single-use packages are arranged in two parallel rows.

Figure 143:
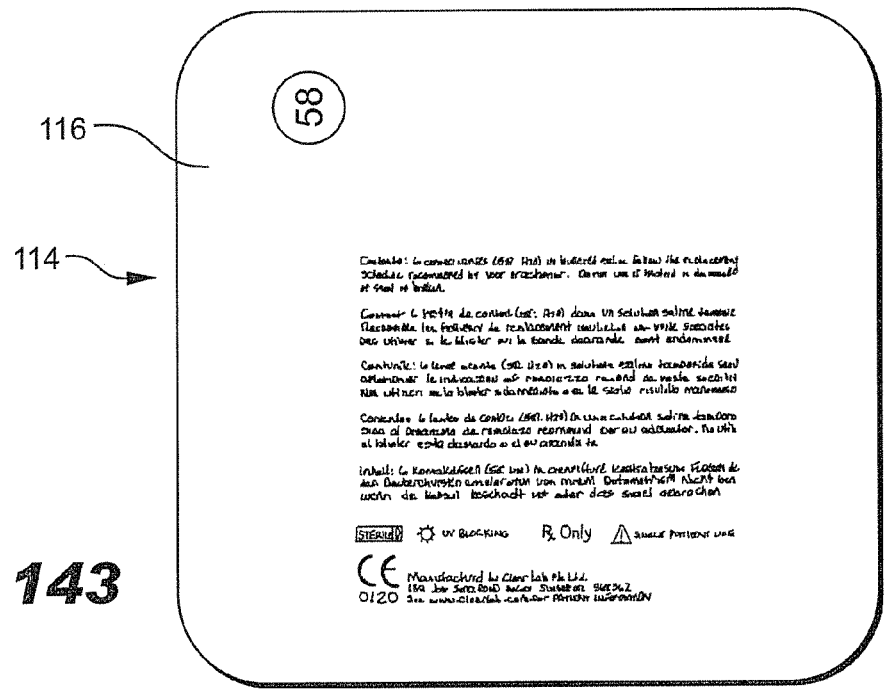

FIG. 143 is a plan view of the back of the holder sheet of FIG. 142.

FIG. 144 is a plan view of a blister-type single-use package of another exemplary embodiment.

FIG. 145 is a side elevation view of a stack of the blister-type single-use packages of FIG. 144.

FIG. 146 is a plan view of a secondary packaging container for a plurality of the blister-type single-use packages of FIG. 144 arranged in a circular configuration.

FIG. 147 is an exploded perspective view of the secondary packaging container of FIG. 146 also showing a lid.

FIG. 148 is a cross-sectional view of the secondary packaging container of FIG. 147 in which there is a 30 day supply of contact lenses.

FIG. 149 is a cross-sectional view of another embodiment of a secondary packaging container like that of FIG. 147 in which there is a 90 day supply of contact lenses.

Figure 150:
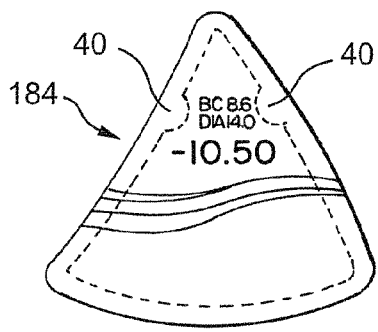

FIG. 150 is a plan view of another embodiment of a single-use package with a rounded asymmetrical triangle shape.

Figure 151:
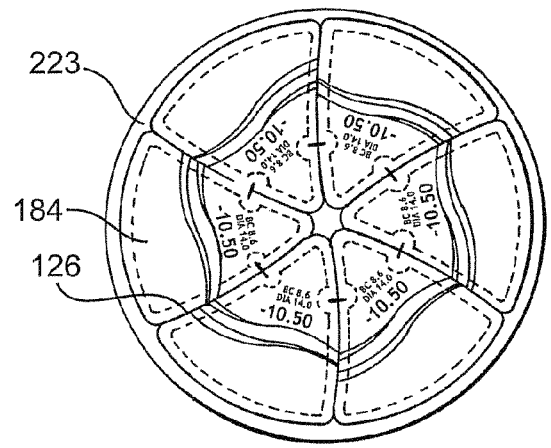

FIG. 151 is a plan view of a combination of six of the single-use packages of FIG. 150 in a circular arrangement.

Figure 152:
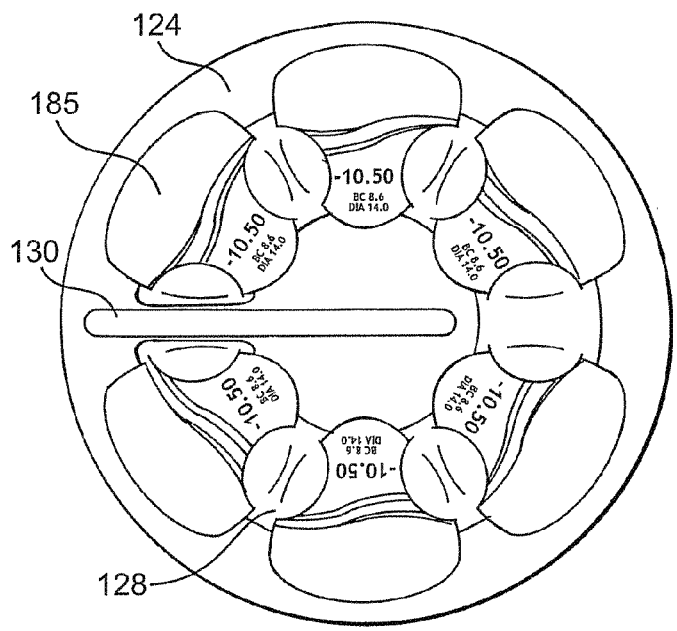

FIG. 152 is a plan view of a donut-shaped single-use package holder sheet.

Figure 153:
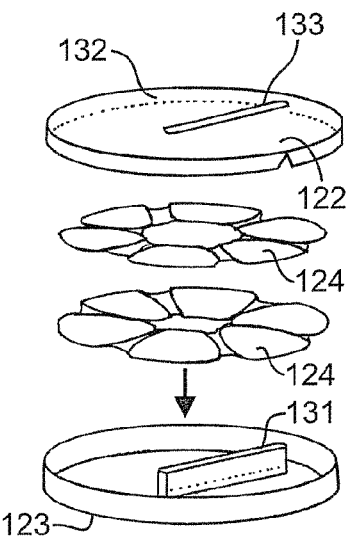

FIG. 153 is an exploded perspective view of a plurality of the holder sheets of FIG. 152 being placed into a round box.

Figure 154:
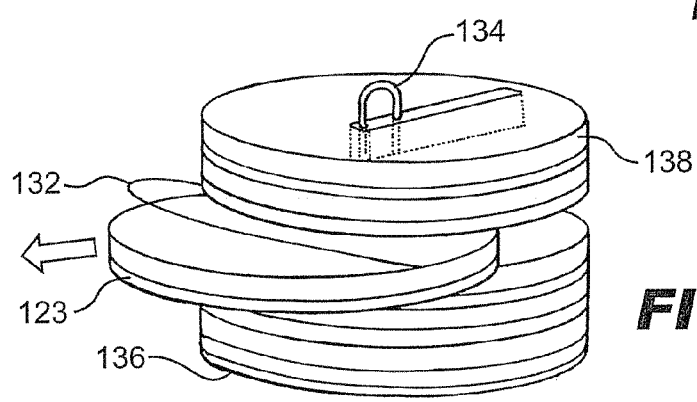

FIG. 154 is a perspective view of a stand for containing a plurality of the boxes of FIG. 153.

Figure 155:
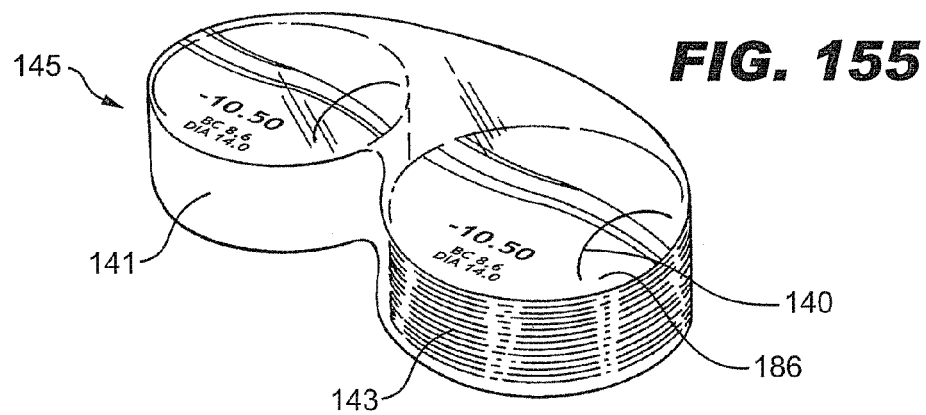

FIG. 155 is a perspective view of another embodiment of a secondary package having an eye-mask shaped and containing a plurality of round single-use packages.

Figure 156:
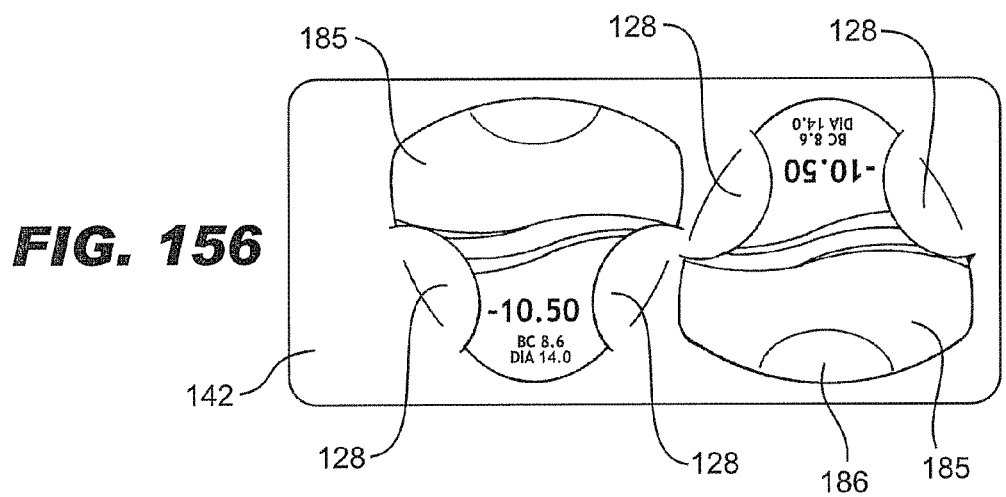

FIG. 156 is a plan view of two single-use packages clipped onto a sheet for easy transport.

Figure 157:
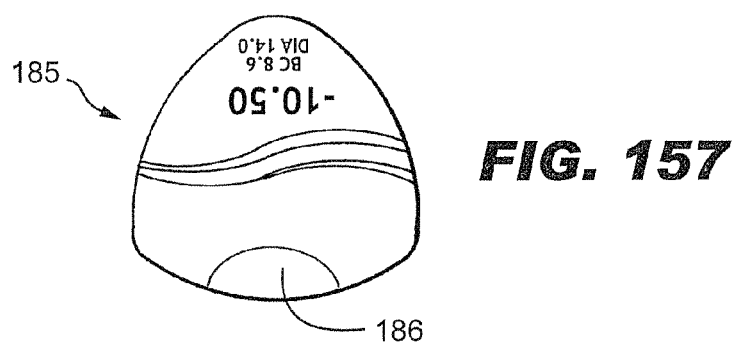

FIG. 157 is a plan view of another exemplary single-use package with a rounded triangle shape.

Figure 158:
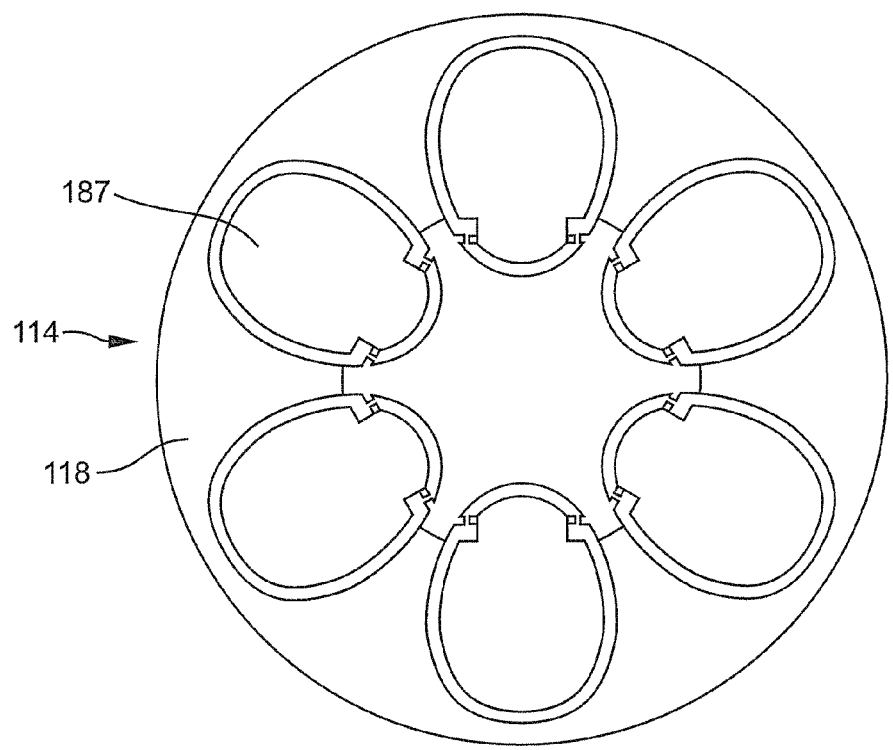

FIG. 158 is a plan view of a circular secondary packaging container which holds a 30 day supply of oval shaped single-use packages arranged in a circular configuration.

Figure 159:
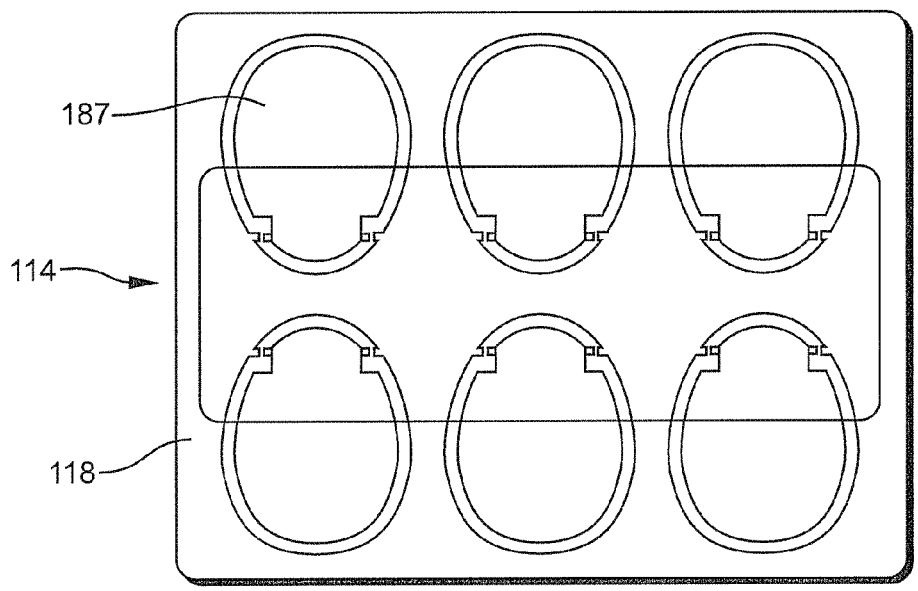

FIG. 159 is a plan view of another exemplary embodiment in which a rectangular secondary packaging container holds a 30 day supply of single-use packages arranged in two parallel rows.

Figure 160:
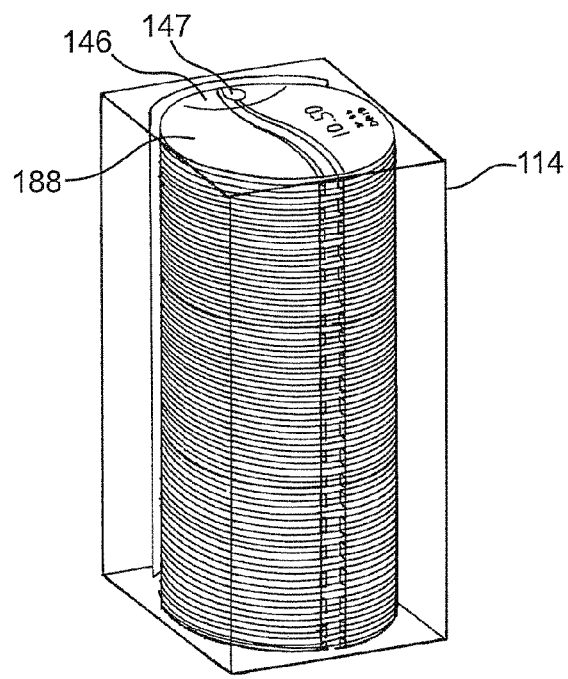

FIG. 160 is a perspective view of a secondary box for delivery of a plurality of single-use packages.

Figure 161:
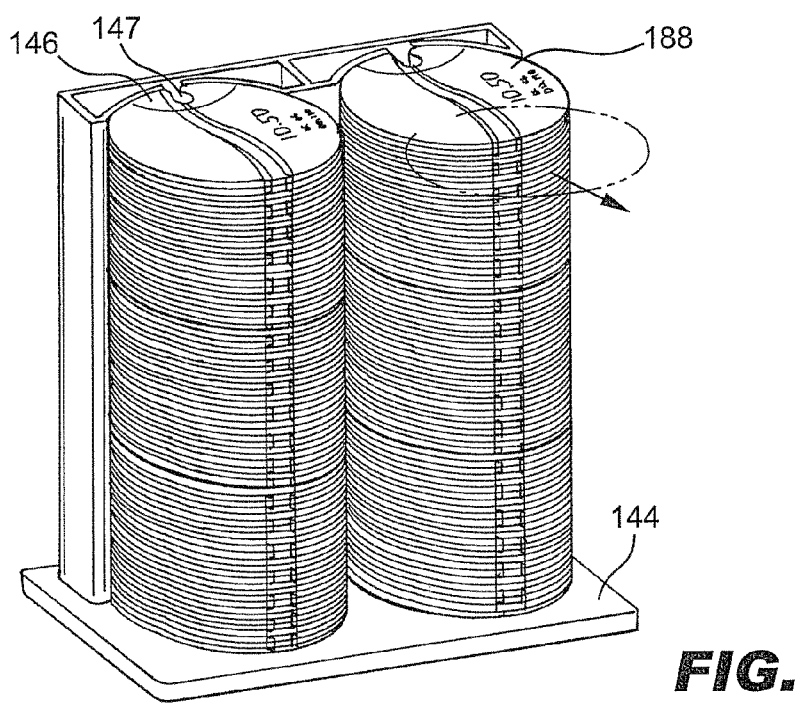

FIG. 161 is a perspective view of a stand for a 90 day supply of round single-use packages.

Figure 162:
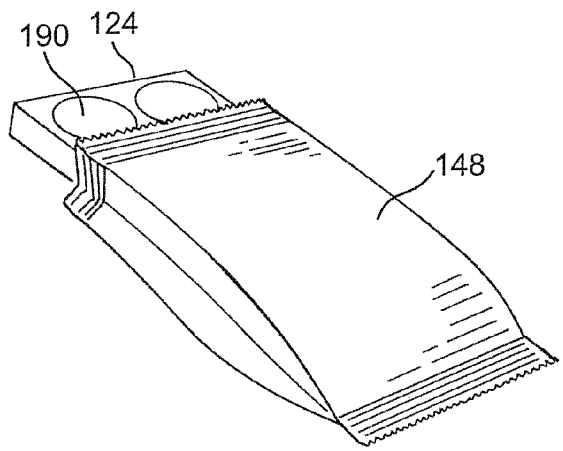

FIG. 162 is a perspective view of a delivery package according to one exemplary embodiment comprising an aluminum-coated envelope with a plurality of single-use packages therein.

Figure 163:
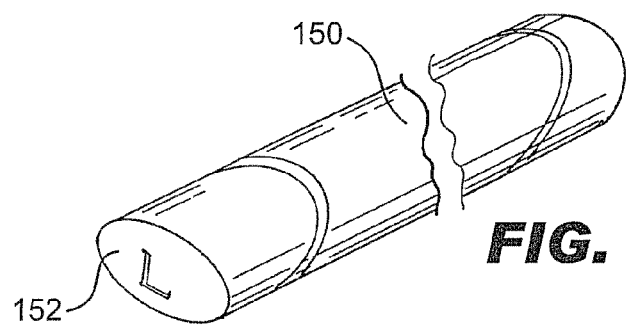

FIG. 163 is a perspective view of a single-use package dispensing case according to one exemplary embodiment.

Figure 164:
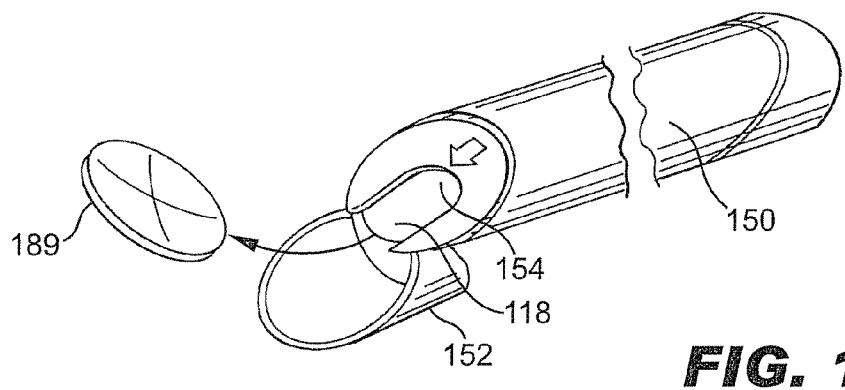

FIG. 164 is a perspective view of the single-use package dispensing case of FIG. 163 with one end opened and a single-use package removed.

Throughout the drawing, identical reference numbers designate similar, but not necessarily identical, elements.

DETAILED DESCRIPTION

The present exemplary systems and methods will now be described according to exemplary, but non-limiting, embodiments and with reference to the accompanying illustrations.

The term "internal depth" means the depth of a contact lens holding area within the contact lens package determined by subtracting the height of the combined opposing wall layers making up the contact lens holding area of the package from the total height of the contact lens holding area of the package when the package is lying on a flat surface.

The term "sagittal depth" means the total height of a contact lens resting in a relaxed state on a flat surface.

Referring to a contact lens in its "equilibrated state" means that the contact lens is in a resting state unrestricted by any external forces affecting its shape or height.

Throughout the specification the term homogenous refers to a package wall formed from a single layer (i.e. non-laminated layer) of the same material. Many of the packages described as being made from a homogenous single layer material may also be made from a multi-layer, laminated, material which may be formed from a combination of suitable plastics or a combination of suitable plastics and a metallic layer as described herein.

Figure 1:
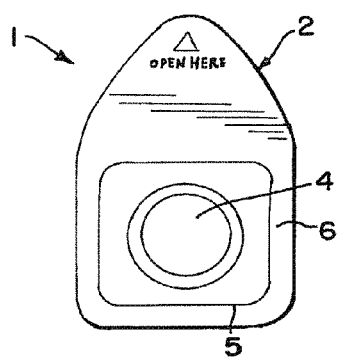
FIG. 1 is a plan view of a typical prior art disposable blister contact lens package.
Figure 2:
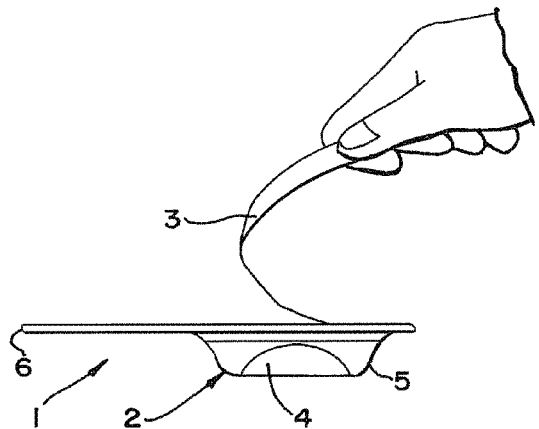
FIG. 2 is a side elevation of the package of FIG. 1 with the lid peeled away to release the contact lens therein.
Figure 3:
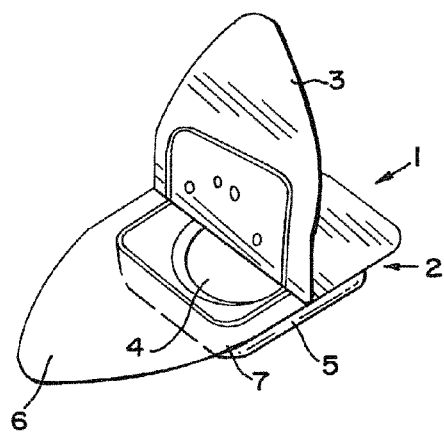
FIG. 3 is a perspective view of the partially opened package of FIG. 2.

Referring to FIGS. 1 and 2, there is shown a typical prior art disposable blister contact lens package 1 which is formed in two parts. The package 1 comprises a blister pack member 2 which is sealed by a membrane 3 forming a lid on the package 1 and which may be peeled away to release a contact lens 4 therein. In FIG. 3, the package of FIG. 2 is shown with the membrane 3 peeled away to expose the contact lens 4. Typically, the member 2 will be a preformed blister pack and include a profiled recess 5 which provides a recess in which a lens may be placed. The member 2 is typically injection molded and the package is completed with a sealing membrane 3 which mates with a flange 6 to create a sterile seal. The contact lens 4 is immersed in a solution 7 which keeps the lens hydrated until it is removed from the pack. The injection molded pre-form makes this an expensive package to manufacture, with the result that the contact lens will inevitably be more expensive for the consumer.

Figure 4:
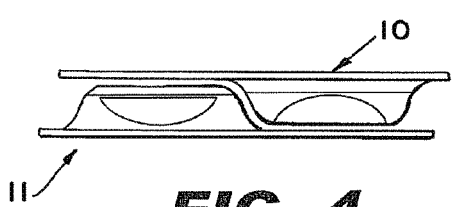
FIG. 4 is a side elevation view showing a stacking arrangement for two identical prior art contact lens packages according to one embodiment.
Figure 5:
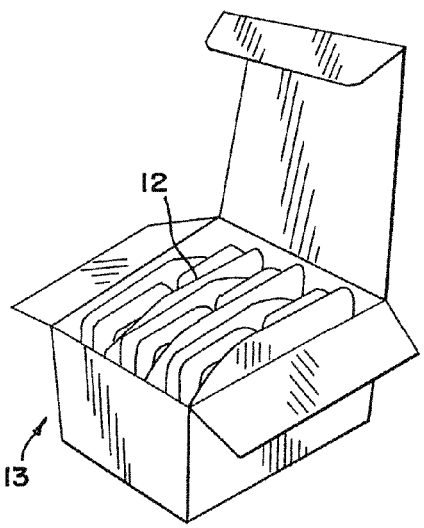
FIG. 5 is a perspective view showing a plurality of blister packs stacked as in FIG. 4 and contained in a carton.

FIG. 4 shows a stacking arrangement for two identical prior art contact lens packages 10 and 11. It can be seen from FIG. 4 that although two packs conveniently inter-fit, they take up a thickness greater than the thickness (or depth) of two packs. Ideally, a lens package should take up as little space as possible considering the relatively small size of a contact lens. Economy of storage space is a critical issue where lenses are mass produced. The existing blister packs take up a disproportionate amount of space relative to the size of the lens, leading to increased handling and storage costs. FIG. 5 shows a plurality of like blister packs 12 stacked as in FIG. 4 and retained in a carton 13. This bulky, inconvenient, and materials-intensive form of lens packaging exists as a result of conventional wisdom which suggests that lenses can only be stacked in rigid containers which isolate the lens from external load.

Figure 13:
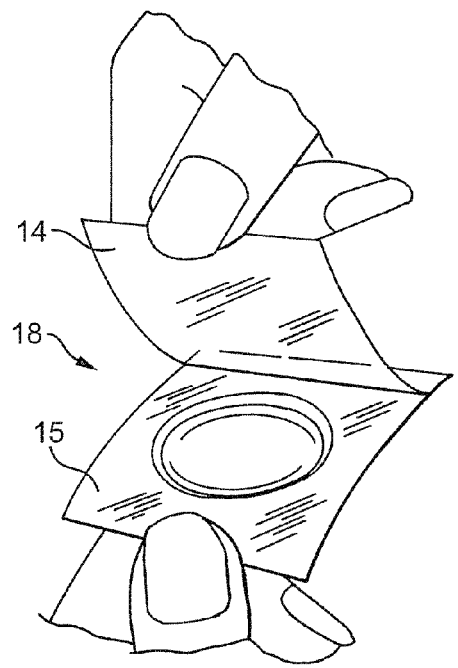
FIG. 13 is a perspective view of a single-use package made from two dissimilar, transparent materials and illustrating a method of opening the package having a depression which contains the contact lens.
Figure 14:
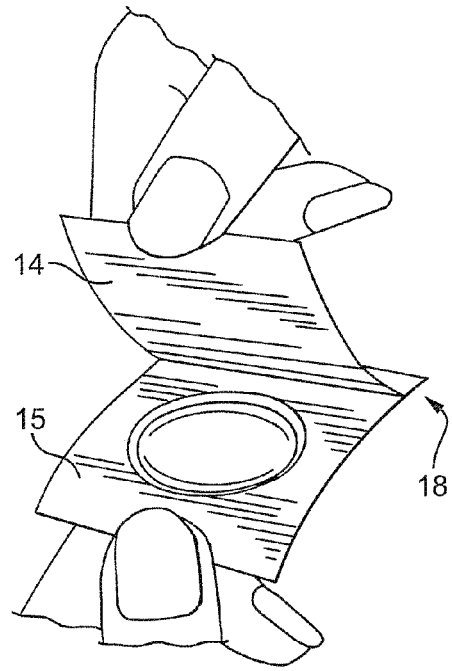
FIG. 14 is a perspective view of a single-use package made from two similar, opaque materials and illustrating a method of opening the package having a depression which contains the contact lens.
Figure 15:
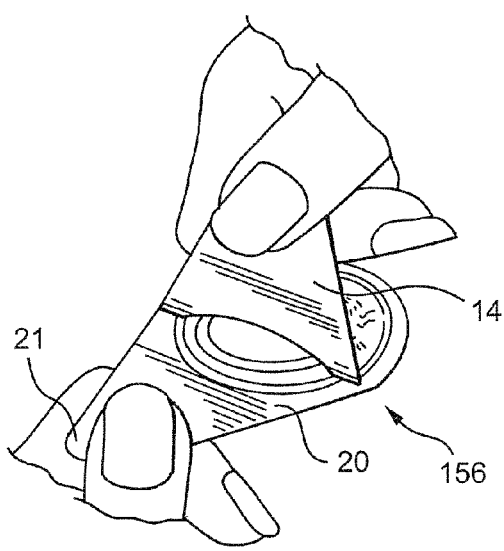
FIG. 15 is a perspective view of a partially opened single-use package constructed with a support member, according to one exemplary embodiment.
Figure 16:
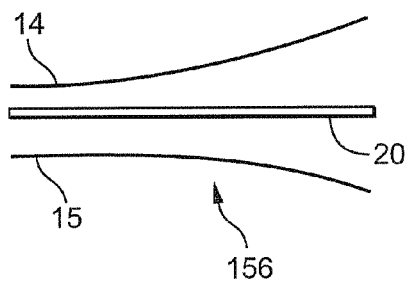
FIG. 16 is an exploded side view of the single-use package of FIG. 15.

In one exemplary embodiment of the present single-use package shown in FIGS. 6 and 8, the single-use package 18 consists of a first sheet 14 and a second sheet 15 of material sealed together. In this embodiment, one of the two sheets 15 is embossed 16 and also has a convex indentation 19. The embossing 16 aids the release of the lens 4 as it prevents the lens 4 from adhering to the embossed sheet 15, as shown in FIG. 8. Therefore, it is possible to have the contact lens 4 present in a predictable orientation upon opening of the single-use package 18. As shown in the alternate embodiment of FIGS. 7 and 9, the embossed surface 16a may alternatively be on the top sheet 14a, which in this example, also has a concave indentation 19a. As shown in FIG. 9, the contact lens in this example adheres to the bottom, non-embossed sheet. The embossing 16 may take numerous forms, for example, abstract patterns, grids and logos, as shown in FIGS. 10-12. Alternatively, FIGS. 13 and 14 show exemplary embodiments in which the single-use package 18 has no embossing. The sheets 14 and 15 may be opaque, transparent or colored, such as white or light green. If the sheets are colored, the color may be displayed inwardly toward a contact lens so that the lens may be easily seen. In addition, the sheets 14 and 15 may have printing thereon. Such printing may include, for example, symbols (such as text, diagrams, drawings), prescription, instructions, and manufacture information. This printing may be on the outside of the package, or more preferably, displayed inwardly toward the contact lens (when the package is sealed), which will increase visibility of the contact lens.

In another embodiment, shown in FIGS. 15-17 and 19, the single-use package 156 includes a support member 20 disposed between the sheets 14 and 15. The support member 20 encircles the contact lens 4 within the single-use package 156. The support member 20 may be flexible rigid and may be, for example, composed of any suitable polymers such as polypropylene (PP), polypropylene copolymer (PPCO), polymethylpentene (TPX), polycarbonate (PC), polysulphone (PSE), polyethylene naphthalate (PEN), cyclic olefin copolymer (COC), or fluorinated ethylene propylene (FEP), or other similar material. The support member 20 does not change the flat profile of the single-use package 156. Further, the thickness of the support member 20 is such that the single-use package 156, when sealed, still has a depth that is less than the natural sagittal depth of the contact lens 4. The support member 20 may also serve as a handle 21 (FIG. 15) to assist in moving or opening the single-use package 156. The handle area 21 may optionally have a cut out 24 that further assists gripping the single-use package 18 as shown in FIG. 17.

In another embodiment illustrated in FIG. 18, the support member 20a has mesh-like netting 22. The netting 22 serves as an additional support for the contact lens 4 as the lens rests upon the netting 22 when in the single-use package 157. The netting 22 may be composed of any suitable polymeric material such as: polypropylene (PP), polypropylene copolymer (PPCO), polymethylpentene (TPX), polycarbonate (PC), polysulphone (PSE), polyethylene naphthalate (PEN), cyclic olefin copolymer (COC), or fluorinated ethylene propylene (FEP), or other similar material.

The single-use package, with or without the support member 20, may have a variety of shapes. For example, the single-use package may be a square, rectangle, oval, round, tear shaped, figure eight, triangle, and combinations thereof, all of which may be symmetrical, asymmetrical, straight edged or rounded. Additional shapes are acceptable as long as they may accommodate a soft contact lens.

Figure 22:
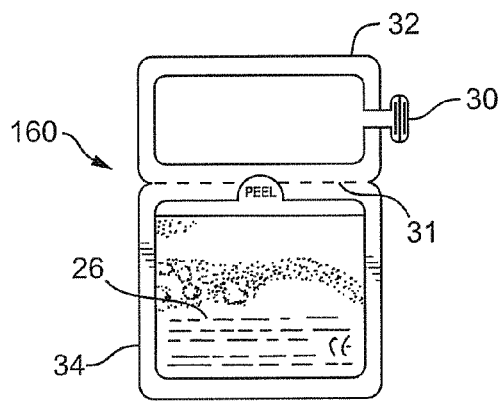
FIG. 22 is a plan view of a single-use package with a first space for a contact lens having a foil covering and a second space for hydration medium with a cap, according to one exemplary embodiment.
Figure 23:
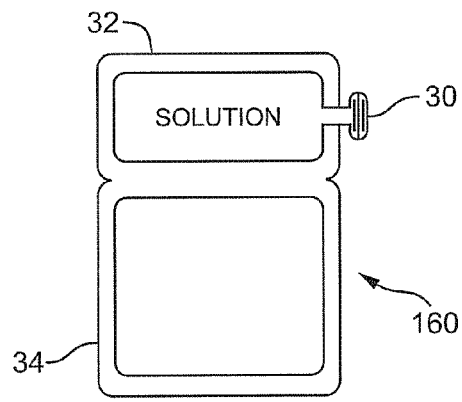
FIG. 23 is a plan view of the single-use package of FIG. 22 without the cover that encloses the lens.
Figure 24:
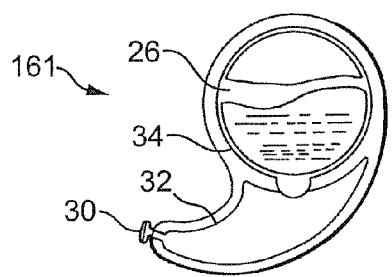
FIG. 24 is a plan view of a tear drop shaped single-use package with a first space for a contact lens having a foil covering and a second space for hydration medium with a cap.
Figure 25:
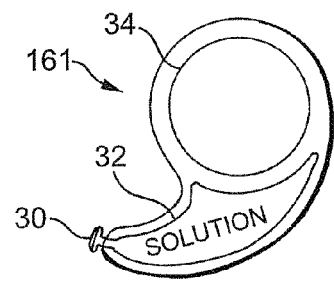
FIG. 25 is a plan view of the single-use package of FIG. 24 without the cover that encloses the lens.
Figure 26:
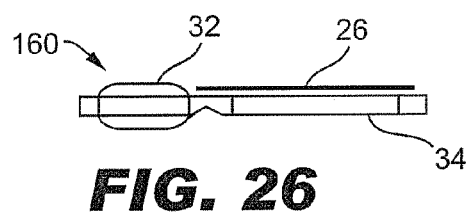
FIG. 26 is a side elevation view of the single-use package of FIG. 22 with the cover intact.
Figure 27:
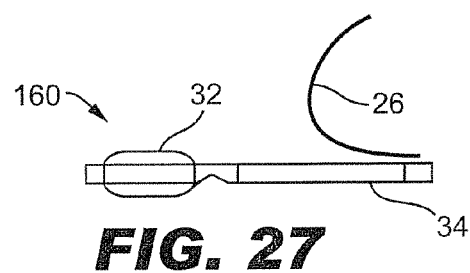
FIG. 27 is a side elevation view of the single-use package of FIG. 22 with the cover partially peeled off.
Figure 28:
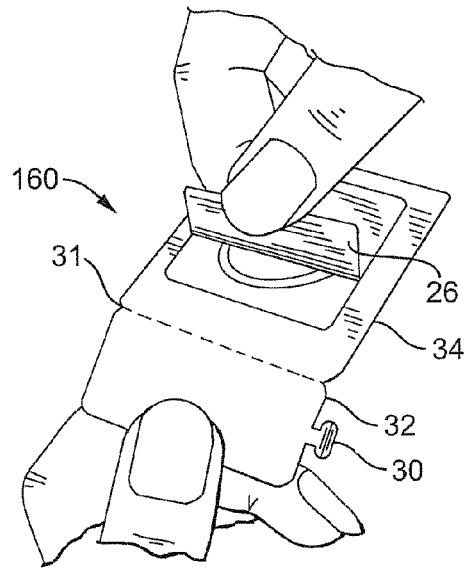
FIG. 28 is a perspective view of the single-use package of FIG. 22 showing the cover being peeled off.
Figure 35:
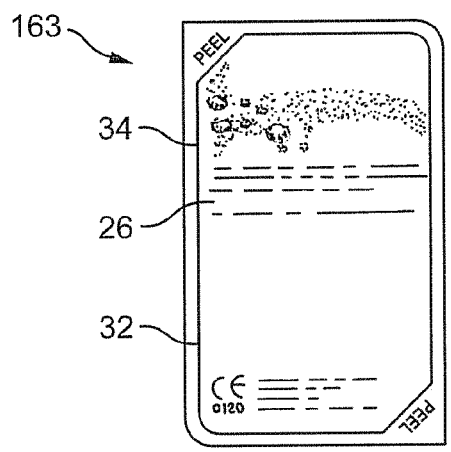
FIG. 35 is a plan view of another embodiment of a single-use package with a first space for a contact lens and a second space for hydration medium, both of which have foil covers.
Figure 36:
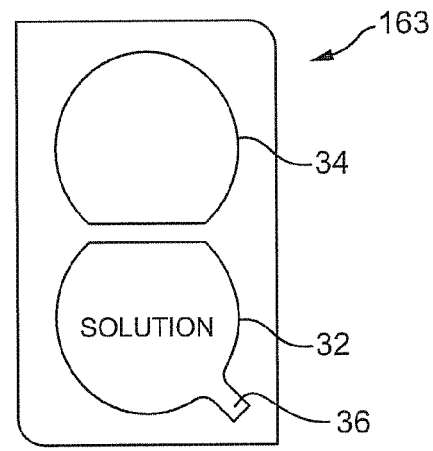
FIG. 36 is a plan view of the single-use package of FIG. 35 without the cover that encloses the lens.

In other embodiments, shown in FIGS. 22-43, the single-use package may have a first space 34 for a contact lens and a second space 32 for hydration medium 32. This arrangement may take on a variety of configurations, some of which allow the second space for hydration medium to be flat, bulbous and optionally to serve as a handle. FIGS. 22 and 28 illustrate that the second space 32 for hydration medium may be attached to the first space 34 for the contact lens and the two spaces are separated by a seamed connection 31 between the two sheets comprising the single-use package 160. The connection 31 may be flexible and frangible and thus the second space 32 may snap off as in FIG. 34, or be torn away from the first space 34 as in FIGS. 22, 28, 35 and 36. The second space 32 for the hydration medium may have a cap 30. The cap 30 may be removed by pulling, twisting, or snapping off. Alternately, the second space 32 may remain connected to the first space 34 as shown in the single use package 161 of FIGS. 24-25. The first space 34 and second space 32 may be opened at the same time or different times. In one example, the first space 34 for the contact lens is opened prior to the second space for the hydration medium 32. In an alternative example, the second space 32 for the hydration medium may be opened prior to the first space 34 for the contact lens. The first and second space may be opened by the same or different means. The first and second space 34, 32 may both be opened by peeling away a foil 26 (FIG. 28) or other covering, or alternatively, the first space 34 may be opened by peeling away the cover 26 and the second space 32 may be opened by removing a cap 30. FIGS. 26-27 shows a first space 34 being opened by peeling away a foil 26 or other covering, while the second space 32 remains attached and unopened.

Figure 37:
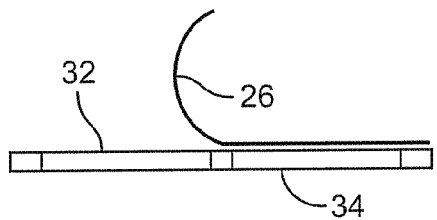
FIG. 37 is a side elevation view of the single-use package of FIG. 35 with the cover peeled away from the first space.
Figure 38:
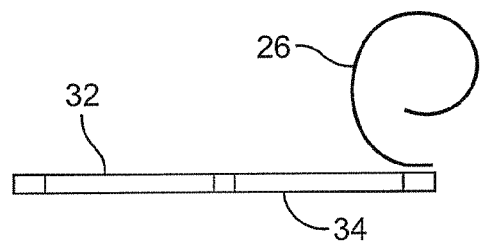
FIG. 38 is a side elevation view of the single-use package of FIG. 35 with the cover removed from both the first and second spaces.
Figure 39:
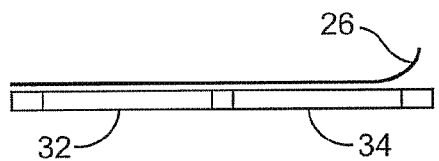
FIG. 39 is a side elevation view of the single-use package of FIG. 35 with the cover starting to be peeled away from the second space.
Figure 40:
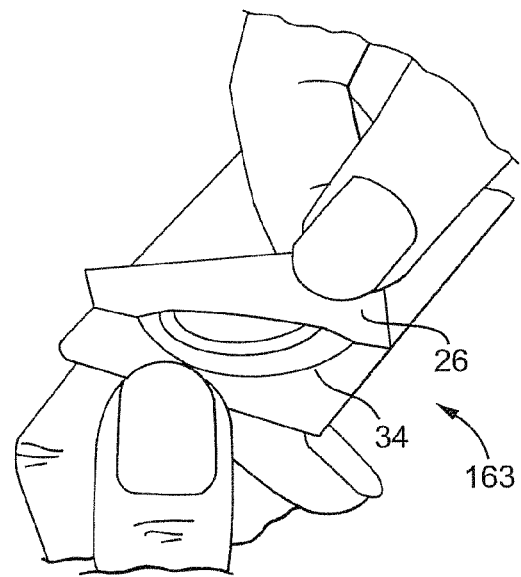
FIG. 40 is a perspective view of the single-use package of FIG. 35 showing the cover being peeled away from either the first or second space.

The cover may be heat sealed to a base, a support member or to one of the sheets comprising the single-use package. The heat sealing may be around the entire perimeter or alternatively, solely around the first space containing the contact lens. The first and second spaces 34, 32 may be separated before or after one or both of them are opened. In an alternative embodiment, the second space 32 for hydration medium may be opened by separating the second space 32 from the first space 34, thus exposing an opening or channel 36 from which the hydration medium may escape, as shown in the embodiment of the single-use package 162 of FIG. 34. In another embodiment, both the first and second space may be opened by peeling a cover 26 the single-use package 163 as shown in FIG. 40. FIGS. 37-39 show that in this embodiment, the two spaces 32 and 34 may be opened by lifting a cover 26 from either end, and may be opened at the same time or only one space may be opened while the other remains sealed.

The hydration medium may be any solution suitable for use with contact lenses. For example, the hydration medium may be re-wetting solution, cleansing solution or any other maintenance solution. An example of a suitable hydration medium is saline solution.

Figure 41:
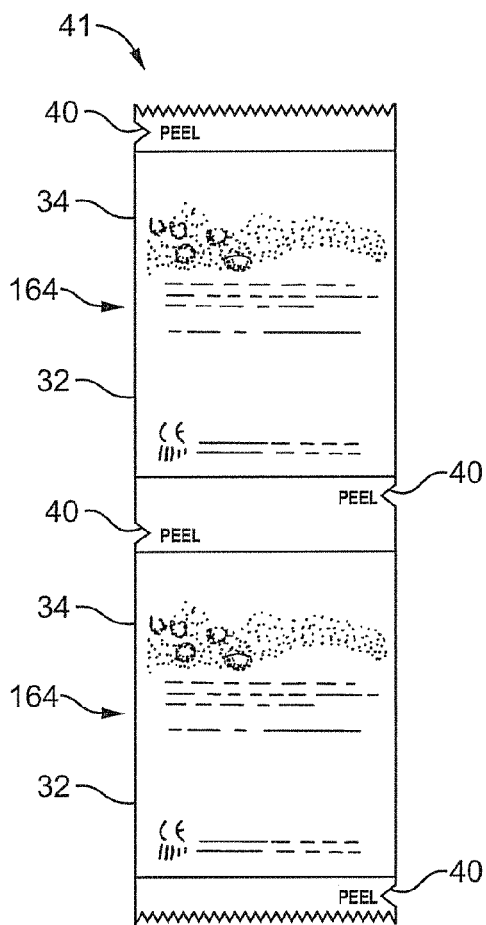
FIG. 41 is a plan view of two single-use packages, each having a first and second space, and connected by a frangible joint.
Figure 42:
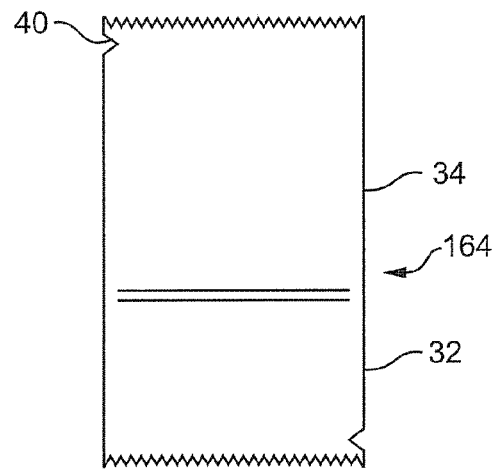
FIG. 42 is a plan view of one of the single-use packages of FIG. 41 without the covering.
Figure 43:
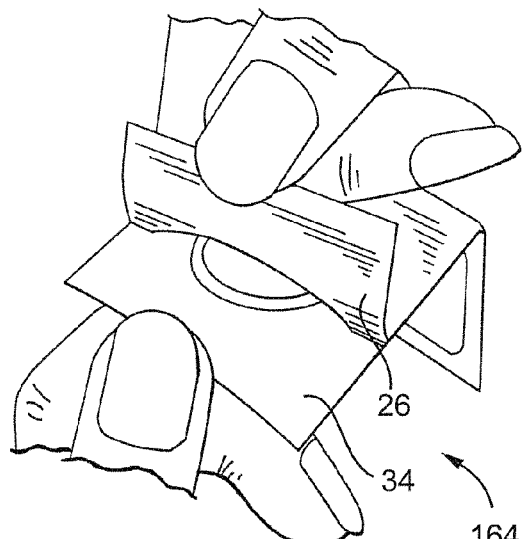
FIG. 43 is a perspective view of one of the single-use packages of FIG. 42 showing the cover being peeled away from the first space containing a contact lens.
Figure 45:
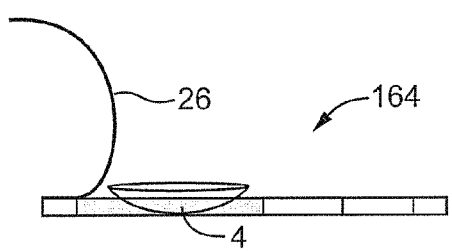
FIG. 45 is a side view of the single-use package of FIG. 42 with the cover peeled away and the contact lens in its equilibrated state.
Figure 117:
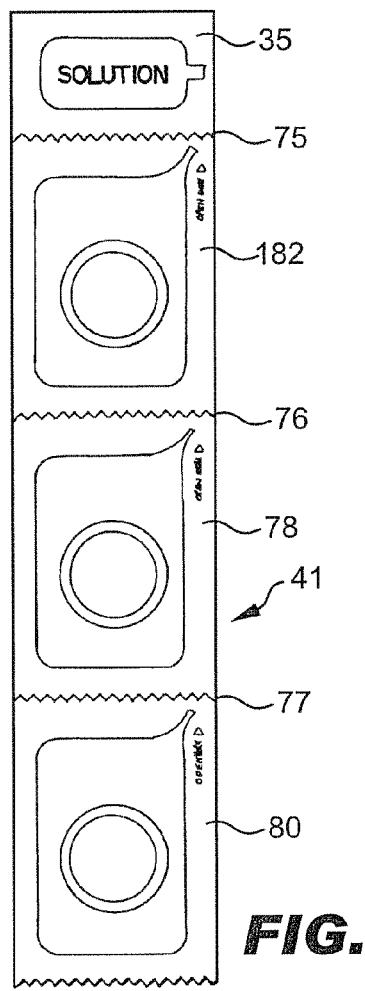
Figure 116:
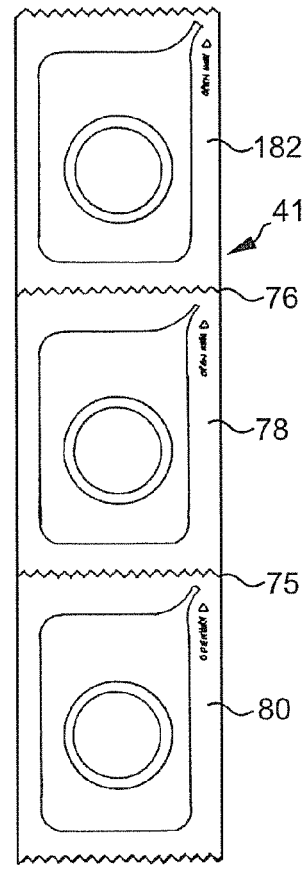

In another embodiment, as shown in FIGS. 41 and 116-117, one single-use package 164 and 182 may be connected to another identical single-use package 164 and 182. The connected single-use packages may form strips of single-use packages 41. The number of single-use packages 164 connected may be between 1 and 90, or alternatively, between 90 and 180 packages or more. The strips of single-use packages 41 may be rolled up or folded in zigzag fashion. The single-use packages 164 and 118, connected to form strips 41, may each have only a first space 34 for a contact lens or alternatively may have a second space for hydration medium 32. The connection 31 or 76 between the single-use packages is flexible and frangible. Also shown, in the embodiment of FIG. 41, the connection is a tear notch 40 to assist in opening the single use package 164.

The strip of single-use packages 41, or alternatively, a plurality of individual single-use packages, may be used in a pop-up dispenser. In this embodiment, a plurality of single-use packages 164 and 118 are connected to one another via frangible connections 31, 76 (FIGS. 116-117) and are dispensed one at a time such that as one single-use package 164 is removed, another is available in a dispensing region of the dispenser. Alternatively, a plurality of individual single-use packages are contained in a dispenser in such a way that as one single-use package 164 is removed, it engages a second similar single-use package 164, thus making the second package 164 available for subsequent removal.

Figure 44:
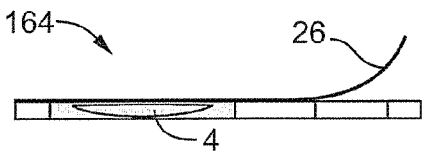
FIG. 44 is a side-view of the single-use package of FIG. 42 with a contact lens therein with a cover that is intact.
Figure 46:
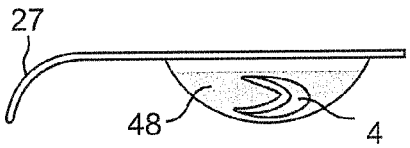
FIG. 46 is a side view of a prior art blister pack with a contact lens therein that is folded.
Figure 47:
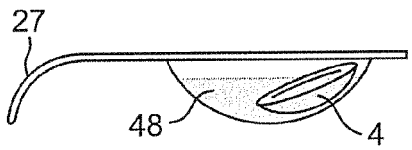
FIG. 47 is a side view of a prior art blister pack with a contact lens therein that is stuck to the side.
Figure 48:
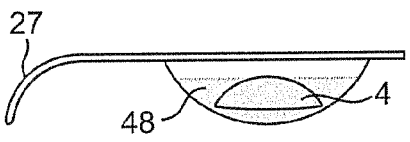
FIG. 48 is a side view of a prior art blister pack with a contact lens therein that is inverted.

The single-use package maintains the contact lens 4 therein in a compressed state and restricts the movement of the contact lens 4 while the package is sealed, examples of which are shown in FIGS. 44 and 67. In FIG. 44, the single-use package 164 prevents the problematic movement of the contact lens 4 that occurs in the typical prior art blister pack 27. As illustrated in FIGS. 46-48, a contact lens 4 in a prior art blister pack 27 is able to invert, shift positions, stick to the side, and fold in half. However, the single-use package, of some exemplary embodiments, maintains the contact lens 4 in the same position as when it is first placed within the package and sealed. In addition, the contact lens 4 is always presented in a predictable orientation when the single-use package is opened. This reduces the need to handle the lens prior to insertion thus reducing the risk of lens damage or contamination of both the lens and the eye of the wearer. This also facilitates placement of the contact lens in the eye of the wearer. Typically, the wearer's vision will be somewhat compromised prior to insertion of the contact lens. Therefore, it is useful to know, without being able to see, what orientation the contact lens is in when the package is opened.

Even though the present exemplary contact lens package maintains the contact lens 4 therein in a flattened or compressed state, the single-use package itself need not necessarily be flat. The single-use package may take on a variety of shapes. According to one exemplary embodiment, the the single-use package will have a slim profile and be able to be stacked and packaged compactly, regardless of the assumed shape.

Figure 49A:
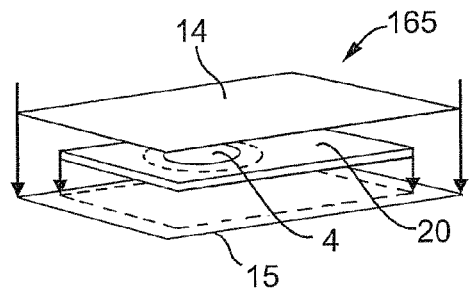
FIG. 49A is an exploded perspective view of a sachet type single-use package.
Figure 49B:
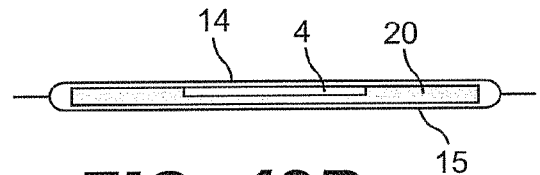
FIG. 49B is a cross-sectional view of the single-use package of FIG. 49A.
Figure 50A:
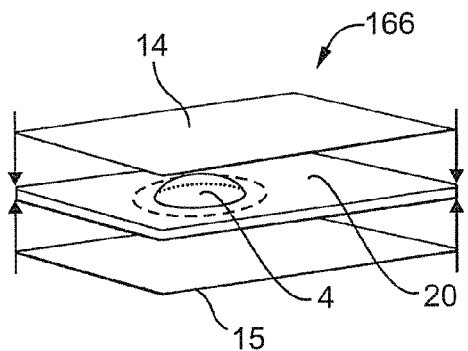
FIG. 50A is an exploded perspective view of a polypropylene and foil type single-use package.
Figure 50B:
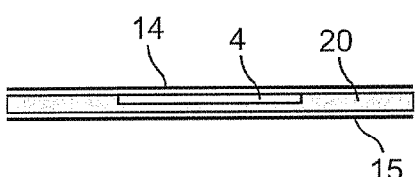
FIG. 50B is a cross-sectional view of the single-use package of FIG. 50A.
Figure 51A:
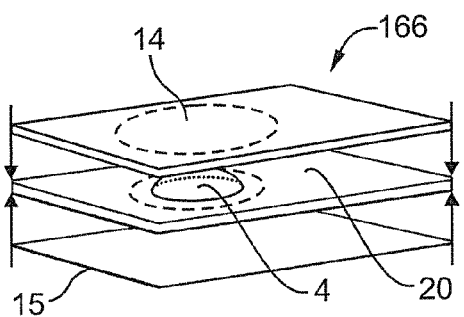
FIG. 51A is an exploded perspective view of an all polypropylene type single-use package.
Figure 51B:
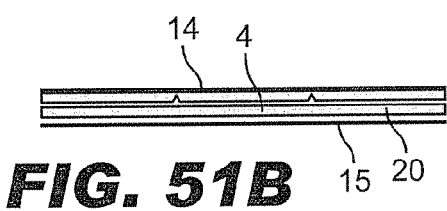
FIG. 51B is a cross-sectional view of the single-use package of FIG. 51A.

As shown in FIGS. 49A-51B, there are a variety of constructions and configurations useful for producing a single-use package. In FIGS. 49A and B, a sachet type single-use package 165 is composed of three layers. The two outer layers 14, 15 are usually aluminum foil and the inner layer is polypropylene or any other suitable polymer. The typical thickness of this type of single-use package 165 is approximately 1.0 mm, however, it can be less depending upon the choice of materials and design. Aluminum foil and polypropylene (or any other suitable material) may also be used in a non-sachet type single-use package 166, as shown in FIGS. 50A and B, with an approximate total thickness of 1.0-2.0 mm. In this embodiment, the foil may serve as both a cover and a base for the package. An all polypropylene single-use package 167 may also be produced, as in FIGS. 51A and B, with an approximate total thickness of 2.0-3.0 mm. These constructions may be used to produce single-use packages with or without spring discs 46 (FIGS. 61-69), support members 20, and may be any shape or color. For instance, other suitable polymers may be used in lieu of, or in combination with, polypropylene.

Figure 52:
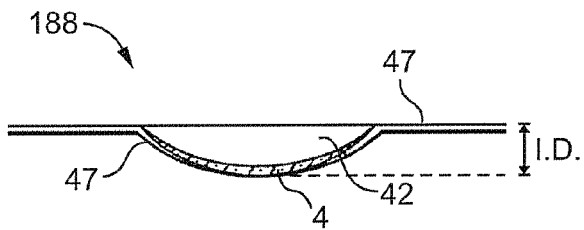
FIG. 52 is a side view of another embodiment of the single-use package showing the internal depth of the single-use package.

FIG. 52 is another embodiment of a single-use package 188 in which the internal depth ("ID") of the single-use package is shown. The internal depth in this package is determined by measuring the height of the package and subtracting the thickness of the cover material 47 and the thickness of the material making up the protuberance 42. In other packages, there may be parts of the package which are not used to hold the contact lens. These parts of the package are disregarded when determining the internal depth of the contact lens holding area. The internal depth of some embodiments of the present exemplary single-use package is approximately 0.1 mm to 3.5 mm, more preferably, 0.1 mm to 3.0 mm. Regardless of the dimensions, the internal depth of the exemplary contact lens package is less than the natural sagittal depth of the contact lens in its equilibrated state, according to one exemplary embodiment. In an equilibrated state, the natural sagittal depth of a contact lens is typically greater than 3.8 mm, and often as high as 5.0 mm.

Figure 53:
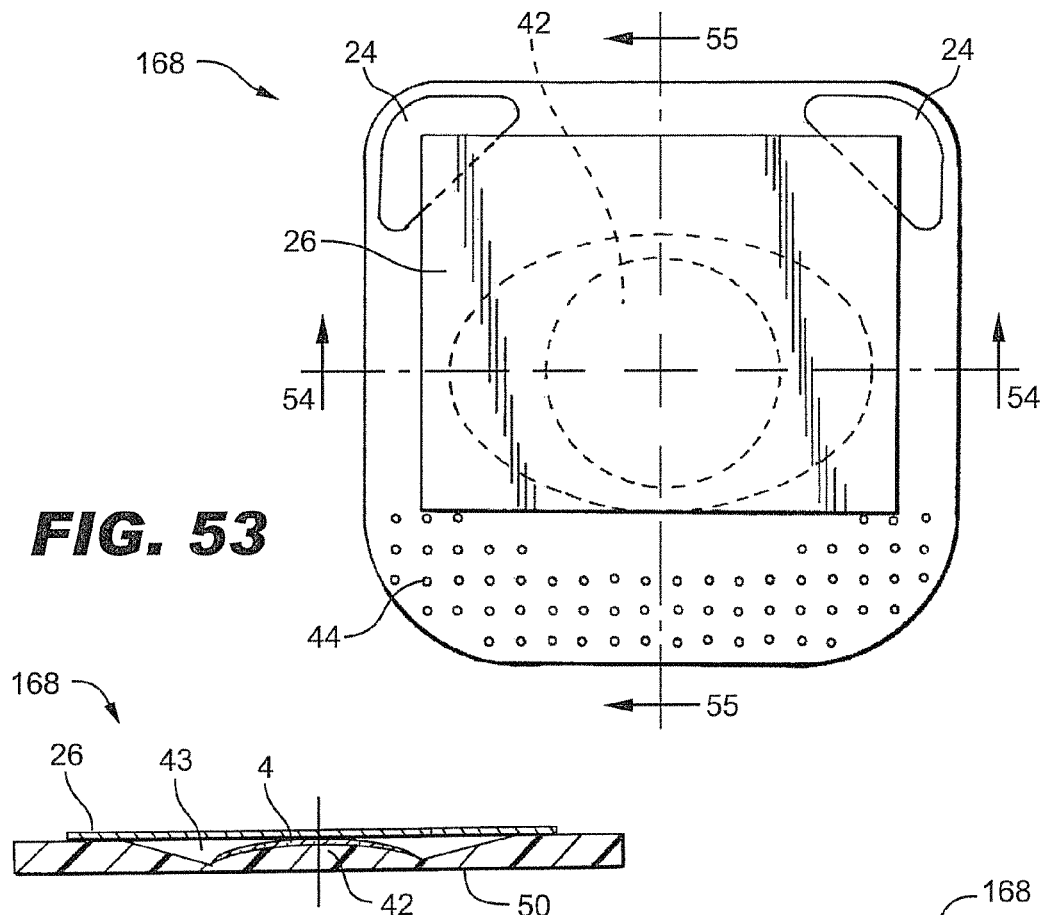
FIG. 53 is a plan view of a single-use package with an island-like protuberance upon which the contact lens rests.
Figure 54:
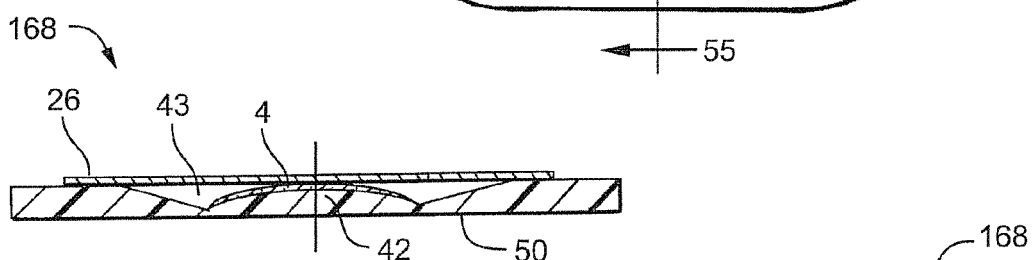
FIG. 54 is a cross-sectional view of the single-use package of FIG. 53 taken along line 54-54 showing the contact lens resting on the island-like protuberance.
Figure 55:
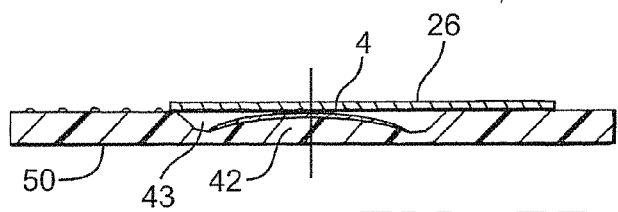
FIG. 55 is another cross-sectional view of the single-use package of FIG. 53 taken along line 55-55 showing the contact lens resting on the island like protuberance.
Figure 56:
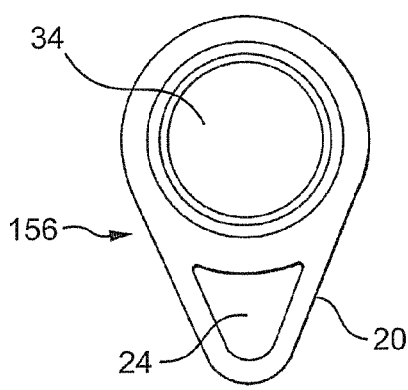
FIG. 56 is a plan view of a tear shaped polypropylene support member with a cut out in the handle.
Figure 57:
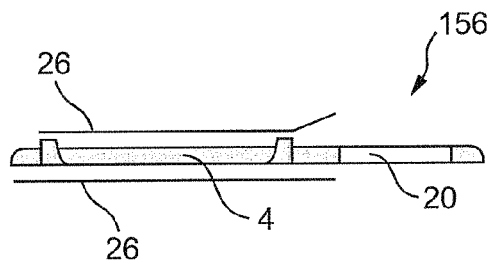
FIG. 57 is a cross-sectional view of a single-use package with the support member of FIG. 56 that is opaque.
Figure 58:
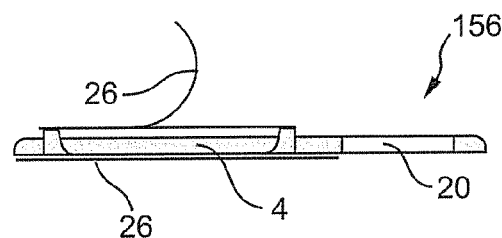
FIG. 58 is a cross-sectional view similar to that of FIG. 57 but with the cover peeled back.
Figure 59:
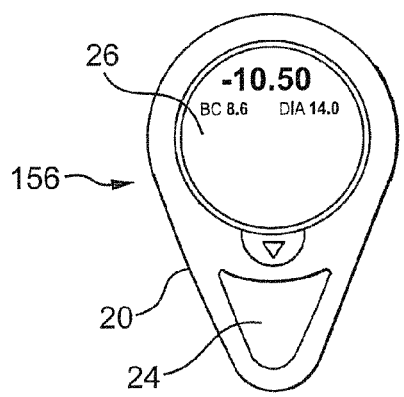
FIG. 59 is a plan view of the front of a single-use package containing the support member of FIG. 56.
Figure 60:
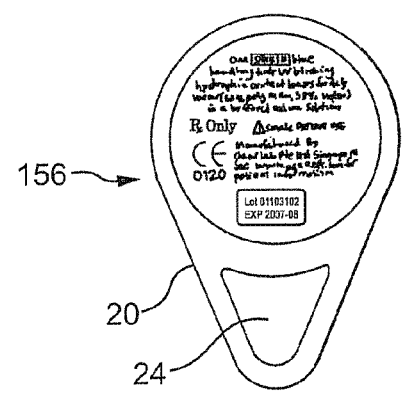
FIG. 60 is a plan view of the back of a single-use package containing the support member of FIG. 56.
Figure 74:
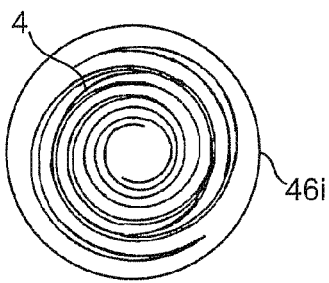
FIG. 74 is a plan view of a ninth embodiment of a spring disc.
Figure 75:
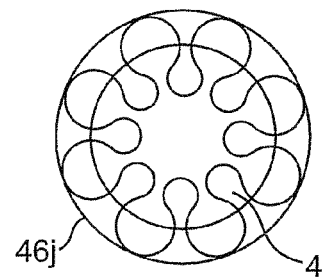
FIG. 75 is a plan view of a tenth embodiment of a spring disc.
Figure 76:
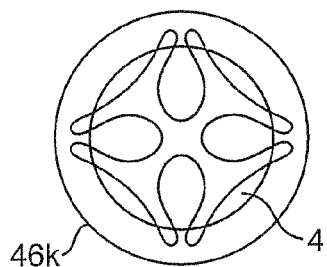
FIG. 76 is a plan view of an eleventh embodiment of a spring disc.
Figure 77:
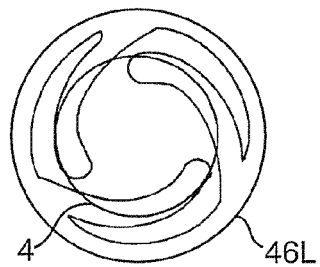
FIG. 77 is a plan view of a twelfth embodiment of a spring disc.
Figure 78:
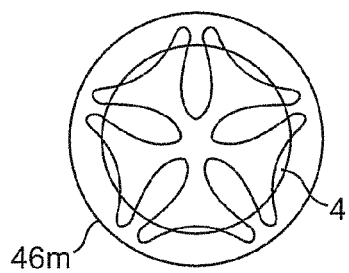
FIG. 78 is a plan view of a thirteenth embodiment of a spring disc.
Figure 79:
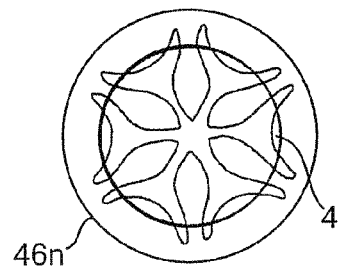
FIG. 79 is a plan view of a fourteenth embodiment of a spring disc.
Figure 80:
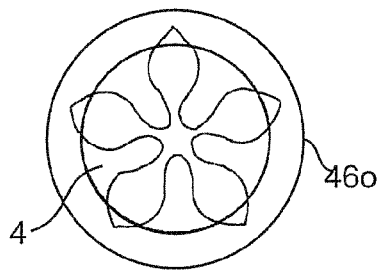
FIG. 80 is a plan view of a fifteenth embodiment of a spring disc.
Figure 81:
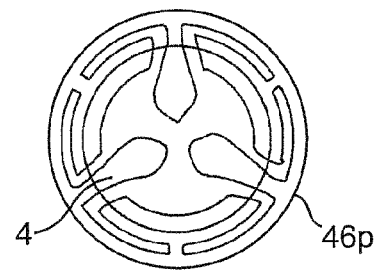
FIG. 81 is a plan view of a sixteenth embodiment of a spring disc.
Figure 82:
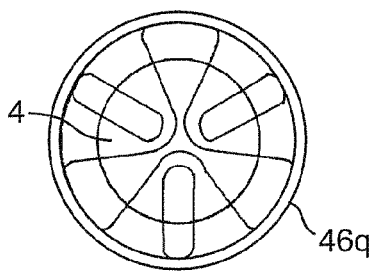
FIG. 82 is a plan view of a seventeenth embodiment of a spring disc.
Figure 83:
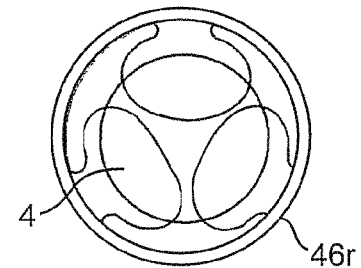
FIG. 83 is a plan view of an eighteenth embodiment of a spring disc.
Figure 84:
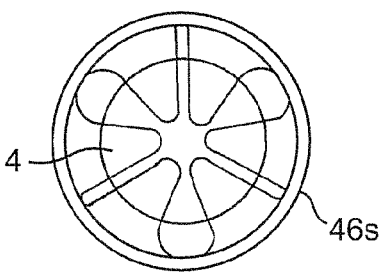
FIG. 84 is a plan view of a nineteenth embodiment of a spring disc.
Figure 85:
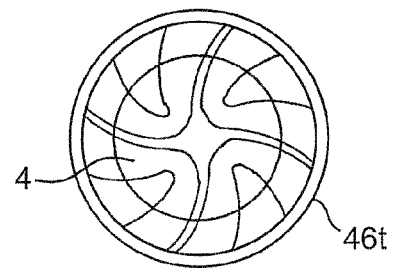
FIG. 85 is a plan view of a twentieth embodiment of a spring disc.
Figure 86:
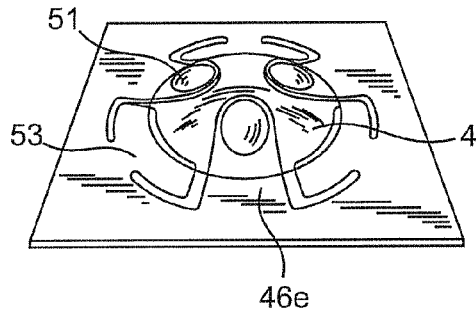

As shown in FIGS. 53-55, in one embodiment of the single-use package 168, there is an island-like protuberance 42 in the recess 43, upon which the contact lens 4 rests. The contact lens 4 is maintained in a flattened state and is immobilized upon the protuberance 42 by the cover 26 of the single-use package.

In addition, there may be a textured surface on at least one side of the single-use package. For example, the texture may be raised bumps, or ridges and may be on one or both sides of the single-use package or on a handle. In this embodiment, there are raised features 44 on one end of the single-use package to allow the user to easily grip the single-use package 168 as well as cut outs 24 on the corners of the base to facilitate removal of the cover sheet 26.

In another embodiment, the single-use package 156 is a tear shape with a cut out 24 in the support member 20 to facilitate handling of the single-use package 156. FIGS. 56-60 show the tear shaped single-use package 156 with and without the cover 26 in both opaque and transparent varieties. The side view illustrates that the contact lens 4 therein is maintained in a flattened state until the cover 26 of the single-use package 156 is removed.

As shown in FIG. 68, a polypropylene spring disc 46c may be added to a single-use package 169 to assist in maintaining the contact lens 4 in a flattened state while the single-use package 4 is sealed, and then assist the contact lens 4 in returning to its equilibrated state when the single-use package 169 is opened. As shown in FIGS. 61-62, and 69-86, numerous embodiments of the spring disc 46a-t are contemplated. A unifying characteristic of all of the spring discs 46a-t is that in their equilibrated state, the spring discs 46a-t is not flat. However they are compressible and are able to be maintained in a flattened state within the sealed single-use package 169, as shown in FIGS. 63-68. Although other variations are possible, two different ways of sealing the single-use package are shown in FIGS. 64 and 68. In FIG. 64, the two sheets 14, 15 of material are sealed together on one end and are sealed to the spring disc therein on the other end. Alternatively, in FIG. 68, the two sheets 14, 15 of material forming the single-use package are sealed together on both ends.

FIGS. 67-68 and 110-113 illustrate that in its relaxed state, the spring disc 46c is arched. However, when placed between the two sheets 14,15 of the single-use package and sealed, the spring disc 46c, and hence the contact lens 4 thereon, is flattened (see FIG. 67). When the single-use package 169 is opened, the spring disc 46c pops up to its arched state and the contact lens 4 is presented in a 'ready to insert' orientation, that is, the lens 4 may be pinched off, between the thumb and forefinger, and inserted into the eye of the wearer (see FIG. 68). A perspective view of a contact lens 4 resting on a spring disc 46e is provided in FIG. 86. As shown, in an equilibrated state, the spring disc 46e has projections 51 that extend upward toward the contact lens 4 and it is the projections 51 that provide support for the central portion of the contact lens 4 as it rests thereon. The peripheral portion of the contact lens rests around the base 53 of the spring disc 46e.

FIG. 69 illustrates the assembly of a single-use package 170 that includes a spring disc 46d. In this embodiment, the spring disc 46d is placed on a molded polypropylene sheet which forms a base 50 of the single-use package 170. The contact lens 4 rests with its concave side upon the spring disc 46d and the single-use package 170 is sealed with an aluminum foil cover 26.

Figure 87:
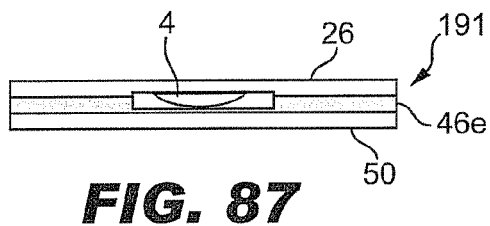
FIG. 87 is a cross-sectional view of a contact lens and spring disc in a flattened state in the sealed single-use package of FIG. 90.
Figure 89A:
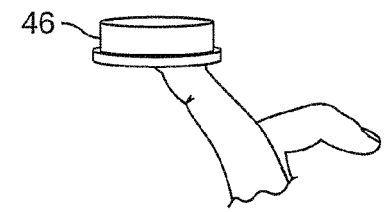
FIGS. 89A-E are perspective views of a single-use package with a spring disc and contact lens thereon with an index finger pushing through the spring disc such that the contact lens rests upon the tip of the index finger and the index finger extends through the opening of the single-use package so that the contact lens may be placed in the eye.
Figure 88:
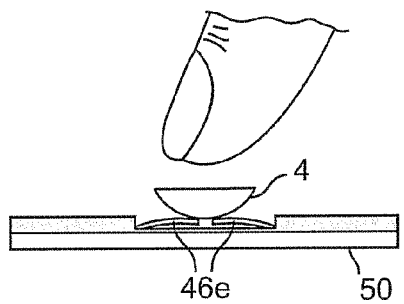
FIG. 88 is a cross-sectional view of a contact lens and spring disc in an equilibrated state in a single-use package of FIG. 90 with the cover removed.
Figure 89B:
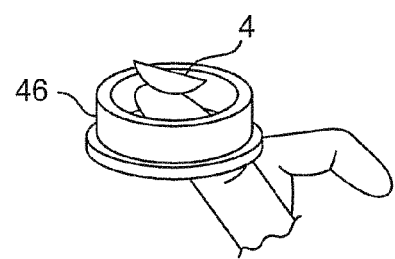
Figure 89C:
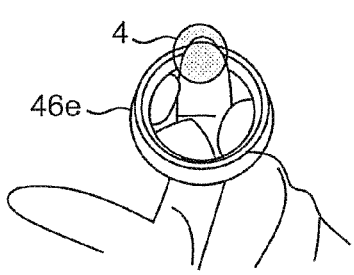
Figure 89D:
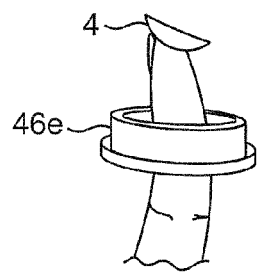
Figure 89E:
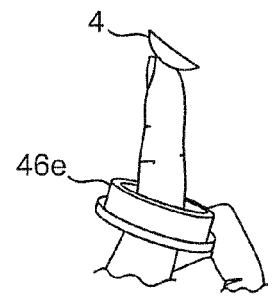

Preferably, the concave side of the contact lens 4 rests upon the spring disc 46d. However, in another embodiment shown in FIGS. 87-88, the convex side of the contact lens 4 rests upon the spring disc 46e. In this embodiment, the sealed single-use package 191 holds the lens 4 and spring disc 46e in a flattened state and when opened, both return to their equilibrated form.

Another embodiment is presented in FIGS. 89A-E, in which a method of insertion made possible by using a spring disc 46e is illustrated. A semi-soft polypropylene spring disc 46e is used to position the contact lens 4 in an orientation that is ready for insertion into the eye of a wearer. As shown, the spring disc 46e is placed upon the tip of an index finger. The finger is then pushed through the center of the spring disc 46e such that it makes contact with the convex side of the contact lens 4. The finger continues to proceed through the center of the spring disc 46e until the spring disc 46e drops to the base of the finger and the contact lens 4 rests on the tip of the index finger. The contact lens 4 is then in a position to be easily inserted into the eye of the wearer. Thus, the contact lens 4 is inserted with a minimum of handling, reducing the risk of contamination to the contact lens 4 and the eye.

In another embodiment, a method of making a single-use contact lens package is provided. In this method, a spring disc 46 is placed on top of a contact lens 4. The spring disc 46 and contact lens 4 are then dosed with a minimum amount of hydration medium and subsequently one sheet 14 of material is placed above and one sheet 15 of material is placed below the spring disc 46 and contact lens 4. The sheets 14, 15 of material are then sealed. In an alternative method, the spring disc 46 and contact lens 4 are inverted prior to dosing with the hydration medium such that the hydration medium contacts the lens 4 prior to the spring disc 46. When the sealed single-use package is, opened, the spring disc 46 pops up as does the contact lens 4 thereon. The equilibrated contact lens 4, however, will be above the level of the equilibrated spring disc 46.

One exemplary embodiment of the single-use package includes a hermetic seal, typically toward the perimeter of the package. If the package is indented, such as in FIGS. 6 and 7, the pliability of the two sheets may differ, and the strength of this seal may be made to vary around the perimeter, so as to make the package open in a manner that makes the lens the most easily removed as possible. In addition, packages that include a spring disc may include internal seals so that the package will open in a predetermined fashion, thus always presenting the contact lens in a consistent orientation. For example, the single use package 169 of FIG. 68 will have a seal around the perimeter. In addition, the edges of the disc 46c will preferably be adhered to the second sheet 15 with a seal that is more secure than a seal between the edges of the disc 46c and the first sheet 14. Then as the sheets 14 and 15 are grasped and pulled apart, the hermetic perimeter seal will first be opened, and then the first sheet 14 will come off of the disc 46c, leaving the disc 46c adhered to the second sheet 15. The center of the spring portion of the disc will then always pop-up with the lens 4 on top of it as the package is opened. (Of course this presumes that the orientation of the lens and the spring direction of the disc are consistent from one package to the next when the package is assembled.) The shape of the hermetic seal may include point directed toward the part of the package where the user will first spread the first and second sheets apart, so that the line of action of opening the sheets will encounter this point first, and all of the opening force will be directed to opening the hermetic seal at this point. The composition of the inside layers of the sheets and the disc will preferably be chosen so that they can be welded together with heat seals as is commonly known. The disc may be formed with an uneven surface to affect the way the seal is formed and the strength thereof, and then be oriented within the package so that the first sheet 14 will more readily separate from the side of the disc toward the part of the package that will open first, and be more tightly bonded to the sheet 14 on the back part of the disc. This will make it easy to open the package to a good stopping point where the lens is exposed for removal from the package.

Figure 90:
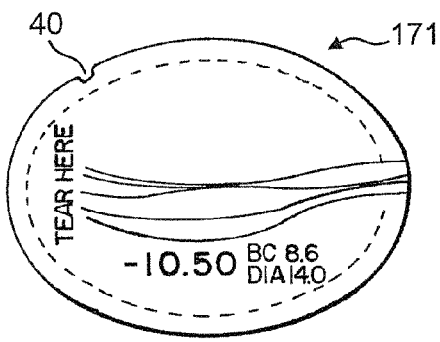
FIG. 90 is a plan view of a single-use package with an oval shape and a tear notch.
Figure 91:
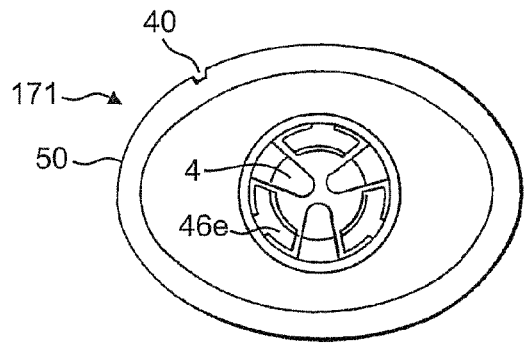
FIG. 91 is the single-use package of FIG. 90 with the cover removed to show the spring disc and contact lens therein.
Figure 92:
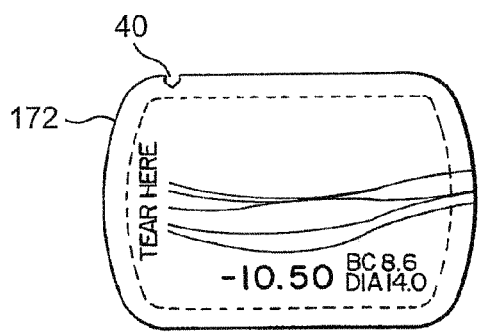
FIG. 92 is a plan view of a single-use package with a rounded rectangle shape and a tear notch.

Single-use packages, with and without spring discs, may take a variety of shapes. FIG. 90 shows an oval shaped single-use package 171 with a notch 40 to aid the user in tearing the end of the cover 26 from the single-use package 171 to release the contact lens 4 therein. FIG. 91 is the single-use package 171 of FIG. 90 with the cover 26 removed, thus allowing the spring disc 46e and contact lens 4 to be seen. A rounded rectangle variation with a tear notch 40 is seen in FIG. 92.

Figure 93:
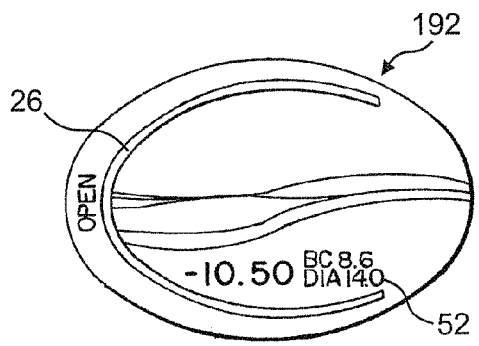
FIG. 93 is a plan view of a single-use package with an oval shape and a peel open hinge-type cover.
Figure 93A:
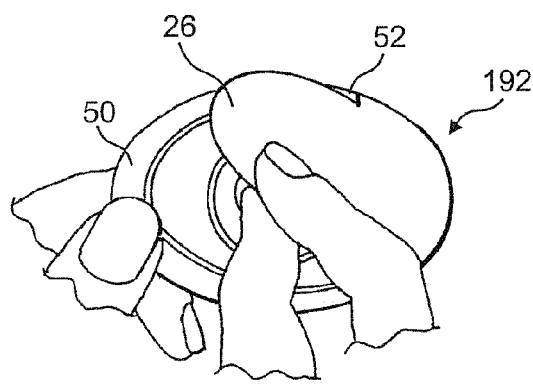
FIG. 93A is a perspective view of the single-use package of FIG. 93 showing the hinge-type cover being opened.

An oval single-use package 192 with a flap-type cover 26 is shown in FIGS. 93 and 93A. The cover 26 in this embodiment is sealed around the periphery such that it may be peeled back but not completely removed. Instead it is peeled back far enough to expose the contact lens 4 and remains connected to the single-use package 192 at a hinged area 52. Thus, once the seal is broken, the cover 26 swings back like a door to allow access to the contents of the single-use package 192.

Figure 94:
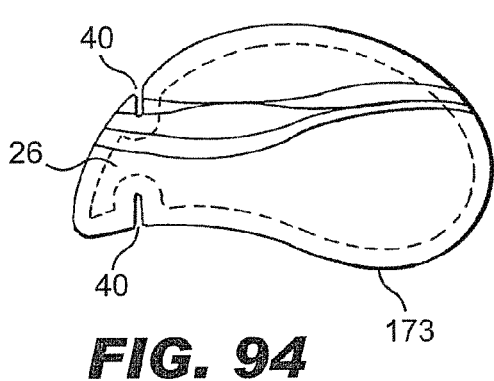
FIG. 94 is a plan view of a single-use package with an asymmetrical tear shape and two tear notches at the narrow end.
Figure 95:
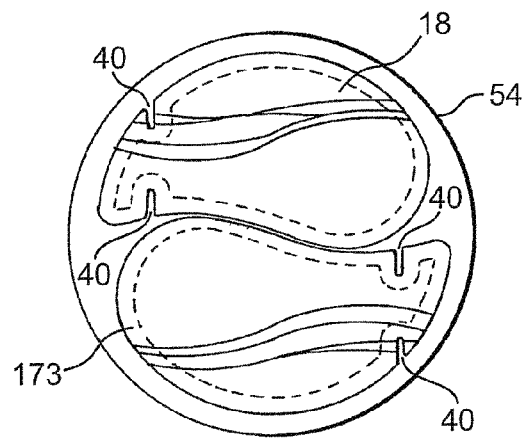
FIG. 95 is a plan view of two of the single-use packages of FIG. 94 packaged together.

An asymmetrical teardrop shaped single-use package 173 is seen in FIGS. 94-95. In this embodiment, there are two tear notches 40 that allow the user to tear open the single-use package, at the narrow end, to expose the contact lens 4 therein. This shape allows two single-use packages 173 to be inter-fit and stored compactly, on a disc 54, making it an ideal option for a traveling consumer.

Figure 96:
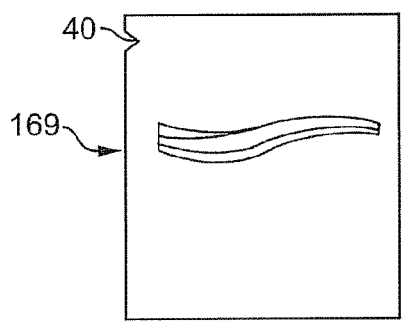
FIG. 96 is a plan view of a square shaped sachet-type single-use package with a tear notch.
Figure 97:
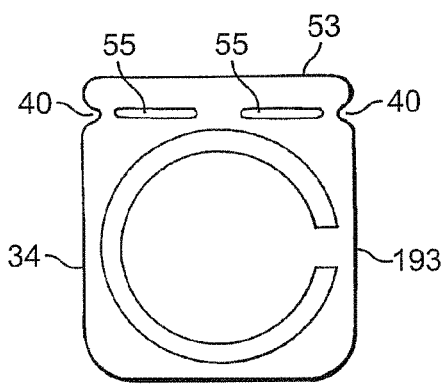
FIG. 97 is a plan view of a rounded corner square sachet-type single-use package with a tear-off end and cut out tabs that enhance visibility of the tear-off end.
Figure 98:
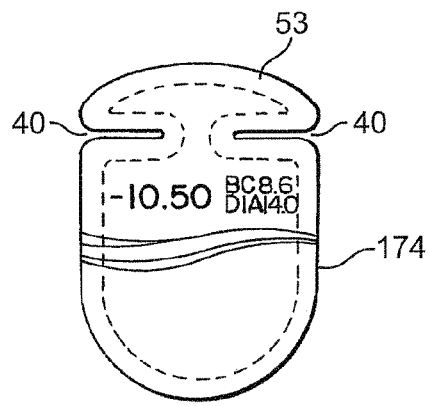
FIG. 98 is a plan view of an embodiment of a sachet-type single-use package, half being oval shaped and half being a rounded square shape with a half-moon tear-off end.

A sachet type single-use package is seen in FIGS. 96-100. In FIG. 96, a typical square shaped single-use package 169 with a tear notch 40 is seen. A rounded square with an enhanced tear-tab 53 is shown in FIG. 97. In this embodiment, the tear-tab 53 is made more visible by two central areas 55 where foil has been cut away between the tear-tab 53 and the body of the single-use package 193. A variation is seen in FIG. 98 where there are notches 40 extending from the peripheral edge to the center to enhance the visibility of the tear-tab 53.

Figure 99:
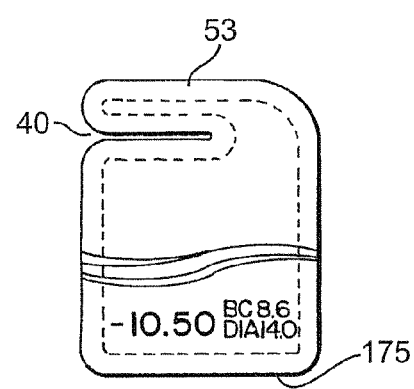
FIG. 99 is a plan view of a sachet-type single-use package with a rounded square shape and a finger shaped tear-off end.
Figure 100:
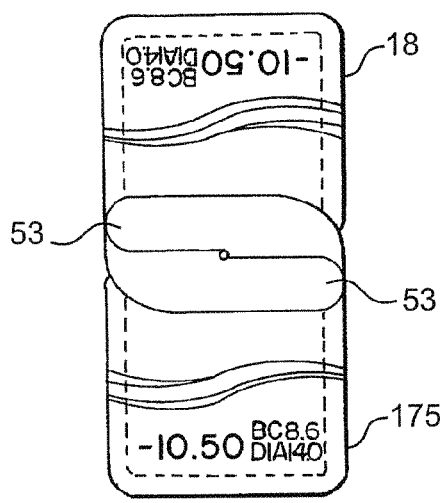
FIG. 100 is a plan view of two sachet-type single-use packages of FIG. 99 showing the finger shaped tear-off end of one fit into the finger shaped tear-off end of the other.

FIG. 99 shows a rounded square shaped single-use package 175 with a finger-like tear tab 53 on one end. This tear tab 53 serves as a means of tearing open the single-use package 175 as well as a means of connecting two like single-use packages 175 as seen in FIG. 100. The finger-like tear tabs 53 of two single-use packages inter-fit and therefore hold the two single-use packages 175 together.

Figure 101:
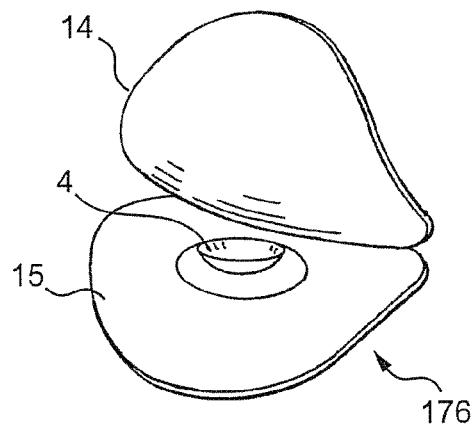
FIG. 101 is a perspective view of a double curved-shape single-use package with the cover being peeled back to expose the lens therein.

In another exemplary embodiment, a double-curve shaped single-use package 176 is provided (see FIG. 101). In this embodiment, a top sheet 14, such as aluminum foil, may be welded to a bottom polypropylene sheet 15 without wrinkling. The top sheet 14 may be pulled back to expose the contact lens 4 therein. The double-curve shape allows a plurality of single-use packages 176 to be stacked compactly as shown in FIG. 102.

Figure 102:
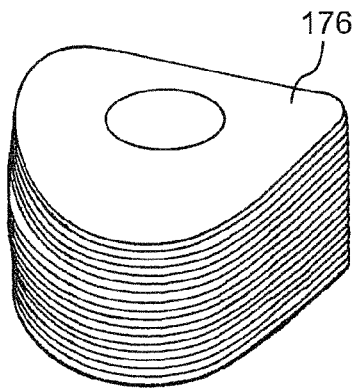
FIG. 102 is a perspective view of a plurality of the single-use packages of FIG. 101 stacked.

In particular, as illustrated FIGS. 101 and 102, when a contact lens 4 is packaged between a first curved packaging surface and a second curved package surface, the resulting profile allows for compact stacking of a plurality of the packages. According to one exemplary embodiment, illustrated in FIGS. 101 and 102, the bottom curved surface, such as the polypropylene sheet 15, of the package profile may be matingly engaged with a curved top sheet 14 of an adjacent package having a similar profile. By repeating the mating engagement of similarly curved top sheets 14 and bottom sheets, the packages may be compactly stacked as shown in FIG. 102.

While the compact stacking of a plurality of packages having a first and a second curved surface is illustrated in FIGS. 101 and 102 in the context of a package containing a compressed contact lens 4, the same stacking method may be applied to a contact lens package that tracks the profile of a contact lens 4 without compressing the contact lens therein. According to this exemplary embodiment, a contact lens package having an internal depth less than a sagittal depth of the contact lens 4 contained therein may track the profile of the contact lens, similar to the exemplary embodiments illustrated in FIGS. 8 and 9. As illustrated, the resulting packages have a concave surface and a convex surface. According to this exemplary embodiment, the concave bottom surface of a first package may be matingly engaged with a convex upper surface of a second package. Again, this stacking method may be continued to form a compact stack of contact lens packages.

Figure 103:
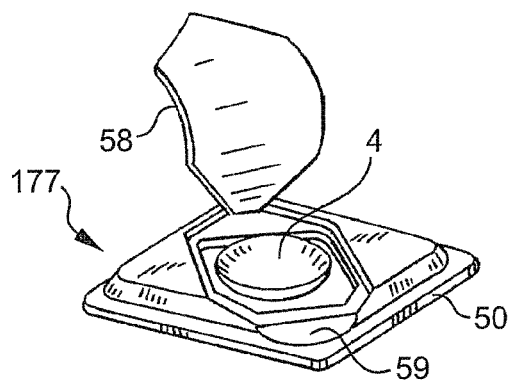
FIG. 103 is a perspective view of a molded single-use package with a pull-top opening that has been peeled back to expose the inner space and contact lens therein.

Referring to FIG. 103, the single-use package 177 has a molded polypropylene base 50 and transparent polypropylene pull-top cover 58. In this embodiment, the pull-top cover 58 is pulled back beginning at one corner where there is a portion of the pull-top cover 58 that is not adhered to the base 50, and is easily grasped. As the pull-top cover 58 is removed, the contact lens 4 therein is exposed.

Figure 104:
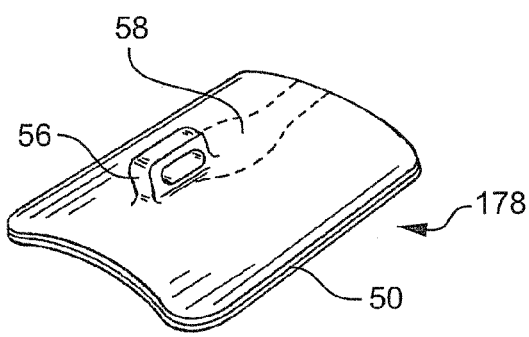
FIG. 104 is a perspective view of one embodiment of a pull-top single-use package with a handle detail.
Figure 105:
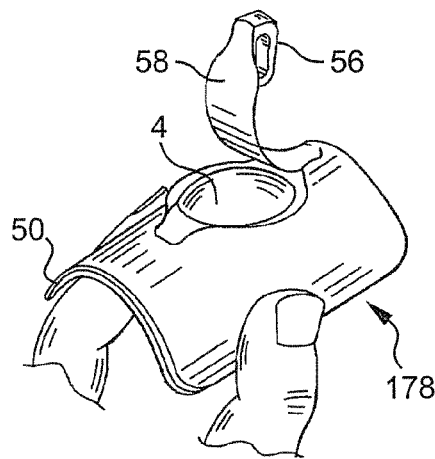
FIG. 105 is a perspective view of the single-use package of FIG. 104 with the top pulled back and the base bent to expose the contact lens therein.

A variation of the pull-top cover 58 of FIG. 103 is shown in FIGS. 104-105. In this embodiment, there is a raised handle 56 to aid in removal of the pull-top cover 58. As shown, once the pull-top cover 58 is pulled back, the base 50 is bent to allow access to the contact lens 4. Although the handle 56 is provided for ease of opening, for users with weak fingers, such as the elderly, it is possible to use a key tip, or some other device, to help grip the handle 56 and thus more easily open the single-use package 178.

Figure 106:
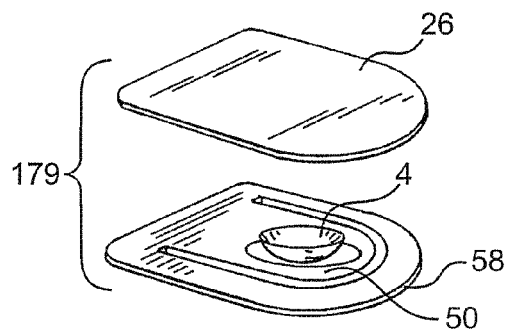
FIG. 106 an exploded perspective view of a single-use package with a cover and base that lifts up.
Figure 107:
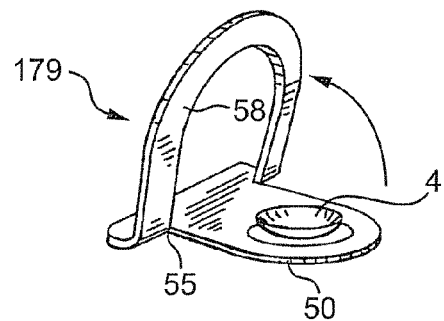
FIG. 107 is a perspective view of the single-use package of FIG. 106 with the cover and base lifted up.

In another exemplary embodiment, a portion of the base folds 50 back with the cover 26. Referring to FIGS. 106-107, an elongated semi-circle shaped single-use package 79 is shown with a contact lens 4 and an aluminum cover sheet 26. The base 50 is an inner elongated semi-circle section that does not contact the peripheral section 251 except at the straight edge 255. To open this single-use package 179, both the outer peripheral section 251 and the aluminum cover 26 are peeled back to allow easy removal of the contact lens 4 therein.

Figure 108:
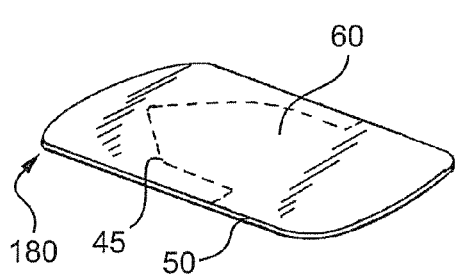
FIG. 108 is a perspective view of an embodiment of the single-use package in which there is a pointed edge that breaks open the top cover.
Figure 109:
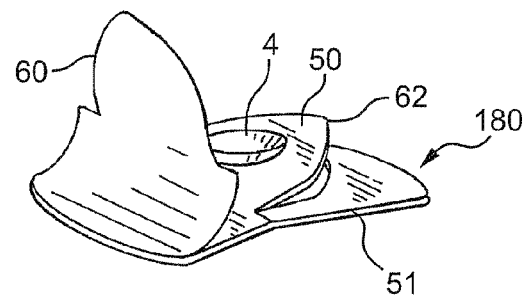
FIG. 109 is a perspective view of the single-use package of FIG. 108 with the top cover broken open.
Figure 110:
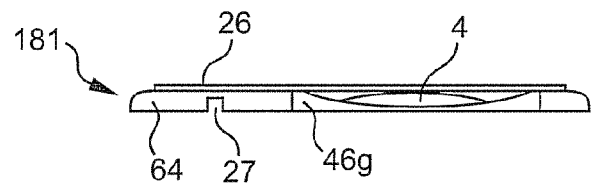
FIG. 110 is a cross-sectional view of a single-use package with a polypropylene spring disc and a break-open edge.

In a variation of the single-use package 180 of FIG. 108-109, there is a pointed edge 62 on the inner base section 50 that facilitates removal of the cover sheet 26. Although the single-use package 180 of this embodiment is shaped as a rounded rectangle, the inner section of the base 50 is in the shape of a pointed arch. Therefore, as the peripheral portion 251 is bent down slightly, the point 62 of the arch of the inner section pierces the cover sheet 60 and the sheet is pulled back along a predetermined path, such as along a relief. Such reliefs 45 are provided for easy opening and may be fancy cut, perforations, or semi-cut.

As shown in FIGS. 110-113, in one embodiment of the single-use package 181 with a polypropylene spring disc 46g, the single-use package 181 has a tab 64 which snaps or breaks off of the main body of the pack via a hinge 127 so that the single-use package 181 may be opened. Once the connection between the tab 64 and the main body is broken, by snapping it upward, the protective covering 26 may be peeled away to expose the contact lens 4 and polypropylene spring disc 46g. As the restraint of the protective cover 26 is removed, the polypropylene spring disc 46g reverts to its equilibrated, arched state as does the contact lens 4 thereon. The contact lens 4 may thus be pinched off between thumb and forefinger and inserted into an eye of the wearer. In this example, the spring disc 46g is polypropylene; however, the spring disc 46g may be made from a variety of other materials known to those skilled in the art, such as any suitable polyolefin or other such approved materials.

Figure 114:
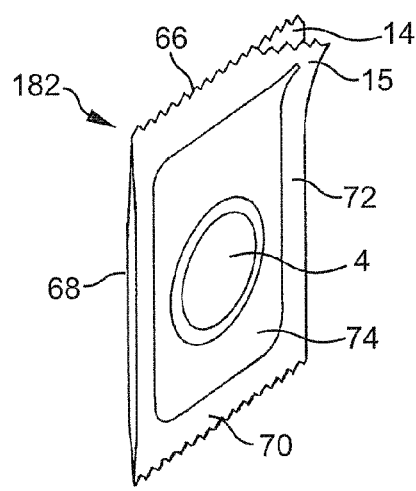

In an additional embodiment, the single-use package 182 is a retort-type package. Referring to FIG. 114, there is shown a perspective view of a retort-type single-use package 182 according to one exemplary embodiment. The retort-type single-use package 182 comprises a layered, flexible envelope for holding a contact lens 4, which may be formed from one piece or two pieces of like or different flexible material. According to one embodiment, the retort-type single-use package 182 is manufactured from a single piece of a flexible, laminated material which is strong enough to protect a lens held in a space formed in the package, but flexible enough to withstand forces due to a variety of applied loads such as, but not limited to, bending, folding, twisting, rolling or crushing. The wall of the package, which is preferably a homogenous material, does not necessarily conform to the shape of a lens but rather the lens "floats" in the package. Such "floating" is achieved by the fluid forces within the close confines of the package which support and buffer the lens from the surface of the package. There is little or no air within the package, and as such, any internal movement is minimized.

The retort-type single-use package 182 may be formed by folding a homogenous material back on itself and sealing the edges to form a sterile envelope. Alternatively, the retort-type single-use package 182 may be formed from two opposing pieces of homogenous material, in opposing relationship, that are heat sealed along the edges. Access to the lens is gained by dividing the retort-type single-use package 182 along one or more predetermined heat sealed edges.

Figure 115:
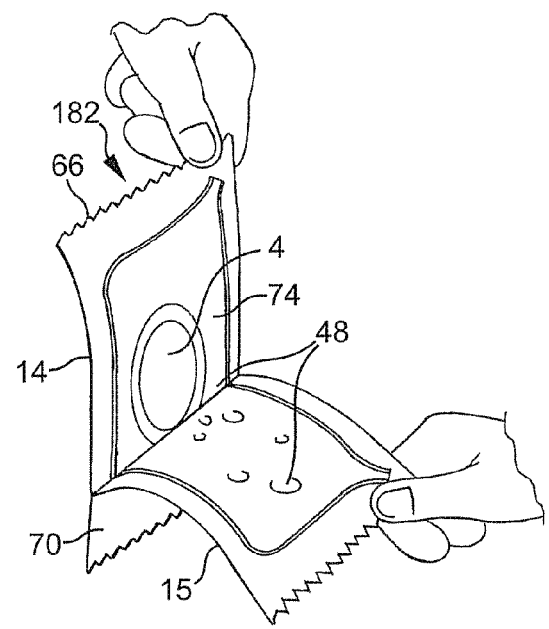

In FIG. 114, the retort-type single-use package 182 comprises first and second barrier layers 14 and 15 which may be formed by folding one layer or by jointing two separate barrier layers. The barrier layers 14 and 15 are heat sealed around edges 66, 68, 70, and 72. The heat sealing of edges 66-72 provides a boundary defining an internal space 74 in which a lens 4 is housed. The lens 4 is immersed in a predetermined, minimum amount of solution 48 which keeps the lens hydrated (see FIG. 115). To release and expose the lens, barrier layer 15 may be peeled away from barrier layer 14. Alternatively, barrier layer 14 may be peeled away from barrier layer 15. To facilitate initial release of the barrier layers, a portion of the mating engagement between the layers is only lightly sealed, preferably at a corner to enable separation of the barrier layers. FIG. 115 shows the retort-type single-use package 182 of FIG. 114 torn open to release the lens 4.

According to one embodiment, the barrier layers 14 and 15 are multi-layer laminates comprising materials which enable compliance with statutory requirements for lens packages. For example, a typical retort-type single-use package 182 material may comprise a polyethylene terepthelate (PET) layer, an aluminum layer and a polyolefin layer such as polypropylene. A thin layer of aluminum has properties such as inherent pliability and inhibition of oxygen transmission which make it a good material as part of the barrier wall composite.

A retort-type single-use package 182 of a predetermined size may be formed from barrier layers of the same or different materials. According to one embodiment, the retort-type single-use package 182 may be formed by folding a single piece of material back on itself to form the space for holding the lens. In another embodiment, two separate pieces of the same or different material, in opposing engagement, are heat sealed at their edges. According to one embodiment, the lamination profile of a barrier material may comprise an outer layer of 10.mu. PET, a 50.mu. aluminum layer, and a 50.mu. polypropylene layer.

Turning now to FIG. 116, a strip 41 of retort-type single-use packages 182, 78, and 80 are held together by frangible joints 76. The retort-type single-use package 182 may be separated one at a time by tearing off at the joints 76. Also, the strips may be folded about joints 76 which contribute to efficient storage and packaging. Thus six to eight, and possibly more lenses could potentially be stored in the same space as two lenses using prior art blister packs 27.

In FIG. 117, the strip of retort-type single-use packages 182 of FIG. 116 is shown, including a hydrating solution pack 35 attached to the package 182 via a frangible joint 76. The solution pack 35 may be used by the consumer to hydrate the lens should supplementary lens hydration be required.

Figure 118:
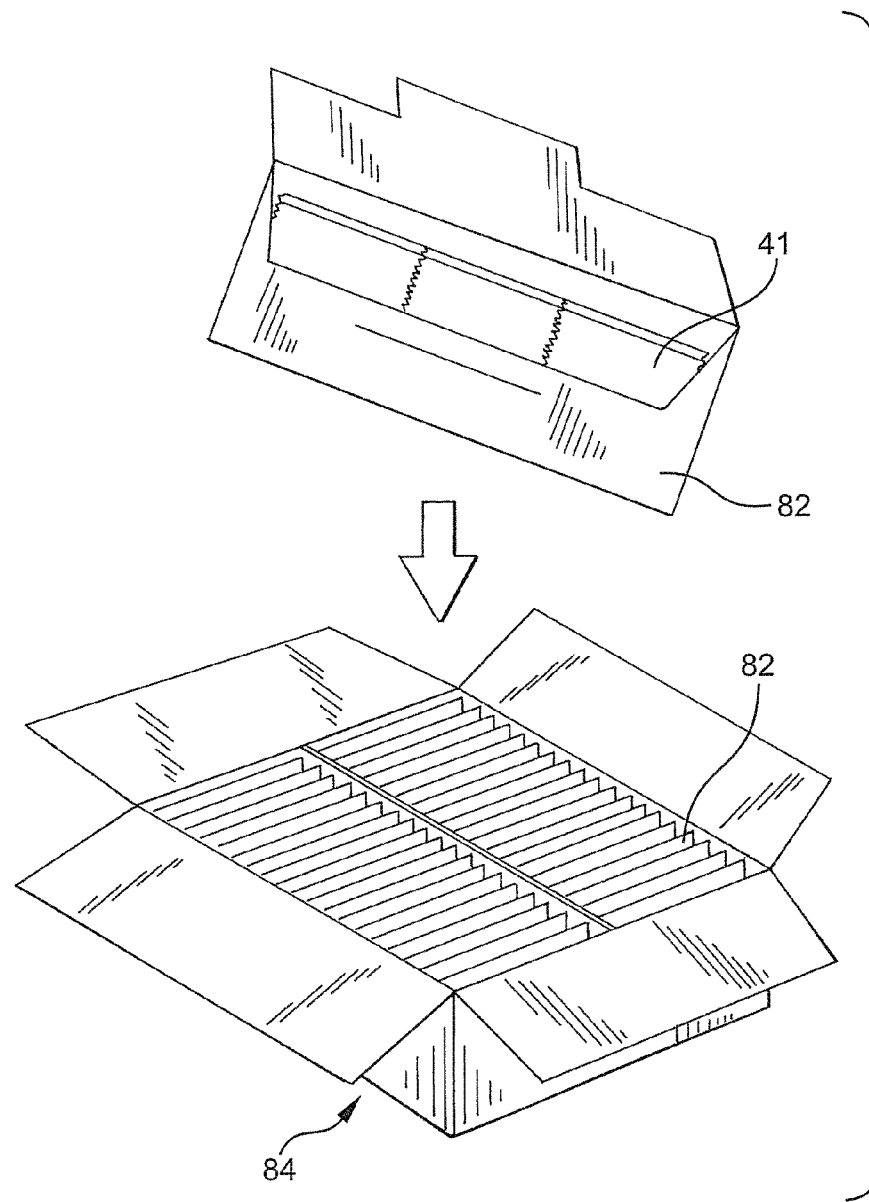

FIG. 118 shows an exploded view of a carton 84 containing a large number of like envelopes 82 holding retort-type single-use package strips 41, according to one embodiment. Alternatively, the envelope may hold a plurality of individual retort-type single-use packages 182. It can be seen from this arrangement that a larger number of lenses may be stored per unit space compared to prior art packaging. Depending upon the tightness of the packaging, up to 10, and potentially more than 10 lenses may be stored in a space which would previously have been taken by two lens packages.

The form of retort-type single-use packages 182 described would preferably contain one soft contact lens each. The appropriate art work and statutory information may be printed on the external surfaces in a similar fashion to the current packaging.

The integrity of the lens in this retort-type single-use package 182 is preserved by a surrounding buffer of storage medium in the packet. The storage medium may act as a safety buffer if the lens package is subjected to rough or potentially damaging treatment. The current blister pack offers lens barrier protection through the use of an injection molded, preformed rigid boat. However, the conventional blister package also includes an aluminum foil cover that bridges the opening to the blister pack. The unsupported foil offers no additional protection, and on the foil side, potentially less protection than a retort-type single-use package that has two flexible barrier layers that respond more favorably to applied loads. In fact, the aluminum surface of the blister packs can be more easily punctured due to its tightness over the polypropylene boat. The retort-type single-use package is inherently soft and can deflect potential punctures by moving with the puncturing object.

The retort-type single-use package 182 allows for a sufficient minimum amount of solution for maintenance of hydration and does not require that the lens swim in hydrating solution as in the prior art packages.

In the retort-type single-use package 182, which is one embodiment of the present contact lens package, excess hydration maintenance fluid may be forced out during the manufacturing process, leaving a predetermined minimum amount of solution or gel to keep the lens hydrated. Due to the optimal sealing qualities of the retort-type single-use package 182, no vapor will escape from the internal space. The flatness of the package barrier layers will facilitate sticking of the lens to one or other of the internal surfaces providing the advantage that when a layer is peeled back to expose the lens inside, the lens will be stuck to an inner surface which ensures that the lens will not drop out during opening.

The manufacturing of disposable lenses becomes more cost effective as the cost of packaging the lens is reduced and the efficiency of sealing and subsequent sterilization is improved. Patients will be more likely to consider the lens a disposable item in the present exemplary packaging. Further, it takes up far less space and can be packaged in a more appealing fashion. This type of packaging especially suits daily disposable lenses as the cost component of this type of packaging is attractive to both consumers and manufacturers.

A variety of secondary packaging 86 configurations are possible with the single-use package as illustrated in FIGS. 119-164. One advantage of the single-use package is that a variety of secondary packaging options are available. In addition, the space required to package a plurality of single-use packages is far less than that of the traditional blister packs. For instance, in FIGS. 119-120, a package of 30 single-use packages 187 is shown. There are five single-use packages 187 in each of the six compartments 90 sealed with a cover sheet 88, such as vacuum formed PET. The compartments 90 are connected by the cover sheet 88 as shown in FIG. 120. Two of such packages 86 may be combined to provide a 30 day supply of contact lenses (that is, a total of 60 lenses) (FIG. 121). In this embodiment, the 30 day supply is only 270.times.60.times.12 mm. A 90 day supply of lenses (FIG. 122) is only 270.times.180.times.12 mm and a package with a 180 day supply (FIG. 123) is 270.times.240.times.20 mm. The dimensions for the 30, 90 and 180 packs may vary as in the following non-limiting examples. A 30 day supply package may be 300.times.60.times.12 mm, or 255.times.60.times.13 mm, or 250.times.60.times.13 mm, or 245.times.60.times.13 mm, or even 240.times.55.times.13 mm. A 90 day supply pack may be 300.times.180.times.12 mm, or 255.times.180.times.13 mm, or 250.times.180.times.13 mm, or 245.times.180.times.13 mm, or even 240.times.165.times.13. A 180 day supply pack may be 300.times.240.times.20 mm, or 255.times.240.times.20 mm, 250.times.240.times.20 mm, or 245.times.240.times.20 mm, or even 240.times.220.times.20 mm.

In an alternative embodiment, shown in FIG. 124, a secondary package 124 for two single-use contact lens packages is illustrated. In this embodiment, two contact lens packages are packaged in a compact secondary package that is roughly the size of a business card. This embodiment is particularly useful when traveling.

In an alternative embodiment, shown in FIGS. 125A and 125B, there is a secondary package 86a for 30 single-use packages 187 with three compartments 90 holding 10 single-use packages 187 each. The compartments 90 are held together by a cover sheet 88. The package 86a is extremely compact, measuring 130.times.60.times.11 mm.

In one embodiment, a handbag kit or travel pack 91 is provided for a plurality of single-use packages 163, as seen in FIGS. 126-133, 135-136. The single-use packages therein may be individual single-use packages or strips of single-use packages folded in zigzag fashion. The travel pack 91 is composed of transparent or opaque (FIG. 131) material. The travel pack may be opened by pressing a release button 93 and flipping the top 89 up. The travel pack may have a mirror 94 inside to provide a traveling user the ability to insert his contact lenses any place at any time. Further, the handle 92 of the travel pack 91 provides a means for hanging the travel pack, for example, on a hook (see FIG. 130) such that the travel pack 91 is at eye level or stored in a safe place. The single-use packages 163 are held in the travel pack 91 by a sliding guide 96 to prevent the single-use packages 163 from falling out, as in FIG. 129. In an alternate embodiment of the travel pack 91 a, the single-use packages 163 are held in compartments 98 as shown in FIG. 132, which may optionally display left and right indicia 100.

In another embodiment, the secondary packaging provides a 90 day supply of single-use packages 163 as in FIG. 133-135. FIGS. 133-134 show a front view of the 90 day package and FIGS. 135 and 137 provide a side view. The 90 day package 104 holds the single-use packages 163 (either individual or strips folded in zigzag fashion) in a stacked arrangement and has a cover 102 attached that may optionally hold a travel pack 91 (FIG. 133) as described above. As shown in FIGS. 133 and 135, the travel pack 91 may slide onto the cover 102 of the 90 day package 104. In addition, when the 90 day package is emptied, the package 104 may be used as a sunglass case (see FIG. 136). The travel pack 91 may attach to the cover 102 and thus a combination travel pack 91 and sunglass case 104 is provided.

FIG. 137 illustrates a 90 day package 104 with a removable insert 108. After removal of the cover 102, the insert 108 may be lifted out of the 90 day package 104 by the handle 109 provided. As shown in FIG. 137A, an anti-slip rubber stopper 110 prevents the insert 108 from sliding back into the 90 day package when the user lets go of the handle 108, such as when the user is removing a single-use contact lens package 163. In the embodiment of FIG. 138, tabs 112a-q are provided at regular intervals within the stack of single-use packages 163 to alert the user to diminishing supplies. For instance, a tab 112a (138A) may indicate that there are only 30 contact lenses remaining in the 90 day package. Re-ordering information as well as prescription information may be included on the tab 112b (FIG. 138B) to aid the user in purchasing additional contact lenses. Alternatively, the tab 112 may indicate that there are only 10 lenses remaining. Although 10 and 30 lenses are used as an example, the tabs 112a-q may be placed at any interval that would be useful to the contact lens wearer.

In another embodiment shown in FIG. 139, the secondary packaging 113 for the single-use package 156 is a rectangular container or box with a low profile. The height of the container 113 need not be very high, as the single-use packages 156 within are slim and compactly stacked. As assembled, the container 113 securely holds a plurality of single-use packages 156 while taking up minimal space. Alternatively, the secondary packaging 113 may be square, round, oval or any other shape conducive to holding a plurality of single-use packages 156.

In other embodiments shown in FIGS. 140-143, the single-use packages are affixed to a holder sheet 114 and subsequently placed in a secondary packaging container. A plurality of single-use packages 187 may be affixed to a single holder sheet 114, and all of the single-use packages 187 on a given holder sheet contain lenses of a single prescription. The single-use packages 187 may be affixed in a circular arrangement, as seen in FIGS. 140-141. Alternatively, the single-use packages 187 may be arranged in parallel rows as in FIGS. 142-143. Optionally, artwork of any variety may be displayed on the front 115 of the holder sheet in addition to manufacture, prescription, regulatory, and instructional information which may optionally be displayed on the back 116.

In another embodiment, the single-use package 183 is a blister-type package that may be stacked and housed in a circular configuration in circular secondary packaging, as shown in FIGS. 144-148. The blister-type single-use package 183 is made from a suitable injection molded plastic material. Each blister-type single-use package has a slim profile and maintains the contact lens therein in a flattened or compressed state that is less that the sagittal depth of the equilibrated contact lens. When stacked, the blister-type single-use packages stack compactly and take up minimal space. The stacks may then be housed in a circular configuration in a secondary package base 118 with an open center 120 for easy access to the single-use packages. In this arrangement, it is easy for the user to place a finger in the center 120 and remove one or more single-use packages 183 from the circular secondary packaging 118. The circular secondary packaging has a base 118 as well as a lid 122 for securely housing the single-use packages 183 therein.

The circular secondary packaging 118 may house a 30 day supply, or a 90 day supply of contact lenses. Alternatively (FIG. 149), the circular secondary packaging 118 may house between 30 and 90 day supply of contact lenses or even between 90 and 180 day supply.

In another embodiment, the single-use package 184 is an asymmetrical rounded triangle with one or more tear notches 40, as shown in FIG. 150. This particular single-use package 184 may be packaged on a disc 223 held by small tabs 126, in set of six or more in a circular arrangement as shown in FIG. 151.

An alternative embodiment is shown in FIGS. 152-154. The single-use package 185 is a rounded triangle that resembles the shape of a guitar pick. The single-use packages 185 are held in place on a round holder sheet 124 by clipping means 128. Thus, individual single-use packages 185 may be easily removed from the sheet 124 by sliding the single-use package 185 off of the sheet 124. A plurality of single-use package holder sheets 124 maybe placed in a box 123 that holds 10 or more single-use package holder sheets 124. More preferably, the box 123 will hold 20, 30 or more single-use package holder sheets 124. The box 123 containing a plurality of single-use package holder sheets 124 has a narrow open guide 131 that matches up with slot 130 in the sheet 124. The lid 122 of box 123 also includes a slot 133. This open slot 130 extends from the center of the box 123 to the periphery but does not extend all the way to the perimeter. The lid 122 of the box 123 has a hinged section 132 across the diameter of the box 123 and this hinged section lifts up from the perimeter toward the center. There is also provided a stand 136 (FIG. 136) upon which a plurality of the boxes 123 containing single-use package holder sheets 124 may be stored. As shown, the stand 136 is a base with a central extension 134 that slides into open slot 130 of the single-use package holder sheets 124 and open guide 131 of box 123. When one or more boxes 123 containing single-use package holder sheets 124 is placed on the stand 136, the boxes 123 may be slid horizontally along the length of the guide 131. Therefore, as shown, a box 123 that is beneath another like box 123 may slide out without being removed from the stand 136. Access to the contents of the box 123 may be easily gained by opening the hinged section 132 of lid 122, and then the box 123 may be replaced in its original position. Contact lenses for both the right and left eye may be stored on the same stand 136. For instance, contact lenses for the left eye may be stored in the bottom boxes and contact lenses for the right eye may be stored in the top boxes. Alternatively, boxes may be stacked such that contact lenses for the right and left eyes alternate. In one embodiment, it is preferable that the boxes currently in use be on the top of the stack of boxes stored on the stand 136. This is because as each holder sheet 124 is emptied, the box 123 must be removed from the stand 136 so that the sheet 124 may be removed from the box 123 and access to a subsequent holder sheet 124 with a plurality of single-use packages 185 may be gained. In an alternate embodiment, the open slot 130 in the holder sheet 124 may extend all the way to the perimeter of the sheet 124 thereby allowing the sheet 124 to be removed from the box 123 without the need to remove the box 123 from the stand 136.

FIG. 155 illustrates a plurality of round single-use packages 186 held in a secondary package 145 that is shaped like an eye-mask. A plurality of single-use packages may be held in each compartment 141 and 143 of the package 145. The single-use packages 186 of this exemplary embodiment, have a semi-circular indentation 140. This indentation 140 provides a place for the user to grasp the single-use package 186 and remove it from the secondary packaging 145. The eye-mask shaped package 145 may be transparent or opaque and may display left and right indicia.

FIGS. 156-157 show another embodiment having a card 142 with two single-use packages 185 thereon. The single-use package 185 is fastened by clipping means 128 onto a single-use package carrying card 142. In this instance, the card 142 holds two rounded triangular shaped single-use packages 185. However, the number of single-use packages 185 as well as the shape of the single-use packages 185 may vary. Although the single-use packages in this example are attached to the single-use package holder card via clipping means, the single-use packages may also be attached with other forms such as adhesive or alternatively, insertion slots into which the corners of the single-use package may slide.

Advantageously, the card 142 with two single-use packages 185 clipped thereon may hold one left and one right daily use lens. Thus, a one day supply of lenses may be easily and compactly transported in a purse, wallet or pocket, as the card 142 is roughly the size of a business card. Optionally, a plurality of two single-use package carrying cards 142 may be packaged in a container for delivery to the user. The container may contain 10, 20, 30, 90 or a 180 day supply of lenses.

FIGS. 158-159 illustrate variations of the secondary package 114 of FIG. 146 that are possible with the single-use package 187. A variety of differently shaped single-use packages 187 may be compactly packaged in a variety of configurations with minimal space required. In FIG. 158, six single-use packages 187 are attached to a round holder sheet 248. In FIG. 159, six single-use packages 187 are attached to a rectangular holder sheet 249. Both holder sheet 248 and 249 include central openings therein, like opening 120 in FIG. 146, to allow a user to remove one of the packages 187 from the holder sheet.

Referring to FIG. 160, a secondary packaging box 250 is provided for a plurality of circular single-use packages 188. The circular single-use packages have a section of the perimeter that is folded inwardly to form an opening 146 into which a clip 147 may fit and hold the single-use packages in place. A storage stand 144 is provided in FIG. 161 which consists of a base and a wall that is at approximately a right angle to the base. The plurality of circular single-use packages may be transferred from the secondary packaging box 250 of FIG. 160 and clipped or snapped onto the stand 144 for storage of a 90 day supply of contact lenses. Single-use packages 188 may be removed from the stand 144 as needed. As shown, in this embodiment, there are two stacks of single-use packages 188 on the stand 144. Therefore, one stack may hold single-use packages 188 containing a prescription contact lens for the left eye and one stack may hold packages containing contact lenses suited to the right eye. The stand may be reusable or disposable and may store greater or less than a 90 day supply of lenses.

A delivery package is shown in FIG. 162. A plurality of single-use packages 190, in virtually any of the previously described package embodiments, may be inserted into an envelope 148 for shipping. Preferably, the envelope 148 is a sealed aluminum-coated sac filled with nitrogen gas to act a cushion. The packages 190 may be adhered to sheets or the packages themselves may be perforated portions of a larger sheet 124.

A single-use package dispensing case is illustrated in FIGS. 163-164. The dispensing case 150 opens from both ends to dispense single-use packages 189. For instance, one end dispenses single-use packages 189 containing contact lenses for the left eye and the opposite end dispenses single-use packages 189 containing contact lenses for the right eye. The dispensing case 150 is a cylinder and the single-use packages 189 therein are stacked on an angle such that when a cap 152 is opened, a single-use package 189 may be easily accessed by applying pressure to the removal area 154 and sliding a single-use package 189 from the dispenser 150. The caps 152 may display left and right indicia, prescription information, etc. The dispensing case 150 may be refillable or alternatively disposable.

It will be recognized by persons skilled in the art that numerous variations and modifications may be made to the described systems and methods as broadly described herein without departing from the overall spirit and scope thereof. For example, the materials discussed herein are capable of autoclave sterilization. Other materials may be used when other means of sterilization are utilized.

The preceding description has been presented only to illustrate and describe exemplary embodiments of the present system and method. It is not intended to be exhaustive or to limit the system and method to any precise form disclosed. Many modifications and variations are possible in light of the above teaching. It is intended that the scope of the system and method be defined by the following claims.

What is claimed is:

1. A contact lens delivery package, comprising:
   a sealed envelope defining a volume;
   at least one independently sealed contact lens package containing a contact lens the independently sealed contact lens package being disposed within the sealed envelope and occupying a first portion of the volume; and
   a second portion of the volume being filled with an inert gas.

2. The contact lens delivery package of claim 1, wherein the inert gas comprises nitrogen.

3. The contact lens delivery package of claim 1, wherein the inert gas displaces air such that the shelf life of the contact lens is extended within the independently sealed contact lens package.

4. The contact lens delivery package of claim 1, wherein the sealed envelope is coated with aluminum.

5. The contact lens delivery package of claim 1, wherein the independently sealed contact lens package is sealed within the sealed envelope.

6. A contact lens package assembly, comprising:
   a sealable contact lens package;
   at least one contact lens sealed within the sealable contact lens package; and
   a sealable envelope;
   wherein the sealable contact lens package is sealed within the sealable envelope, the sealable envelope including an inert gas therein;
   wherein the seal of the sealable contact lens package and the seal of the sealable envelope comprise different seals.

7. The contact lens package assembly of claim 6, wherein the sealable envelope is configured to retain a plurality of primary lens packages.

8. The contact lens package assembly, of claim 6, wherein the at least one inert gas comprises nitrogen.

9. The contact lens package assembly of claim 6, wherein the sealable envelope comprises an aluminum layer.

10. The contact lens delivery package of claim 6, wherein the inert gas is configured to displace air such that the shelf life of the at least one contact lens is extended within the sealable contact lens package.

11. The contact lens delivery package of claim 10, wherein the contact lens package comprises two sheets of material sealed together.

12. The contact lens delivery package of claim 11, further comprising a first seal surrounding the contact lens, and a second seal around a perimeter of the package, wherein the first seal is stronger than the second seal.

13. The contact lens delivery package of claim 10, wherein the contact lens package comprises a first space containing a hydration medium and a second space containing the hydration medium, wherein the first space and the second space are separated by a seam.

14. A method for manufacturing a contact lens package, comprising:
    sealing a contact lens within a contact lens package; and
    sealing the contact lens package within an envelope, wherein the envelope is configured to provide an inert environment for the contact lens package by sealing a volume of inert gas within the envelope with the contact lens package;
    wherein the sealing of the contact lens package and the sealing of the envelope comprise different sealing processes.

15. The method of claim 14, wherein the inert gas comprises nitrogen.

16. The method of claim 14, wherein the inert gas displaces air such that the shelf life of the contact lens is extended within the contact lens package.

\* \* \* \* \*